United States Patent
Fukumoto et al.

(10) Patent No.: US 7,860,455 B2
(45) Date of Patent: Dec. 28, 2010

(54) ELECTRONIC COMMUNICATIONS SYSTEM, APPARATUS AND ELECTRODE LAYOUT METHOD

(75) Inventors: Masaaki Fukumoto, Yokohama (JP);
Toshiaki Sugimura, Yokohama (JP);
Hirotaka Nakano, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 1486 days.

(21) Appl. No.: 10/521,602

(22) PCT Filed: Jul. 17, 2003

(86) PCT No.: PCT/JP03/09081
§ 371 (c)(1),
(2), (4) Date: Oct. 3, 2005

(87) PCT Pub. No.: WO2004/010618
PCT Pub. Date: Jan. 29, 2004

(65) Prior Publication Data
US 2006/0153109 A1  Jul. 13, 2006

(30) Foreign Application Priority Data

Jul. 18, 2002  (JP) ............... 2002-210049
Jul. 18, 2002  (JP) ............... 2002-210050
Jul. 18, 2002  (JP) ............... 2002-210051

(51) Int. Cl.
H04B 5/00 (2006.01)
(52) U.S. Cl. .......... 455/41.1; 455/80; 455/81; 455/100; 455/176.1; 455/188.1; 455/269; 455/331; 340/5.64; 340/333; 340/572.1; 340/572.6; 340/825.72; 341/33; 702/94; 702/150

(58) Field of Classification Search ............... 455/41.1, 455/100, 188.1, 176.1, 80–81, 331, 269; 324/76.75; 341/33; 340/333
See application file for complete search history.

(56) References Cited

U.S. PATENT DOCUMENTS 6,211,799 B1 * 4/2001 Post et al. ............... 341/33
6,223,018 B1 * 4/2001 Fukumoto et al. .......... 455/41.1
6,380,923 B1 * 4/2002 Fukumoto et al. .......... 345/156

(Continued)

FOREIGN PATENT DOCUMENTS

JP    H10-229357 A    8/1998

(Continued)

OTHER PUBLICATIONS

EPO Search Report dated Apr. 2, 2007.

(Continued)

*Primary Examiner*—Marceau Milord
(74) *Attorney, Agent, or Firm*—Brinks Hofer Gilson & Lione

(57) ABSTRACT

An electric field generated by another electric field communications apparatus reaches electric field sensor ES. Electric field sensor ES outputs an electric signal in response to the changes in the electric field. The electric field that reaches electric field sensor ES enters a return path of the electric field communications apparatus that is a source of the electric field. By locating electric field sensor ES between receiver main electrode ERB and receiver return electrode ERG, electric field intensity at the location where electric field sensor ES is positioned. Therefore, sensitivity of the changes in electric field for electric field communications apparatus TRX can be improved.

29 Claims, 42 Drawing Sheets

U.S. PATENT DOCUMENTS

| | | | |
|---|---|---|---|
| 6,542,717 B1 * | 4/2003 | Zimmerman et al. | 455/41.1 |
| 6,754,472 B1 * | 6/2004 | Williams et al. | 455/100 |
| 6,777,922 B2 * | 8/2004 | Tajima et al. | 324/76.75 |
| 6,864,780 B2 * | 3/2005 | Doi et al. | 340/5.64 |
| 7,088,267 B2 * | 8/2006 | Tajima | 341/33 |
| 7,206,423 B1 * | 4/2007 | Feng et al. | 381/312 |
| 7,260,835 B2 * | 8/2007 | Bajikar | 726/4 |
| 7,263,295 B2 * | 8/2007 | Shinagawa et al. | 398/135 |
| 7,480,492 B2 * | 1/2009 | Williams et al. | 455/100 |
| 7,551,893 B2 * | 6/2009 | Fukumoto et al. | 455/41.2 |

FOREIGN PATENT DOCUMENTS

| | | |
|---|---|---|
| JP | 2001-298425 A | 10/2001 |
| JP | 2001-298435 A | 10/2001 |
| JP | 2001-352299 A | 12/2001 |

OTHER PUBLICATIONS

Zimmerman T G: "Personal Area Networks: Near-Field Intrabody Communication" IBM System Journal, vol. 35, No. 3/4, 1996, pp. 609-617.

Office Action for Korean Application No. 10-2005-7000962 (with translation).

Office Action in corresponding Chinese Application No. 03822131.4, dated Sep. 4, 2009, 14 pages (with translation).

Japanese Office Action dated Oct. 3, 2006.

* cited by examiner

ELECTRONIC COMMUNICATIONS SYSTEM, APPARATUS AND ELECTRODE LAYOUT METHOD

BACKGROUND OF THE INVENTION

1. Field of the Invention

The present invention relates to techniques for communication using time-varying electric fields.

2. Description of the Related Arts

In recent years, methods have been proposed for performing communications using electrostatic fields induced in a dielectric such as the human body. This method was first disclosed in T. G. Zimmerman's paper "Personal Area Networks: Near-Field Intra-Body Communication" (IBM System Journal Vol. 35, No. 3&4, 1996-MIT Media Laboratory). According to this method, it is possible to implement a miniaturized device permitting a reduction in the electric power required of the device.

However, in communications based on the method, so-called PANs (Personal Area Networks), there has been the problem of establishing return paths. As shown in FIG. 22, a PAN can use earth ground as a return path. For this reason, there is a need to establish an electrostatic coupling through the earth ground between the transmitting apparatus and the receiving apparatus. Accordingly, when establishing the transmitting and receiving apparatus in a location that separates the transmitting and receiving apparatus from the ground, the electrostatic coupling weakens, and stable communications becomes impossible. As a result, electric field communications apparatus based on PANs has been considered capable only of communicating across limited distances.

To solve the earth-ground difficulty, Japanese Patent Laid-Open Publication No. 10-229357 and Japanese Patent Laid-Open Publication No. 2001-298435 disclose technology that has the aim of extending the communication distance. These disclosed technologies have in common the point of attempting increases in the communication distance by using electrostatic coupling through the air other than earth ground as the return paths.

FIG. 23 through FIG. 26 shows in general the communication theory of electric field communications apparatus that communicate using electrostatic coupling through the air as a return path.

The transmitter apparatus in FIG. 23 outputs as a time-varying voltage between electrode ERBT and electrode ERGT, a signal modulated based on data to be transmitted. Then, it generates a voltage difference with electrode ERBT and electrode ERGT, thereby creating an electric field. In general, it is relatively easy to transmit an electric field in a dielectric such as the human body compared with the air. Accordingly, when electrode ERBT is directly contacted to a dielectric such as the human body as shown in FIG. 24, it is possible to make electric fields reach a greater distance. As well, as shown in FIG. 25, when the receiver apparatus is positioned inside the electric field generated by the transmitter apparatus, it gives rise to a voltage difference between the electrodes ERBR and ERGR of the receiver apparatus. The receiver apparatus detects the voltage difference, and can acquire the transmitted data by demodulating the voltage difference. In this case, the return path is the electrostatic coupling established through the air between the electrodes ERGT and ERGR of the transmitter apparatus. As shown in FIG. 26, a dielectric may be used as a return path. In this case, the dielectric return path extends the communications distance for the electric field communications apparatus.

Each of the technologies in the two Patent documents above can solve the earth-ground problem.

However, even technologies disclosed in the Patent documents cannot assure sufficiently long communication distances. This reason will be described below. In Japanese Patent Application Laid-Open Publication No. 10-229357, in order to solve the earth-ground problem, the return path by electrostatic coupling through the air is assured by pointing the transmitter return electrode and the receiver return electrode toward the air. However, since this is for electrostatic coupling through the air, the distance between the return path of the transmitter apparatus and the receiver apparatus must not be overly increased. In the case of performing electric field communications using the configurations disclosed in the Patent documents, it becomes impossible to communicate across a space as wide as the space between a person's head and pelvic region.

With the technology disclosed in Japanese Patent Application Laid-Open Publication No. 2001-298425, the return electrode is removed, and a cabinet made of conductive members substitutes for the return electrode. In this technology, a high-sensitivity electric field sensor is used for measuring the electric field. An electro-optical device that exhibits the so-called Pockels Effect is used as an electric field sensor. The electric field sensor is also capable of measuring smaller changes in an electric field, compared to one using a transistor or an FET (Field-Effect Transistor) or the like. However, by using a configuration that combines the functions of cabinet and return path, it is not clear how an electric field reaching the receiver apparatus is specifically distributed in the interior of the apparatus. For example, in a case that only a very small portion of the electric field reaches the part in which the electric field sensor is positioned, sensitivity to changes in the electric field cannot be improved. In other words, using the technology disclosed in the patent documents, it is difficult to sufficiently raise the reception sensitivity because the electric field density at the location of the electric field sensor cannot be strictly estimated.

SUMMARY OF THE INVENTION

The present invention provides a solution for the above described problem. The present invention provides an electric field communications apparatus that can assure sufficiently great communication distances.

To solve the problem, the present invention provides an electric field communications system, which comprises a transmitter apparatus, comprising: a transmitter main electrode provided in a location so as to readily exert an electric effect on a dielectric; a transmitter return electrode; a signal generator that generates an electric signal; and a modulator that modulates a voltage difference between the transmitter main electrode and the receiver return electrode in response to the electric signal; a receiver apparatus, comprising: a receiver main electrode provided in a location where the receiver main electrode is readily subject to an electric effect from the dielectric; a receiver return electrode that establishes an electrostatic coupling with the transmitter return electrode; and a measuring part that measures electric status generated between the receiver main electrode and the receiver return electrode; wherein the measuring parts comprises: an electro-optical crystal that exhibits a Pockels Effect and modulates light penetrating the electro-optical crystal in response to an electric field in the space where the electro-optical crystal is located light emitting means that emits light to the electro-optical crystal; and light receiving means that receives light penetrating the electro-optical crystal, and output signals in response to the received light. According to the electric field communications system of the present invention, it is possible to increase the electro-static coupling of the transmitter apparatus and the receiver apparatus, and to use a high sensitivity electro-optical crystal.

The present invention also provides an electric field communications system, comprising: a transmitter apparatus, comprising: a transmitter main electrode provided in a location so as to readily exert an electric effect on a dielectric; a transmitter return electrode; a signal generator that generates an electric signal; and a modulator that modulates a voltage difference between the transmitter main electrode and the receiver return electrode in response to the electric signal; a receiver apparatus, comprising: a receiver main electrode provided in a location where the receiver main electrode is readily subject to an electric effect from the dielectric; a receiver return electrode that establishes an electrostatic coupling with the transmitter return electrode, the receiver return electrode being positioned far from the dielectric and facing to the dielectric; and a measuring part that measures an electric status generated between the receiver main electrode and the receiver return electrode; wherein the measuring parts comprises: an electro-optical crystal that exhibits a Pockels Effect and modulates light penetrating the electro-optical crystal in response to an electric field in the space where the electro-optical crystal is located light emitting means that emits light to the electro-optical crystal; and light receiving means that receives light penetrating the electro-optical crystal, and output signals in response to the received light. According to the electric field communications system of the present invention, it is possible to increase the electro-static coupling of the transmitter apparatus and the receiver apparatus, and use a high sensitivity electro-optical crystal.

In the preferred embodiment, the receiver main electrode and the receiver return electrode may be positioned to locate the electro-optical crystal in an electric field generated between the receiver main electrode and the receiver return electrode. According to this embodiment, an electric field having sufficient intensity can be provided to the electro-optical crystal.

In yet another embodiment, the electrostatic coupling between the transmitter return electrode and the receiver return electrode may be established through the air. According to this embodiment, a communication range can be extended independent of a position of the apparatus.

In yet another embodiment, the receiver main electrode and the receiver return electrode may be positioned to be in opposing relation across at least a part of the electro-optical crystal. According to this embodiment, a sufficient electric field penetrates the electro-optical crystal.

In yet another embodiment, the electro-optical crystal may have a pillar form. A face of the receiver return electrode, which is nearest the electro-optical crystal has a size and a form which are included in a cross section which is orthogonal to a light path in the electro-optical crystal. According to this embodiment, responsibility of the electro-optical crystal increases.

In yet another embodiment, the measuring part may be connected to the receiver return electrode; the measuring part may be positioned nearer the electro-optical crystal than the receiver return electrode; and the measuring part may comprise a return electrode having the same electric potential as the receiver return electrode. According to this embodiment, an electric field that reaches the receiver return electrode can increase.

In yet another embodiment, the electro-optical crystal may have a pillar form. A face of the return electrode, which is nearest the electro-optical crystal has a size and a form which are included in a cross section which is orthogonal to a light path in the electro-optical crystal. According to this embodiment, responsibility of the electro-optical crystal increases.

In yet another embodiment, the measuring part may be connected to the receiver main electrode; the measuring part may be positioned nearer the electro-optical crystal than the receiver main electrode; and the measuring part may comprise a return electrode having the same electric potential as the receiver main electrode. According to this embodiment, an electric field that reaches the receiver main electrode can increase.

In yet another embodiment, the electro-optical crystal may have a pillar form. A face of the destination electrode, which is nearest the electro-optical crystal has a size and a form which are included in a cross section which is orthogonal to a light path in the electro-optical crystal. According to this embodiment, responsibility of the electro-optical crystal increases.

In yet another embodiment, the dielectric is a human body. According to this embodiment, communication through the human body becomes possible.

In yet another embodiment, the transmitter apparatus and the receiver apparatus are worn on the human body. According to this embodiment, electric field communication through the human body becomes possible.

In yet another embodiment, the transmitter apparatus may be worn on a human body and the receiver apparatus may be worn on another human body. According to this embodiment, electric field communication through a plurality of human bodies becomes possible.

In yet another embodiment, the transmitter apparatus may be worn on a human body and the receiver apparatus may be positioned in a place other than the human body. When the person wearing the communications apparatus touches the receiver main electrode of the receiver apparatus, communication between the transmitter apparatus and the receiver apparatus can be performed. According to this embodiment, communication is intentionally initiated by a user.

In yet another embodiment, the receiver apparatus may be worn on a human body and the transmitter apparatus may be positioned in a place other than the human body. When the person wearing the communications apparatus touches the transmitter main electrode of the transmitter apparatus, communication between the transmitter apparatus and the receiver apparatus can be performed. According to this embodiment, the communication is intentionally initiated by a user.

In yet another embodiment, the receiver return electrode may be connected to a plus power supply, a minus power supply, or a part having low impedance and stabilized electric potential. According to this embodiment, more stable communication can be performed.

In yet another embodiment, the receiver return electrode may be connected to a cabinet, the cabinet accommodating the receiver return electrode and being made of conductive materials.

In yet another embodiment, the transmitter return electrode may be connected to a plus power supply, a minus power supply, or a part having low impedance and a stabilized electric potential. According to this embodiment, more stable communication can be performed.

In yet another embodiment, the transmitter return electrode may be connected to a cabinet, the cabinet accommodating the receiver return electrode and being made of conductive materials.

In yet another embodiment, the transmitter return electrode may be positioned to face the dielectric and the transmitter main electrode may be positioned to face space around the apparatus. According to this embodiment, an electric field can be generated by a voltage difference between the two electrodes.

In yet another embodiment, the receiver return electrode may be positioned to face the dielectric and the receiver main electrode may be positioned to face to the apparatus. According to this embodiment, an electric field can be generated by a voltage difference between the two electrodes.

In yet another embodiment, the receiver return electrode may be positioned to face the dielectric and the receiver main electrode may be positioned to face space around the apparatus. According to this embodiment, an electric field can be generated by a voltage difference between the two electrodes.

In yet another embodiment, the light emitting means comprise a laser device and emit light to the electro-optical crystal. According to this embodiment, the electric field can be measured using the characteristic of an electro-optical crystal.

In yet another embodiment, the light receiving means change output signal in response to polarization status of light penetrating the electro-optical crystal. According to this embodiment, electric signal can be changes in response to the change in the electric field.

In yet another embodiment, the light receiving means change output signal in response to an intensity of light penetrating the electro-optical crystal. According to this embodiment, electric signal can be changes in response to the change in the electric field.

In yet another embodiment, the transmitter apparatus and the receiver apparatus further may comprise a communication interface for communication conformity with Ethernet (registered trademark) protocol. The transmitter apparatus and the receiver apparatus can form Ethernet network. According to this embodiment, the transmitter apparatus and the receiver apparatus can communicate with another apparatus incapable of electric field communication.

In yet another embodiment, modulation system used in the modulator and the demodulator may comply Ethernet protocol. According to this embodiment, another apparatus can recognize the transmitter apparatus and the receiver apparatus as an Ethernet device.

In yet another embodiment, the transmitter apparatus and the receiver apparatus may be included in single cabinet. According to this embodiment, two-way communications between transmitter apparatus and receiver apparatus becomes possible.

In yet another embodiment, one electrode may have functions of the transmitter main electrode and the receiver main electrode, and another electrode may have functions of the transmitter return electrode and receiver return electrode. According to this embodiment, the configuration of the apparatus can be simplified.

In yet another embodiment, one electrode may have functions of the transmitter main electrode and the receiver main electrode. Alternatively, one electrode may have functions of the transmitter return electrode and receiver return electrode. According to this embodiment, a user can select a configuration in response to its application.

In yet another embodiment, modulation system used in the modulator and demodulator may be AM (Amplitude Modulation), PM (Phase Modulation), FM (Frequency Modulation), PCM (Pulse Coded Modulation), SS (Spectrum Spread), CDMA (Code Division Multiple Access), or UWB (Ultra Wide Band). By using a plurality of modulation system, it is possible to increase number of signals that are communicated simultaneously.

The present invention also provides an electric field communications apparatus, comprising: a receiver main electrode provided in a location so as to readily exert an electric effect on a dielectric; a receiver return electrode for establishing electrostatic coupling with an apparatus generating an electric field exerting an effect to the dielectric; a measuring part that measures electric status generated between the receiver main electrode and the receiver return electrode; wherein the measuring parts comprises: an electro-optical crystal that exhibits a Pockels Effect and modulates light penetrating the electro-optical crystal in response to an electric field in the space where the electro-optical crystal is located light emitting means that emits light to the electro-optical crystal; light emitting means that emits light to the electro-optical crystal; and light receiving means that receives light penetrating the electro-optical crystal, and output signals in response to the received light. According to the electric field communications system, it is possible to increase the electro-static coupling of the transmitter apparatus and the receiver apparatus, and use a high sensitivity electro-optical crystal.

The present invention also provides an electric field communications apparatus, comprising: a receiver main electrode provided in a location so as to readily exert an electric effect on a dielectric; a receiver return electrode for establishing electrostatic coupling with an apparatus generating an electric field exerting an effect to the dielectric; a measuring part that measures electric status generated between the receiver main electrode and the receiver return electrode, the receiver return electrode being positioned far from the dielectric and faces to space around the dielectric; wherein the measuring parts comprises: an electro-optical crystal that exhibits a Pockels Effect and modulates light penetrating the electro-optical crystal in response to an electric field in the space where the electro-optical crystal is located light emitting means that emits light to the electro-optical crystal; light emitting means that emits light to the electro-optical crystal; and light receiving means that receives light penetrating the electro-optical crystal, and output signals in response to the received light. According to the electric field communications system, it is possible to increase the electro-static coupling of the transmitter apparatus and the receiver apparatus, and use a high sensitivity electro-optical crystal.

In another embodiment, the electric status may be an electric field, and the receiver main electrode and the receiver return electrode is positioned to make the electro-optical crystal to be located in an electric field generated between the receiver main electrode and the receiver return electrode. According to this embodiment, an electric field having sufficient intensity can be provided to the electro-optical crystal.

In yet another embodiment, the electrostatic coupling between the transmitter return electrode and the receiver return electrode may be established through the air. According to this embodiment, communication range can be extended independent of a position of the apparatus.

In yet another embodiment, the receiver main electrode and the receiver return electrode may be positioned to be opposite each other across at least a part of the electro-optical crystal. According to this embodiment, sufficient electric field penetrates the electro-optical crystal.

In yet another embodiment, the electro-optical crystal may have pillar form. A face of the receiver return electrode, which is the nearest the electro-optical crystal has a size and a form which are included in a cross section which is orthogonal to a light path in the electro-optical crystal. According to this embodiment, responsibility of the electro-optical crystal increases.

In yet another embodiment, the measuring part may be connected to the receiver return electrode; the measuring part may be positioned nearer the electro-optical crystal than the receiver return electrode; and the measuring part may comprise a return electrode having the same electric potential as the receiver return electrode. According to this embodiment, electric field that reaches to the receiver return electrode can increase.

In yet another embodiment, the electro-optical crystal may have pillar form. A face of the return electrode, which is the nearest the electro-optical crystal has a size and a form which are included in a cross section which is orthogonal to a light path in the electro-optical crystal. According to this embodiment, responsibility of the electro-optical crystal increases.

In yet another embodiment, the measuring part may be connected to the receiver main electrode; the measuring part may be positioned nearer the electro-optical crystal than the receiver main electrode; and the measuring part may comprise a return electrode having the same electric potential as the receiver main electrode. According to this embodiment, electric field that reaches to the receiver main electrode can increase.

In yet another embodiment, the electro-optical crystal may have pillar form. A face of the return electrode, which is the nearest the electro-optical crystal has a size and a form which are included in a cross section which is orthogonal to a light path in the electro-optical crystal. According to this embodiment, responsibility of the electro-optical crystal increases.

In yet another embodiment, the dielectric is a human body. According to this embodiment, communication through the human body becomes possible.

In yet another embodiment, the light emitting means comprise a laser device and emit light to the electro-optical crystal. According to this embodiment, the electric field can be measured using the characteristic of an electro-optical crystal.

In yet another embodiment, the light receiving means change output signal in response to polarization status of light penetrating the electro-optical crystal. According to this embodiment, electric signal can be changes in response to the change in the electric field.

In yet another embodiment, the light receiving means change output signal in response to an intensity of light penetrating the electro-optical crystal. According to this embodiment, electric signal can be changes in response to the change in the electric field.

As described above, according to the electric field communications system and electric field communications apparatus of the present invention, sensitivity for an electric field can be increased, by locating the electric field sensor in high electric field intensity. As a result, communication range between the electric field communications apparatus can be extended.

The present invention also provides a communications system, comprising a communications apparatus and a communications unit that communicates with the communications apparatus, wherein the communications apparatus comprises: a transmitter main electrode provided in a location so as to readily exert an electric effect on a dielectric; a transmitter return electrode; a modulator that modulates an electric potential applied to the transmitter main electrode in response to electric signals corresponding to transmitted data; the communications apparatus provides to the dielectric; the communications unit comprises: a receiver main electrode provided in a location where the receiver main electrode is readily subject to an electric effect from the dielectric; a receiver return electrode that establishes an electrostatic coupling with the transmitter return electrode; and a measuring part that measures electric status generated between the receiver main electrode and the receiver return electrode; a demodulator that acquires the electric signal based on the measurement result by the measuring part and acquires data transmitted from the communications apparatus by demodulating the electric signal; wherein the receiver return electrode is positioned in a location where the receiver return electrode cannot touch the dielectric during communication with the communications unit.

In another embodiment, the communications unit may comprise an insulator having lower face, side faces, and upper face. Also, the measuring part and the demodulator may be provided in the insulator.

In yet another embodiment, the receiver main electrode of the communications unit may be provided on the upper face of the insulator. Also, the receiver return electrode of the communications unit may be provided on the side faces.

In yet another embodiment, the communications unit may further comprise a transmitter main electrode provided in a location so as to readily exert an electric effect on a dielectric; a transmitter return electrode; a modulator that modulates an electric potential applied to the transmitter main electrode in response to electric signals corresponding to transmitted data; the communications apparatus provides to the dielectric an electric field corresponding to the change in electric potential provided to the dielectric. Also, the communications apparatus may comprise: a receiver main electrode provided in a location where the receiver electrode is readily subject to an electric effect from the dielectric; a receiver return electrode that establishes an electrostatic coupling with the transmitter return electrode; and a measuring part that measures electric status generated between the receiver main electrode and the receiver return electrode; a modulator that acquires the electric signal based on the measurement result by the measuring part and acquires data transmitted from the communications unit by demodulating the electric signal; wherein the receiver return electrode is positioned in a location where the receiver return electrode cannot touch the dielectric during communication between the communications unit and the communications apparatus.

In yet another embodiment, the transmitter return electrode may be a steel frame of a room, the communications unit being provided in the room.

In yet another embodiment, the transmitter return electrode may be provided on a ceiling of a room, the communications unit being provided in the room.

In yet another embodiment, the transmitter return electrode may be provided on a "nageshi" part (a horizontal member which is provided on a wall between two pillars) of a room, the communications unit being provided in the room.

In yet another embodiment, the transmitter return electrode may be provided on a "mawaridzuke" part (a horizontal member which is provided on a upper part of a wall) of a room, the communications unit being provided in the room.

In yet another embodiment, the transmitter return electrode may be provided on a "habaki" part (a horizontal member which is provided on a lower part of a wall) of a room, the communications unit being provided in the room.

In yet another embodiment, the receiver return electrode may be provided on the same location where the transmitter return electrode is positioned, the receiver return electrode being separated from the transmitter return electrode.

In yet another embodiment, one electrode may have functions of the transmitter main electrode and the receiver main electrode of the communications apparatus, and another electrode may have functions of the transmitter main electrode and the receiver main electrode of the communications unit. Also, one electrode may have functions of the transmitter return electrode and the receiver return electrode of the communications apparatus, and another electrode may have functions of the transmitter return electrode and the receiver return electrode of the communications unit.

In yet another embodiment, one electrode having functions of the transmitter return electrode and the receiver return electrode may be provided on a ceiling of a room, the communications unit being provided in the room.

In yet another embodiment, one electrode having functions of the transmitter return electrode and the receiver return electrode may be provided on a "nageshi" part (a horizontal member which is provided on a wall between two pillars) of a room, the communications unit being provided in the room.

In yet another embodiment, one electrode having functions of the transmitter return electrode and the receiver return electrode may be provided on a "mawaridzuke" part (a horizontal member which is provided on a upper part of a wall) of a room, the communications unit being provided in the room.

In yet another embodiment, one electrode having functions of the transmitter return electrode and the receiver return electrode may be provided on a "habaki" part (a horizontal member which is provided on a lower part of a wall) of a room, the communications unit being provided in the room.

In yet another embodiment, one electrode having functions of the transmitter return electrode and the receiver return electrode may be a steel frame of a room, the communications unit being provided in the room.

In another embodiment, the communications unit may comprise an insulator having lower face, side faces, and upper face. Also, the measuring part, the demodulator, and the modulator may be provided in the insulator. Furthermore, the receiver return electrode may be provided on the upper face of the communications unit.

In yet another embodiment, the receiver return electrode of the communications unit may be provided on a side face of the insulator.

In yet another embodiment, the transmitter return electrode may be provided on a side face orthogonal to a side face where the receiver return electrode is provided.

In yet another embodiment, the transmitter return electrode and the receiver return electrode may contact a side face of the insulator, and may be positioned to surround the side faces.

In yet another embodiment, the insulator may have a rectangular form.

In yet another embodiment, the insulator has a "tatami" form. The receiver return electrode of the communications unit may be provided on a side face. The side face may be a rim of the insulator.

In yet another embodiment, the receiver return electrode of the communications unit may be provided on a ceiling of a room, the communications unit being positioned in the room.

In yet another embodiment, the receiver return electrode of the communications unit may be provided on a "nageshi" part (a horizontal member which is provided on a wall between two pillars) of a room, the communications unit being positioned in the room.

In yet another embodiment, the receiver return electrode of the communications unit may be provided on a "mawaridzuke" part (a horizontal member which is provided on a upper part of a wall) of a room, the communications unit being positioned in the room.

In yet another embodiment, the receiver return electrode of the communications unit may be provided on a "habaki" part (a horizontal member which is provided on a lower part of a wall) of a room, the communications unit being positioned in the room.

In yet another embodiment, the receiver return electrode of the communications unit may be a steel frame of a room, the communications unit being positioned in the room.

In yet another embodiment, the receiver return electrode may be positioned in a location where the receiver return electrode cannot contact the receiver main electrode of the communications unit during communication between the communications apparatus and the communications unit.

In yet another embodiment, the receiver return electrode may be positioned in a location where the receiver return electrode cannot contact the receiver main electrode of the communications apparatus during communication between the communications apparatus and the communications unit.

In yet another embodiment, the electrostatic coupling may be established through the air.

In yet another embodiment, stable electric potential may be provided to the transmitter return electrode and the receiver return electrode.

In yet another embodiment, the transmitter return electrode and the receiver return electrode may be connected to a plus power supply, minus power supply, a part having low impedance and stable electric potential, signal ground, a cabinet of the communications apparatus, or ground earth.

In yet another embodiment, the modulator may modulate a voltage difference between the transmitter return electrode and the transmitter main electrode. Also, the modulator may provide to the dielectric an electric field in response to the voltage difference between the transmitter return electrode and the transmitter main electrode.

In yet another embodiment, the measuring part may measure a voltage difference between the receiver main electrode and the receiver return electrode, the voltage difference being generated by the electric field provided to the dielectric.

In yet another embodiment, the measuring part may comprise: an electro-optical crystal that exhibits a Pockels effect and changes light penetrating the electro-optical crystal in response to an electric status at space where the electro-optical crystal is located; light emitting means that emit light to the electro-optical crystal; light receiving means that receive light penetrating the electro-optical crystal and output a signal showing the effect of the electro-optical crystal.

In yet another embodiment, the receiver main electrode and the receiver return electrode may be positioned in a location where the electro-optical crystal is located in the electric field generated between the receiver main electrode and the receiver return electrode.

In yet another embodiment, the receiver main electrode and the receiver return electrode may be positioned in location where the receiver main electrode faces to the receiver return electrode, at least a part of the electro-optical crystal may be located between the receiver main electrode and the receiver return electrode.

In yet another embodiment, the communications unit may further comprise: a destination electrode that is connected to the receiver main electrode and has the same electric potential as the receiver main electrode; a return electrode that is connected to the receiver return electrode and has the same electric potential as the receiver return electrode. Also, the destination electrode may face to the return electrode and the electro-optical crystal may be positioned between the destination electrode and the return electrode.

In yet another embodiment, the communications apparatus may be positioned in a location where the transmitter main electrode is located near the receiver main electrode. The receiver return electrode may be positioned in a location where the receiver return electrode cannot contact the transmitter main electrode and the receiver main electrode. The measuring part may measure an electric field generated between the receiver return electrode and the receiver return electrode by the electric field generated by the modulator.

The present invention also provides a communications system, comprising a communications unit and a communications apparatus that communicates with the communications unit, wherein the communications unit comprises: a transmitter main electrode provided in a location so as to readily exert an electric effect on a dielectric; a transmitter return electrode; a modulator that modulates an electric potential applied to the transmitter main electrode in response to electric signals corresponding to transmitted data; the communications apparatus provides to the dielectric; the communications apparatus comprises: a receiver main electrode provided in a location where the receiver main electrode is readily subject to an electric effect from the dielectric; a receiver return electrode that establishes an electrostatic coupling with the transmitter return electrode; and a measuring part that measures electric status generated between the receiver main electrode and the receiver return electrode; a demodulator that acquires the electric signal based on the measurement result by the measuring part and acquires data transmitted from the communications apparatus by demodulating the electric signal; wherein the receiver return electrode is positioned in a location where the receiver return electrode cannot touch the dielectric during communication with the communications unit.

In another embodiment, the dielectric may be a human body.

The present invention also provides a communications unit, comprising: a transmitter return electrode; a transmitter main electrode provided in a location so as to readily exert an electric effect on a dielectric; a receiver return electrode for establishing electrostatic coupling with the transmitter return electrode, a communications apparatus having the transmitter return electrode, the communications apparatus having a modulator for modulating an electric potential applied to the transmitter main electrode; a receiver main electrode provided in a location where the receiver main electrode is readily subject to an electric effect from the dielectric; a measuring part that measures electric status generated between the receiver main electrode and the receiver return electrode; a demodulator that acquires the electric signal based on the measurement result by the measuring part and acquires data transmitted from the communications apparatus by demodulating the electric signal; an insulator having a upper face, side faces, and a lower face; wherein the measuring part and the modulator is positioned in the insulator; the receiver return electrode is positioned in a location where the receiver return electrode cannot touch the dielectric during communication with the communications unit; the receiver main electrode of the communications unit is provided on the upper face of the insulator.

In yet another embodiment, the communications unit may comprise: a transmitter return electrode; a transmitter main electrode provided in a location so as to readily exert an electric effect on a dielectric; a modulator that modulates an electric potential applied to the transmitter main electrode in response to an electric signal corresponding to data to be transmitted, wherein the communications unit provides an electric field corresponding to the changes in the electric potential generated by the modulator.

In yet another embodiment, the receiver return electrode may be provided on a side face of the insulator. In addition, the transmitter return electrode may be formed on another side face orthogonal to the side face on which the receiver return electrode is provided.

In yet another embodiment, the transmitter return electrode and the receiver return electrode may contact a side face of the insulator, and may be positioned to surround the side faces.

In yet another embodiment, the receiver return electrode may be provided on a side face of the insulator.

In yet another embodiment, the modulator may modulate a voltage difference between the transmitter return electrode and the transmitter main electrode, and may provide to the dielectric an electric field in response to the voltage difference between the transmitter return electrode and the transmitter main electrode.

In yet another embodiment, the insulator may have a square tile form.

In yet another embodiment, the insulator has a "tatami" form. The receiver return electrode of the communications unit may be provided on a side face. The side face may be a rim of the insulator.

In yet another embodiment, stable electric potential may be provided to the transmitter return electrode and the receiver return electrode.

In yet another embodiment, the transmitter return electrode and the receiver return electrode may be connected to a plus power supply, minus power supply, a part having low impedance and stable electric potential, signal ground, a cabinet of the communications apparatus, or ground earth.

In yet another embodiment, the receiver return electrode may be positioned in a location where the communications apparatus and the communications unit cannot contact during communication between the communications apparatus and the communications unit.

In yet another embodiment, in a case that the transmitter main electrode of the communications apparatus is positioned near the receiver main electrode, the measuring part may measure the electric field between the receiver return electrode and the receiver return electrode generated by the electric field generated by the modulator.

The present invention also provides an electrode layout method for a communications unit, the communications unit comprising: a transmitter return electrode; a transmitter main electrode provided in a location so as to readily exert an electric effect on a dielectric; a receiver return electrode for establishing electrostatic coupling with the transmitter return electrode, a communications apparatus having the transmitter return electrode, the communications apparatus having a modulator for modulating an electric potential applied to the transmitter main electrode; a receiver main electrode provided in a location where the receiver main electrode is readily subject to an electric effect from the dielectric; a measuring part that measures electric status generated between the receiver main electrode and the receiver return electrode; a demodulator that acquires the electric signal based on the measurement result by the measuring part and acquires data transmitted from the communications apparatus by demodulating the electric signal, wherein the receiver return electrode is positioned in a location where the receiver return electrode cannot touch the dielectric during communication with the communications unit; the receiver main electrode of the communications unit is provided on the upper face of the insulator.

According to this embodiment, a return path is established by electrostatic coupling of the transmitter return electrode and the receiver return electrode, and receiver return electrode is positioned out of movable range of a dielectric.

Therefore, signals transmitted from the communication s apparatus can be received by the communications unit without discontinuance.

The present invention also provides a communications system, comprising an electric field communications system and a base station forming a communications network and communicating with the electric field communications apparatus, the electric field communications apparatus being a terminal of the communications network, wherein the base station comprises a transmitter main electrode provided in a location so as to readily exert an electric effect on a dielectric; a signal generator that generates an electric signal corresponding to data to be transmitted; a modulator that modulates an electric potential applied to the transmitter main electrode in response to electric signals corresponding to transmitted data, the modulator modulating at a regular interval the electric potential in response to an electric signal corresponding to notification information for notifying the existence of the base station; the electric field communications apparatus comprises: a receiver main electrode provided in a location where the receiver main electrode is readily subject to an electric effect from the dielectric; a measuring part that measures electric status generated at the receiver main electrode; a demodulator that acquires the electric signal based on the measurement result by the measuring part and acquires data transmitted from the communications apparatus by demodulating the electric signal; and notifying means that notifies that the electric field communications apparatus can communicate with the base station to a user of the electric field communications apparatus in a case that the notification information is continuously provided more than a predetermined duration.

In another embodiment, the measuring part may measure a voltage difference between the receiver main electrode and a predetermined electric potential.

The present invention also provides a communications system, comprising an electric field communications system and a base station forming a communications network and communicating with the electric field communications apparatus, the electric field communications apparatus being a terminal of the communications network, wherein the base station comprises a transmitter main electrode provided in a location so as to readily exert an electric effect on a dielectric; a transmitter return electrode connected to the base station; a signal generator that generates an electric signal corresponding to data to be transmitted; a modulator that modulates a voltage difference between the transmitter main electrode and the transmitter return electrode in response to electric signals corresponding to transmitted data, the modulator modulating at a regular interval the voltage difference in response to an electric signal corresponding to notification information for notifying the existence of the base station; the electric field communications apparatus comprises: a receiver main electrode provided in a location where the receiver main electrode is readily subject to an electric effect from the dielectric; a receiver return electrode for establishing return path with the transmitter return electrode; a measuring part that measures electric status generated between the receiver main electrode and the receiver return electrode; a demodulator that acquires the electric signal based on the measurement result by the measuring part and acquires data transmitted from the communications apparatus by demodulating the electric signal; and notifying means that notifies that the electric field communications apparatus can communicate with the base station to a user of the electric field communications apparatus in a case that the notification information is continuously provided more than a predetermined duration.

In another embodiment, the base station may further comprise an oscillator that applies AC voltage for charging the electric field communications apparatus to the transmitter main electrode and the transmitter return electrode, wherein the notification information includes information showing that the electric field communications apparatus can be charged at the base station; the electric field communications apparatus comprises: a rectifier that converts AC voltage to DC voltage, the AC voltage induced between the receiver main electrode and the receiver return electrode; and a battery that is charged by the AC voltage generated by the rectifier; and the notifying means notifies that the electric field communications apparatus can be charged at the base station in a case that the notification information is continuously provided more than a predetermined duration.

In yet another embodiment, the measuring part may measure a voltage difference between the receiver main electrode and the receiver return electrode generated by the electric field provided to the dielectric.

In another embodiment, the measuring part may comprise: an electro-optical crystal that exhibits a Pockels Effect and modulates light penetrating the electro-optical crystal in response to an electric field in the space where the electro-optical crystal is located light emitting means that emits light to the electro-optical crystal; light emitting means that emits light to the electro-optical crystal; and light receiving means that receives light penetrating the electro-optical crystal, and output signals in response to the received light.

The present invention also provides an electric field communications apparatus for communicating with a base station having a transmitter main electrode provided in a location so as to readily exert an electric effect on a dielectric, a modulator that modulates an electric potential applied to the transmitter main electrode in response to an electric signal corresponding to data to be transmitted, the modulator modulating at a regular interval the electric potential in response to notification information for notifying the existence of the base station, the base station providing to the dielectric an electric field in response to the electric potential generated by the modulator, wherein the electric field communications apparatus comprising: a receiver main electrode provided in a location where the receiver main electrode is readily subject to an electric effect from the dielectric; a measuring part that measures electric status generated at the receiver main electrode; a demodulator that acquires the electric signal based on the measurement result by the measuring part and acquires data transmitted from the communications apparatus by demodulating the electric signal; and notifying means that notifies that the electric field communications apparatus can communicate with the base station to a user of the electric field communications apparatus in a case that the notification information is continuously provided more than a predetermined duration.

In another embodiment, the measuring part may measure a voltage difference between the receiver main electrode and a predetermined electric potential.

The present invention also provides an electric field communications apparatus for communicating with a base station having a transmitter main electrode provided in a location so as to readily exert an electric effect on a dielectric, a transmitter return electrode; a modulator that modulates a voltage difference between the transmitter main electrode and the transmitter return electrode in response to an electric signal corresponding to data to be transmitted, the modulator modulating at a regular interval the voltage difference in response to notification information for notifying the existence of the base station, the base station providing to the dielectric an electric field in response to the voltage difference generated by the modulator, wherein the electric field communications apparatus comprising: a receiver main electrode provided in a location where the receiver main electrode is readily subject to an electric effect from the dielectric; a receiver return electrode for establishing return path with the transmitter return electrode; a measuring part that measures electric status between the receiver main electrode and the receiver return electrode; a demodulator that acquires the electric signal based on the measurement result by the measuring part and acquires data transmitted from the communications apparatus by demodulating the electric signal; and notifying means that notifies that the electric field communications apparatus can communicate with the base station to a user of the electric field communications apparatus in a case that the notification information is continuously provided more than a predetermined duration.

In another embodiment, the notifying means may control a display to display information showing that the electric field communications apparatus can communicate with the base station in a case that the notification information is received by the demodulator more than a predetermined time duration.

In another embodiment, the base station may further comprise an oscillator that applies AC voltage for charging the electric field communications apparatus to the transmitter main electrode and the transmitter return electrode, wherein the notification information includes information showing that the electric field communications apparatus can be charged at the base station; the electric field communications apparatus comprises: a rectifier that converts AC voltage to DC voltage, the AC voltage induced between the receiver main electrode and the receiver return electrode; and a battery that is charged by the AC voltage generated by the rectifier; and the notifying means notifies that the electric field communications apparatus can be charged at the base station in a case that the notification information is continuously provided more than a predetermined duration.

In yet another embodiment, the notifying means may control a display to display information showing that the electric field communications apparatus can communicate with the base station in a case that the notification information is continuously provided more than a predetermined duration.

In yet another embodiment, the dielectric may be a human body.

In yet another embodiment, the electric field communications apparatus may be positioned in a location where the transmitter main electrode is located near the receiver main electrode. The receiver return electrode may receive an electric effect by the electric field generated by the modulator not through the dielectric but directly.

In yet another embodiment, the measuring part may measure a voltage difference between the receiver main electrode and the receiver return electrode generated by the electric field provided on the dielectric.

In another embodiment, the measuring part may comprise: an electro-optical crystal that exhibits a Pockels Effect and modulates light penetrating the electro-optical crystal in response to an electric field in the space where the electro-optical crystal is located light emitting means that emits light to the electro-optical crystal; light emitting means that emits light to the electro-optical crystal; and light receiving means that receives light penetrating the electro-optical crystal, and output signals in response to the received light.

In yet another embodiment, the receiver main electrode and the receiver return electrode may be positioned in location where the receiver main electrode faces to the receiver return electrode, the electro-optical crystal may be located between the receiver main electrode and the receiver return electrode.

In yet another embodiment, the communications unit may further comprise: a destination electrode that is connected to the receiver main electrode and has the same electric potential as the receiver main electrode; a return electrode that is connected to the receiver return electrode and has the same electric potential as the receiver return electrode. Also, the destination electrode may face to the return electrode and the electro-optical crystal may be positioned between the destination electrode and the return electrode.

In yet another embodiment, the electro-optical crystal may have a pillar form. At least one of the destination electrode and the return electrode may have size and a form smaller than a cross section of the electro-optical crystal, the cross section being orthogonal to light path in the electro-optical crystal.

In yet another embodiment, the receiver return electrode may establish return path using electrostatic coupling with the transmitter return electrode through the air.

In yet another embodiment, the same and stable electric potential may be applied to the receiver return electrode and the transmitter return electrode.

According to the invention, the electric field communications apparatus notifies to a user that the electric field communications apparatus can communicate with the base station in a case that the notification information is continuously provided more than a predetermined duration.

DESCRIPTION OF THE PREFERRED EMBODIMENTS

1. Configuration of the First Preferred Embodiment

A first embodiment will be described with reference to the drawings.

Figure 1:
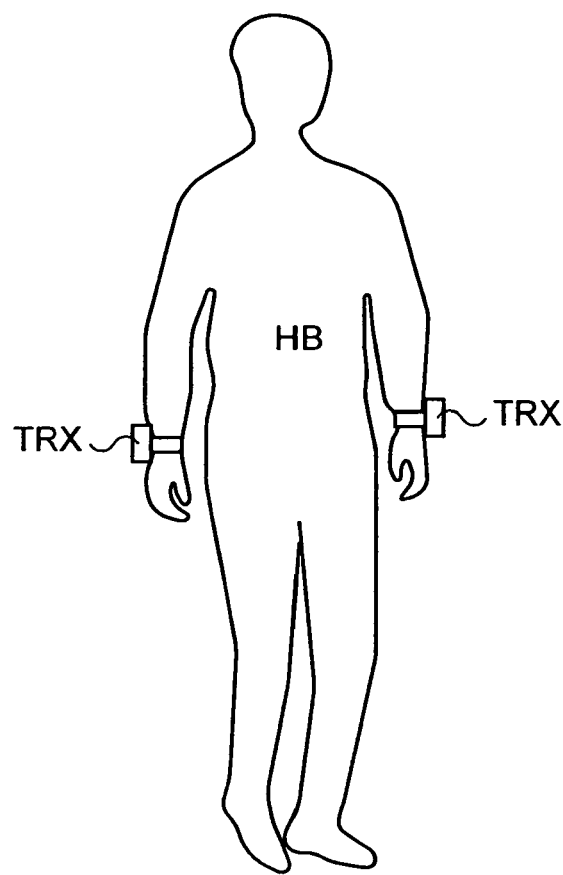
FIG. 1 shows an example of electric field communications apparatus TRX.

FIG. 1 shows an example of electric field communications apparatus TRX according to the present embodiment. As shown in FIG. 1, the electric field communications apparatus TRX is worn on human body HB. The electric field communications apparatus TRX can emit electric fields that vary in frequency from the tens of kHz to the multiples of MHz indicated for good conduction in the human body, and can detect electric fields that reach TRX through human body HB. Accordingly, several electric field communications apparatus TRX can perform communications through human body HB.

Electric field apparatus TRX can use a dielectric as a transmission medium, if the dielectric has conductivity through certain frequencies. Accordingly, electric field communications apparatus TRX can be placed in various locations, even outside the human body 1B, such as the walls, floors and ceilings of rooms. As well, electric field communications apparatus TRX can also assume return paths using electrostatic coupling through the air, and can ensure a return path through a dielectric.

Figure 2:
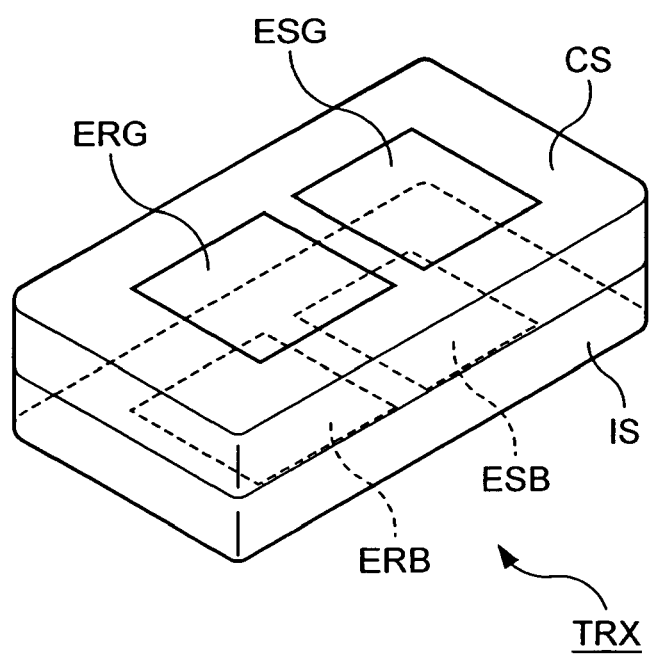
FIG. 2 is a perspective view showing the exterior of electric field apparatus TRX.

FIG. 2 is a perspective view of the exterior of an electric field communications apparatus TRX.

Cabinet CS takes the form of a box covered with an insulator IS. Transmitter main electrode ESB and receiver main electrode ERB are provided on the lower side of cabinet CS, through conductor IS. Transmitter return electrode ESG and receiver return electrode ERG are established on the upper side of cabinet CS, through insulator IS. In the above configuration, transmitter main electrode ESB and receiver main electrode ERB, and transmitter return electrode ESG and receiver return electrode ERG, are isolated from each other by insulator IS. Here, it is preferable that transmitter main electrode ESB and receiver main electrode ERB be positioned so as to separate them as much as possible from the circuitry of cabinet CS and its interior. Insulator IS also has the function of guaranteeing a distance between other apparatus and transmitter main electrode ESB and receiver main electrode ERB. The reasons for this will be explained in more detail below.

When a voltage difference is generated between transmitter main electrode ESB and transmitter return electrode ESG, an electric field is radiated in response this voltage difference. This electric field extends to a greater distance through the human body HB. Transmitter return electrode ESG uses electrostatic coupling through the air to establish a return path. When worn on a human body HB, transmitter return electrode ESG tends to face outward toward the environment of the room.

The electric field radiated by transmitter main electrode ESB reaches out to the maximum distance, in the case where transmitter main electrode ESB is in direct contact with human body HB. However, the electric field radiated by transmitter main electrode ESB extends some distance through the human body HB, since the electric field reaches human body HB even in the case where it passes through a number of layers of, for example, clothing. In this case, the electric field range is somewhat reduced, but it allays user concerns about electric shocks and skin allergies. As well, for the same reasons, the surfaces of transmitter main electrode ESB and transmitter return electrode ESG may be covered with the thin insulator.

Figure 3:
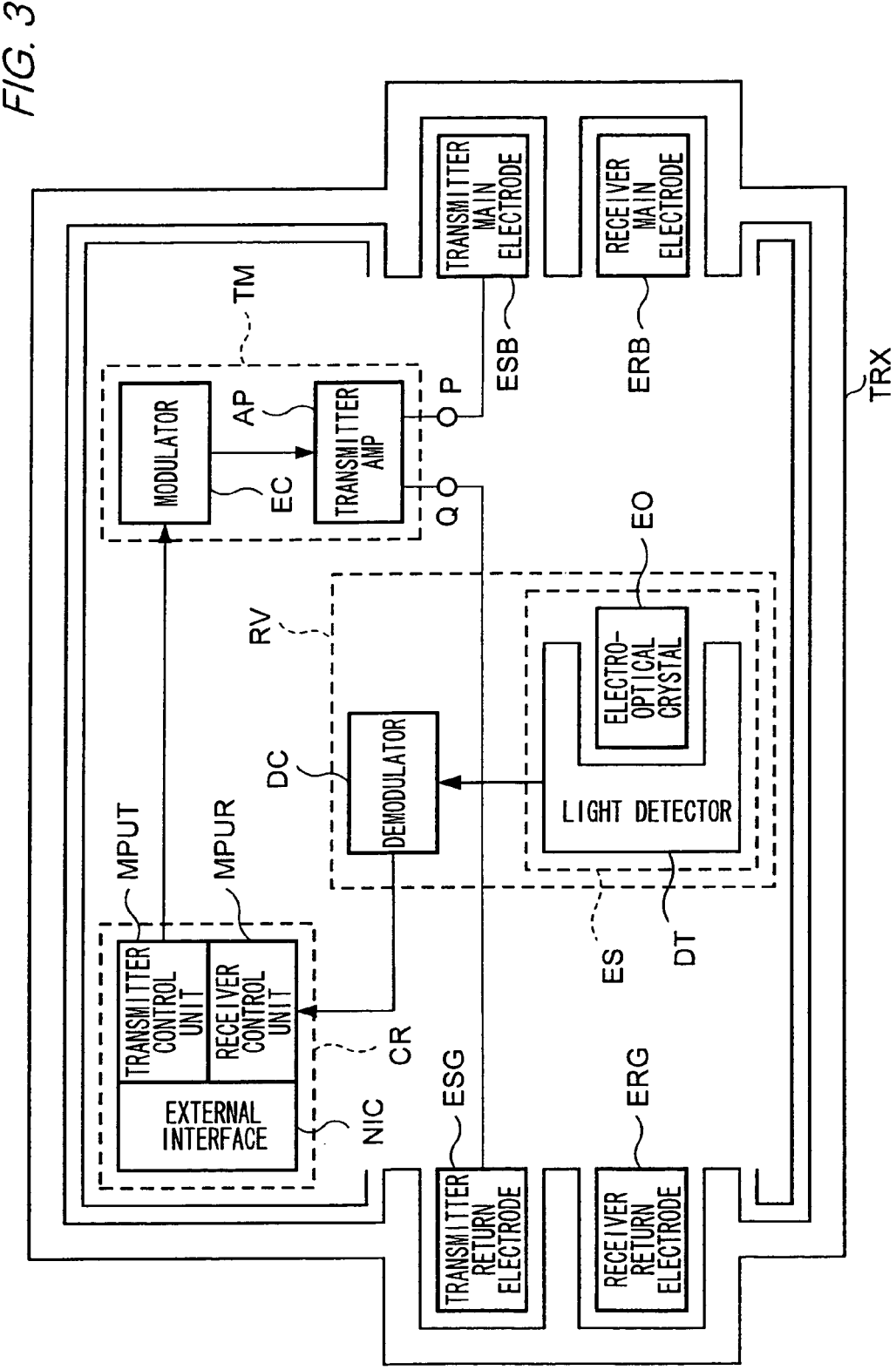
FIG. 3 is a block diagram showing an electronic configuration of electric field apparatus TRX.

FIG. 3 is a block diagram of the electronic configuration of electric field communications apparatus TRX.

As shown in FIG. 3, electric field communications apparatus TRX comprises external interface NIC, control unit CR, transmitter TM and receiver unit RV.

The external interface NIC is an interface that performs the receiving and transmitting of data to and from external devices using Ethernet (trademark) protocols. External interface NIC can be connected to any kind of device capable of connections in compliance with 10Base-2, which is an Ethernet standard. For example, a communications terminal (not shown) can be connected with electric field communications apparatus TRX through the external interface NIC. In this case, the communications terminal recognizes electric field communications apparatus TRX as an Ethernet device. Moreover, while in this case it is recognized as 10Base-2-compliant, it may use 10Base-T or 10Base-5.

Control unit CR comprises a transmitter control unit MPUT and a receiver control unit MPUR.

Transmitter control unit MPUT controls the transmission of data sent to other electric field communications apparatus TRX. More specifically, transmitter control unit MPUT converts data that must be sent to other electric field apparatus TRX into transmission signals. Then, transmitter control unit MPUT provides transmission signals to transmission part TM. When receiver control unit MPUR receives signals from receiver unit RV, receiver control unit MPUR demodulates data from the received signals. Receiver control unit MPUR performs an operation in response to the demodulated data. For example, in the case where image data is obtained from the transmitted signals received, receiver control unit MPUR displays that data using a display apparatus (not shown). As another example, in the case where sound data is obtained from the transmitted signals received, MPUR controls speakers (not shown) to output sounds based on the data.

Transmitter TM comprises a modulator EC and a transmitter amplifier AP.

Modulator EC modulates carrier waves based on the transmitter signals that is input from transmitter control unit MPUT. As for the modulation system used when modulator EC modulates carrier waves, any frequency range may be freely selected if the main signal frequency range is above some tens of kHz which shows good conductivity for the human body. The 10Base-2 system widely used with Ethernet, is used in the present embodiment. As well, if a frequency that does not easily admit noise from the environment is selected, the communications quality for the frequency of the carrier waves can be stabilized. Modulator EC outputs to transmitter amplifier AP modulated signals.

Transmitter return electrode ESG is connected to the transmitter amplifier terminal Q. Thus, a voltage difference arises between transmitter main electrode ESB and transmitter return electrode ESG. The voltage difference is radiated into the surrounding airspace. Transmitter return electrode ESG can be connected to not only transmitter amplifier terminal Q but also to low-impedance signal sources such as a positive power supply and a negative power supply, or cabinet CS. By connecting transmitter return electrode ESG to the low impedance signal source as described above, it is possible to stabilize the radiated electric field.

Moreover, if the transmitted electric field is sufficiently stabilized, transmitter return electrode ESG may be connected to none of the signal sources. As well, in order to prevent attenuation of the electric field caused by shorting, it is necessary to insulate human body HB and transmitter main electrode ESB from cabinet CS and transmitter return electrode ESG. Alternatively, terminal P of transmission amplifier AP may be connected to transmitter return electrode ESG, and terminal Q may be connected to transmitter main electrode ESB. In this case, the polarity of the radiated electric field becomes the reverse of that in the above case. However, it is possible to perform ordinary communications by using modulation systems such as FM that are unrelated to electric field polarity, or by using an polarity inversion circuit in transmitting and receiving circuits.

When a signal from the modulator EC is input to transmitter amplifier AP, transmitter amplifier AP amplifies the signal, and generates a voltage difference between terminal P and terminal Q in response to the amplified signal.

Figure 4:
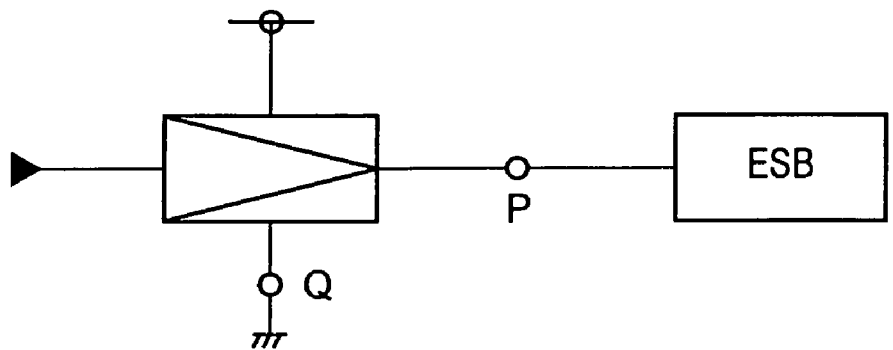
FIG. 4 shows an electronic configuration of transmitter amplifier AP.

FIG. 4 shows the electronic configuration of transmitter amplifier AP. The transmitter amplifier AP shown in FIG. 4 is preferable for a modulation system having amplitude values that are continued. When the driving voltage of transmitter amplifier AP is high, it becomes possible for transmitter amplifier AP to amplify the amplitude of the transmission signal. As shown in FIG. 4, terminal P of transmitter amplifier AP is connected to transmitter main electrode ESB. Accordingly, when the signal modulated by transmitter amplifier AP is input, an electric field is radiated toward human body HB, in response to the voltage difference generated between terminal P and terminal Q. Moreover, while it is preferable that transmission voltage for electric field communications apparatus TRX be high, the electric current that flows through the transmitter electrodes is insignificantly small. Accordingly, the power supply capacity for transmitter amplifier AP need not be high.

Moreover, the connection unit for terminal Q may be something that indicates a stabilized voltage. For example, even apart from the above-mentioned configurations, if the unit indicates an electric potential that is stabilized and has low impedance, it is possible to connect this unit to terminal Q. As well, terminal Q may be connected to the plus power supply or the minus power supply, and may maintain the power supply electric potential. Furthermore, in the case where there is some difficulty in maintaining the electric potential stabilized in the electric potential of terminal Q, terminal Q may be connected to nothing and may maintain the electric potential of the air.

Next, receiver unit RV comprises electric field sensor ES and demodulator DC.

Electric field sensor ES can detect extremely weak electric fields. In the case where an electric field radiated by other electric field apparatus has reached electric field sensor ES, electric field sensor ES measures the change in the electric field. Electric field sensor ES obtains from the measured changes the modulated signal, and outputs the modulated signal to the demodulator DC. When demodulator DC receives a signal from electric field sensor ES, demodulator DC acquires the transmitted original signal, by demodulating the signal.

As shown in FIG. 3, electric field sensor ES comprises an electro-optical crystal EO and a light detector DT.

Electro-optical crystal EO is a crystal such as BSO (Bi12SiO20), BTO (Bi12TiO20), CdTi, CdTe, or DAST (dimethylamino-stilbazolium tosylate), showing the so-called Pockels Effect in which the crystal changes its refractive index in proportion to changes in the electric field.

The light detector comprises a light emitting device, for example a laser diode, that emits a laser beam on electro-optical crystal EO and a light sensing device, for example a photo detector, that detects light from the light emitting device.

Figure 5:
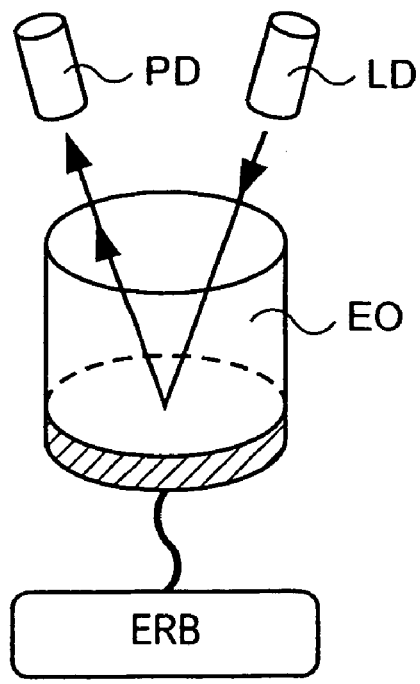
FIG. 5 shows the mechanical configuration of electric field sensor ES.

FIG. 5 shows the mechanical configuration of the electric field sensor ES.

The laser beam impinging on electro-optical crystal EO from light emitting device LD, reflects from the interior of electro-optical crystal EO, passes through a polarization plane provided in light sensing device PD, and impinges on light sensing device PD. At this time, if the refractive index of the electro-optical crystal EO changes, the polarity of the laser light beam passing through electro-optic crystal EO changes in response to the change of the refractive index. As a result, the intensity of the laser light beam passing through the polarization plane changes. By measuring the change of the intensity, light detector DT can detect changes in the electric field.

Electric field sensor ES, acquires the signal as described below.

For example, it is assumed that a voltage difference between receiver main electrode ERB and receiver return electrode ERG has arisen inside the electric field radiated from another electric field communications apparatus TRX. Then, the refractive index of the electro-optical crystal changes in response to the voltage difference, and the polarity condition of the laser light beam changes. Light detector DT measures the change in this polarity condition. The change in the refractive index is based on the change in the electric field, and this voltage difference is based on signals modulated by electric field communications apparatus TRX that radiated the electric field. Accordingly, if the measured result from light detector DT is demodulated by a 10Base-2 system, demodulator DC acquires the originally transmitted signal.

Moreover, the method by which the electric field sensor, constructed from electro-optical crystal EO and light detector DT, senses the electric field, is well-known and similar to the method disclosed in Japanese Patent Application Laid-Open Publication No. 8-262117.

In addition, the electric field communications apparatus TRX of the present invention has a structure for increasing the sensitivity for sensing electric fields. By the structure, electro-optic crystal EO can sufficiently detect electric field changes. This will be described below.

First, even in the case where the electro-optic crystal EO does not have receiver return electrode ERG, it is theoretically capable of performing communications. However, in this case, the electro-optical crystal EO cannot sufficiently sense electric fields, and the communication range of the electric field communications apparatus TRX is reduced.

Figure 6:
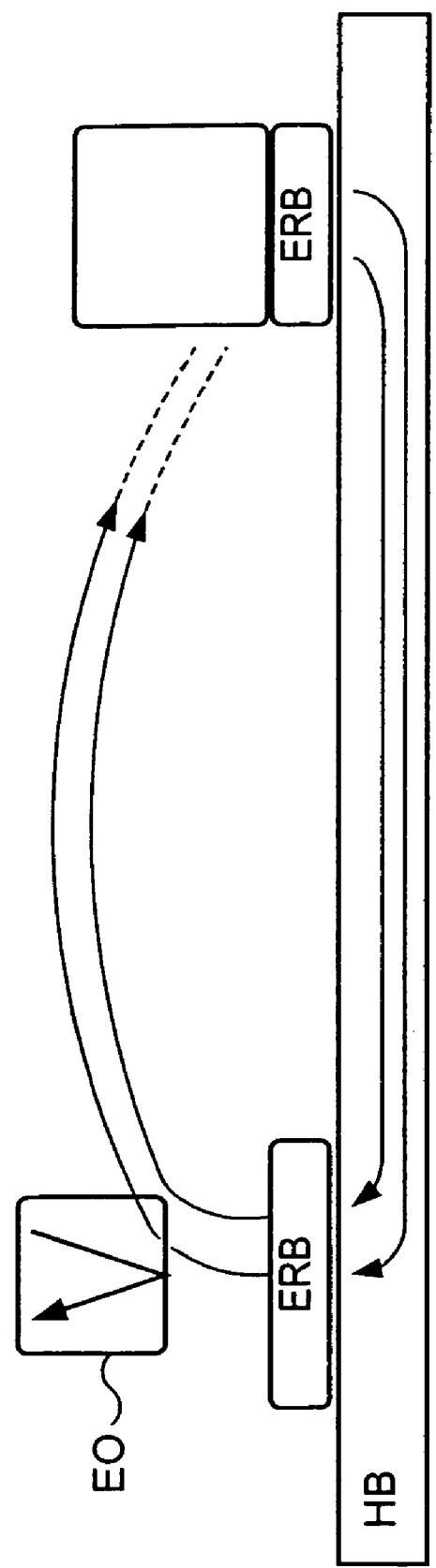
FIG. 6 shows in general form the state of the electric field sensor when sensing an electric field in the case where a receiver return electrode ERG is not provided.

FIG. 6 shows in a general way the state of an electric field sensor ES sensing an electric field, in the case where receiver return electrode ERG is not provided. In a case where receiver return electrode ERG is not provided, as shown in FIG. 6, the electric field that reached electro-optic crystal EO through receiver main electrode ERB immediately passes the face of the electro-optical crystal EO and enters the return path when the electric field passes though receiver main electrode ERB. The fact that an electric field enters the return path without passing sufficiently through electro-optical crystal EO means that the influence the electro-optical crystal EO receives from the electric field is small. The fact that the influence that the electro-optic crystal EO receives from the electric field is small means that the change of the refractive index of the electro-optic crystal EO is small. It means that the reception sensitivity of the electric field communications apparatus TRX does not increase.

On the other hand, by providing a receiver return electrode ERG as in the configuration shown in FIG. 3, it becomes possible for electric field sensor ES to sense the electric field sufficiently. As a result, the communication range of electric field communications apparatus TRX is expanded.

Figure 7:
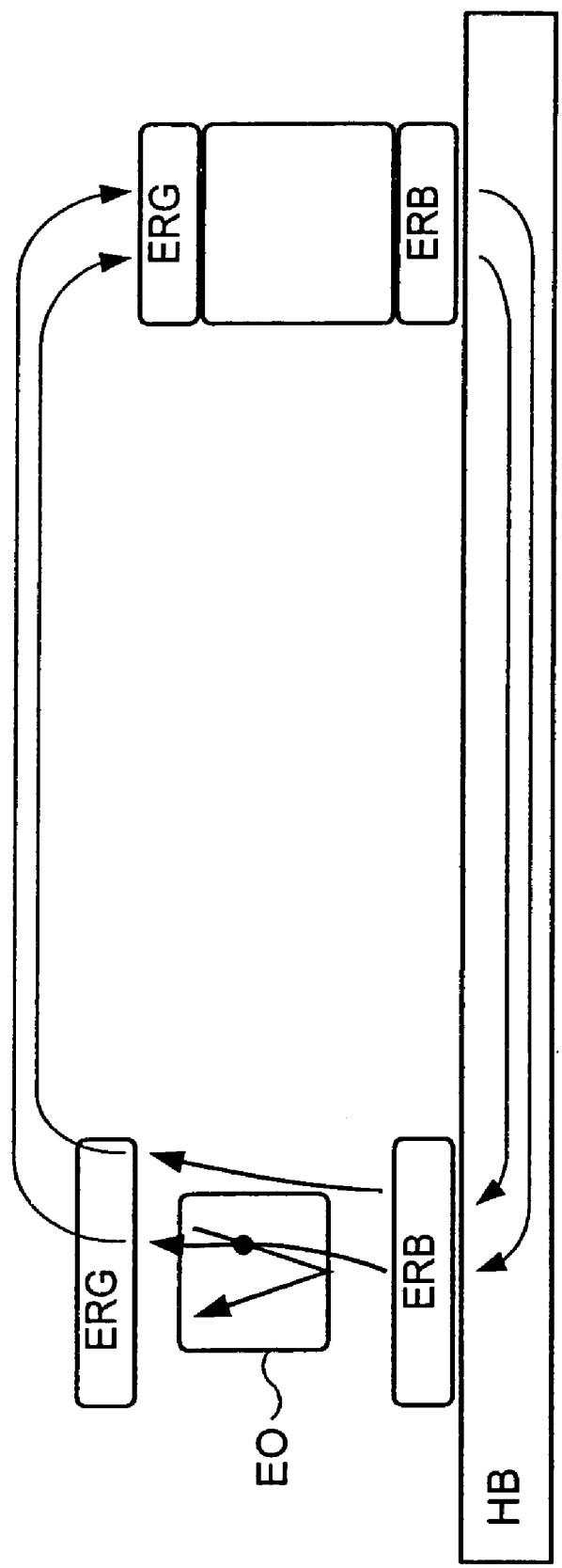
FIG. 7 shows in general form the state of the electric field sensor when sensing an electric field in the case where a receiver return electrode ERG is provided.

FIG. 7 schematically shows the situation where the electric field sensor ES senses an electric field in the case where receiver return electrode ERG is provided. In FIG. 7, receiver main electrode ERB is positioned in the neighborhood of human body HB similarly to transmitter main electrode ESB. Receiver return electrode ERG is positioned facing the surface of cabinet CS in the environment airspace, similarly to transmitter return electrode ESG. As well, electric field sensor ES is positioned so that it can be interposed between receiver return electrode ERG and receiver main electrode ERB. Here, in order to prevent attenuation of the electric field by shorting, cabinet CS and receiver return electrode ERG must be insulated from human body HB and receiver main electrode ERB.

In the case of the configuration shown in FIG. 7, a return path is established by electrostatic coupling through the air between transmitter return electrode ESG and receiver return electrode ERG. Accordingly, the electric field force lines leaving receiver main electrode ERB are drawn into receiver return electrode ERG. As a result, compared with the case of FIG. 6, it increases the number of the electric field force lines going through electro-optical crystal EO. At this time, light detector DT senses the changes in the polarization state and the intensity of the light comes through electric field sensor ES, and senses the change in the electric field that is going through electric field sensor ES, as a change of the electric signal.

Now, it becomes able to efficiently lead the electric field that reached receiver main electrode ERB to electric field sensor ES, in a case that electrode EOB is provided to one part of electric field sensor ES and is electrically connected to receiver main electrode ERB, as well as the configuration of FIG. 3.

Figure 8:
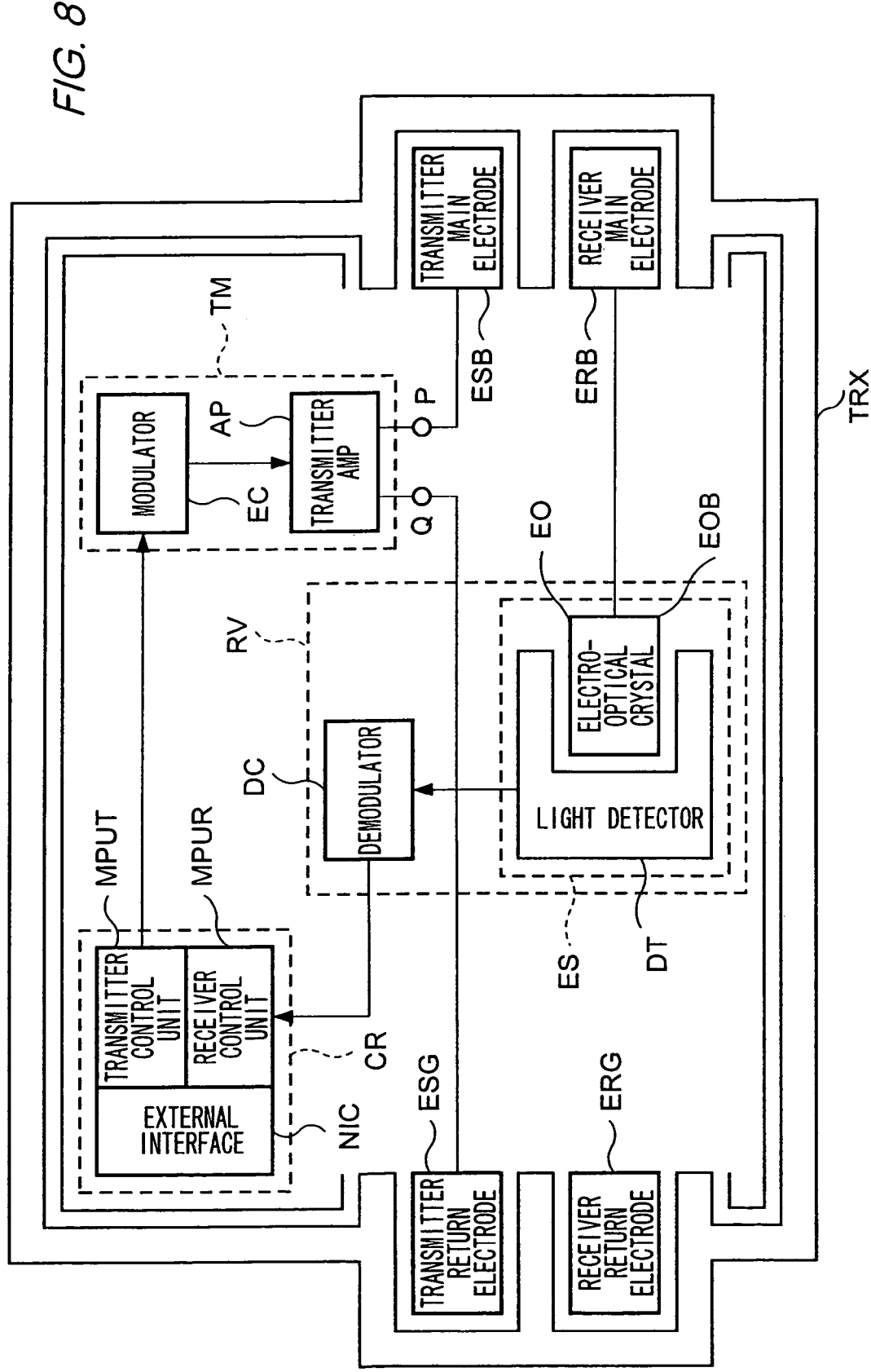
FIG. 8 is a block diagram showing the configuration in the case where electrode EOB connects with receiver main electrode ERB.

FIG. 8 is a block diagram showing the configuration in the case where electrode EOB is electrically connected to receiver main electrode ERB. Then, FIG. 9 depicts in general form the situation of electric field sensor ES sensing the electric field in the case where electrode EOB is electrically connected to receiver main electrode ERB.

Figure 9:
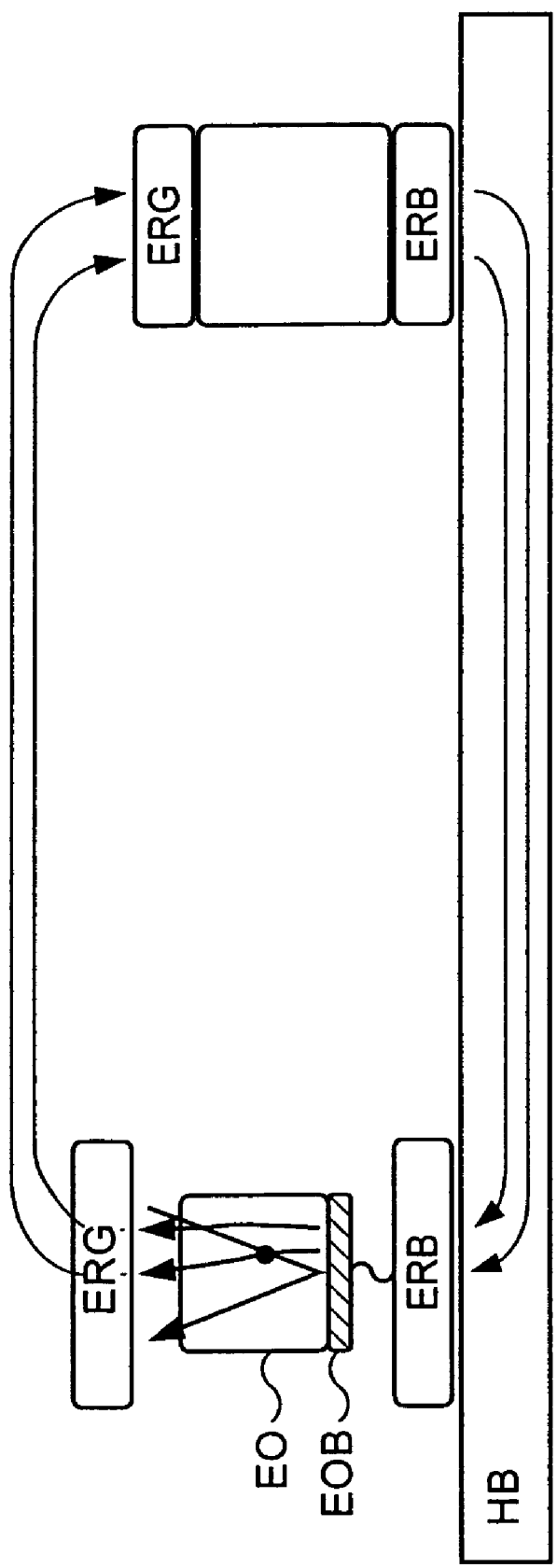
FIG. 9 shows in general form the state of the electric field sensor sensing an electric field in the case where electrode EOB connects with receiver main electrode ERB.

As shown in FIG. 9, the electric field that reached electro-optical crystal EO through receiver main electrode ERB is attracted in the direction where the receiver return electrode has been placed, by the electric potential of electrode EOB. Thus, a large amount of the electric field can be attracted by the electro-optical crystal EO.

Furthermore, providing electrode EOG to an opposing part of electrode EOB, it becomes able to efficiently lead the electric field to the electric field sensor ES, by electrically connecting electrode EOG with receiver return electrode ERG.

Figure 10:
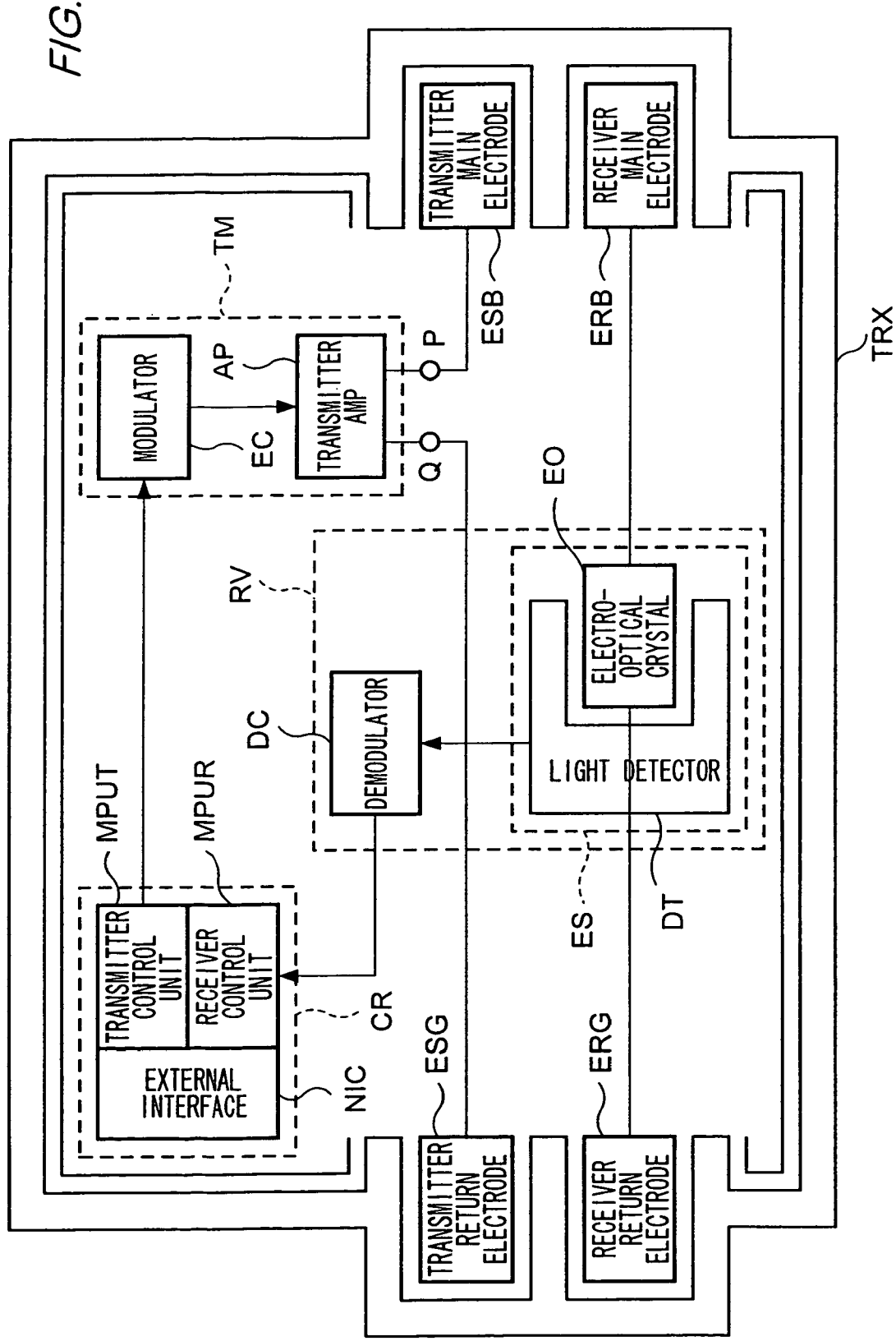
FIG. 10 is a block diagram showing a configuration in the case where electrode EOG connects electrically with receiver return electrode ERG.
Figure 11:
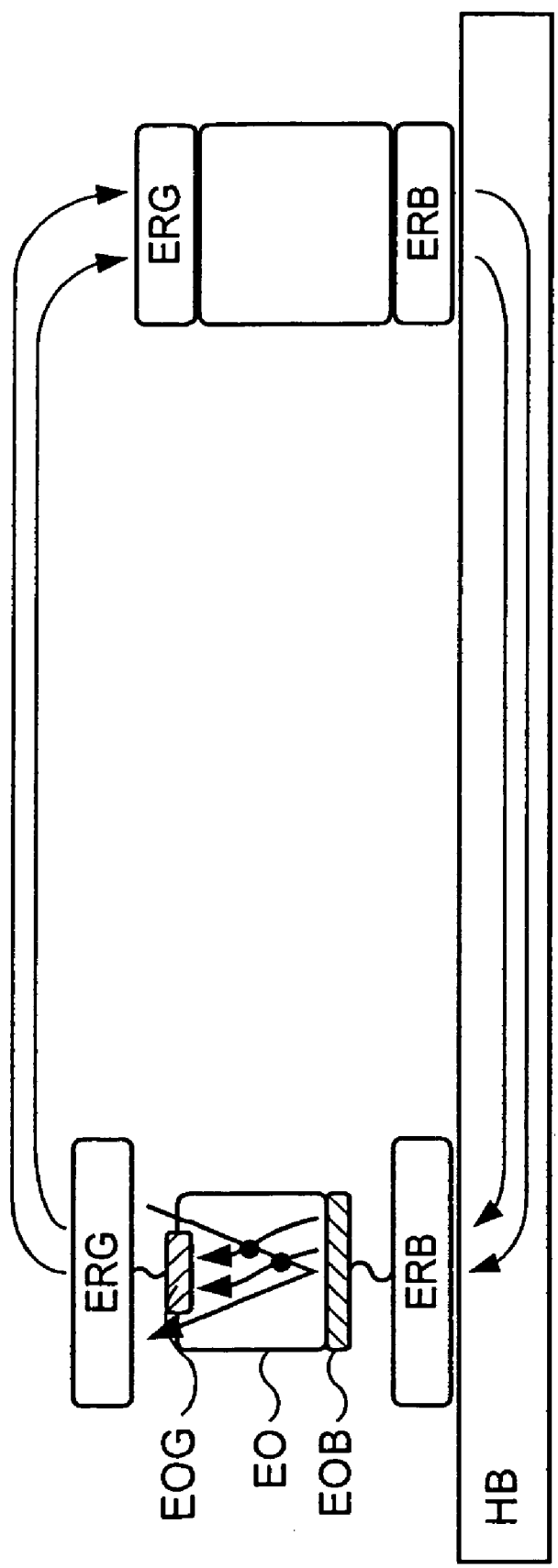
FIG. 11 shows in general form the state where electric field sensor ES senses an electric field, in the case where electrode EOG connects electrically with receiver return electrode ERG.

FIG. 10 is a block diagram showing the configuration in the case of electrode EOG and a receiver return electrode being electrically connected. As shown in FIG. 10, an electrode EOG slightly smaller than the size of that surface is provided on the surface of the electro-optic crystal EO. FIG. 11 schematically shows the state of electric field sensor ES sensing an electric field, in the case of electrode EOG being connected to receiver return electrode ERG.

As shown in FIG. 11, the electric field force lines reaching receiver main electrode ERB are attracted to the location where the electro-optic crystal EO has been placed by the electric potential of electrode EOB, and, moreover, they are attracted in the direction where receiver return electrode ERG has been placed, by the electric potential of electrode EOG. As a result, one can increase the number of electric field lines that pass through the electro-optical crystal EO, and electric field sensor ES becomes able to sense the electric field more sufficiently.

In addition, for the various embodiments above, it is also possible to connect receiver return electrode ERG to a low-impedance signal source such as the signal ground for the circuit provided in electric field communications apparatus TRX, plus power supply or minus power supply, cabinet CS, and so on. By connecting receiver return electrode ERG to a low-impedance signal source, it becomes possible to stabilize the electric field being led to electric field sensor ES.

Figure 12:
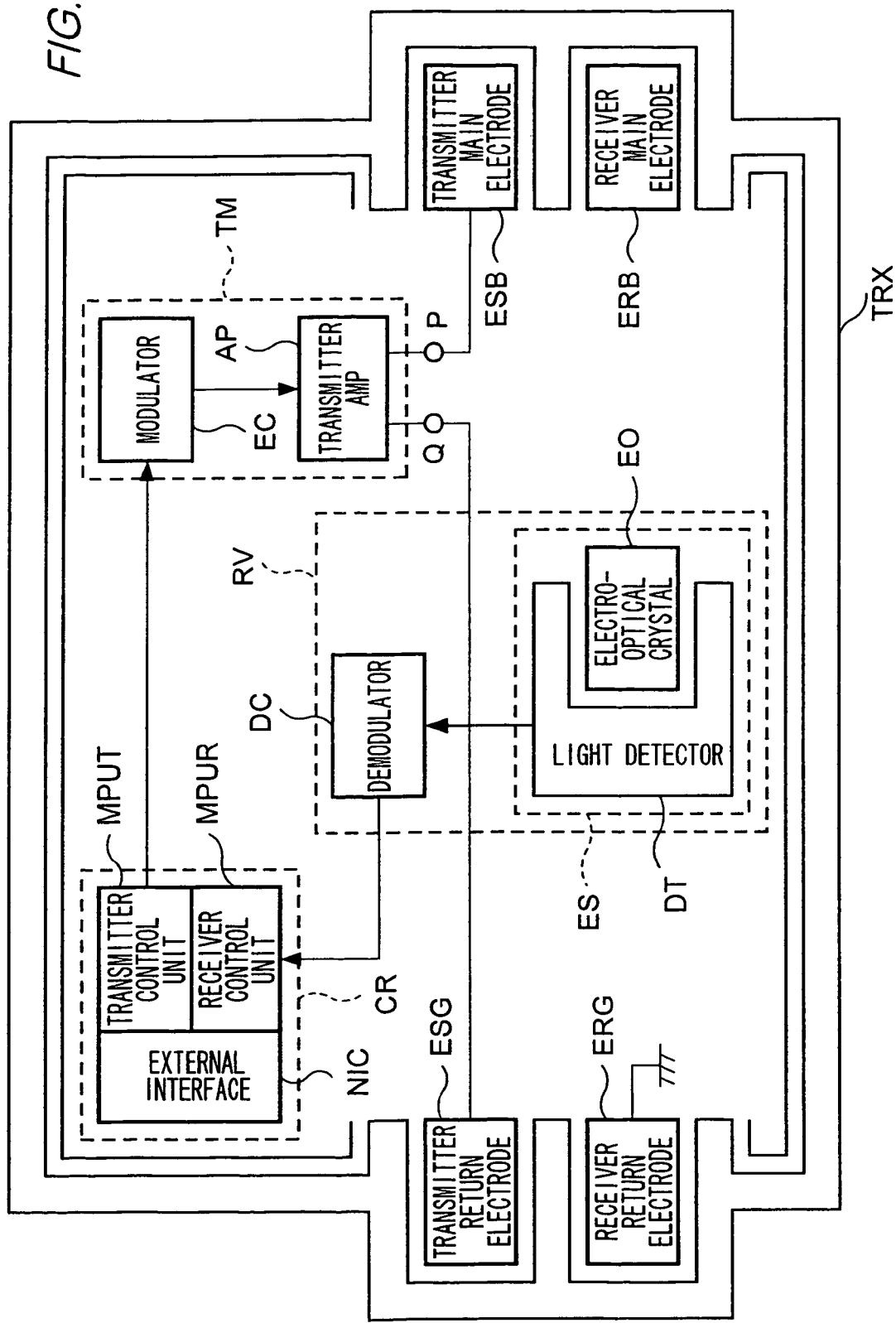
FIG. 12 is a block diagram illustrating one embodiment in the case where the receiver return electrode ERG is connected to a low-impedance signal source.
Figure 13:
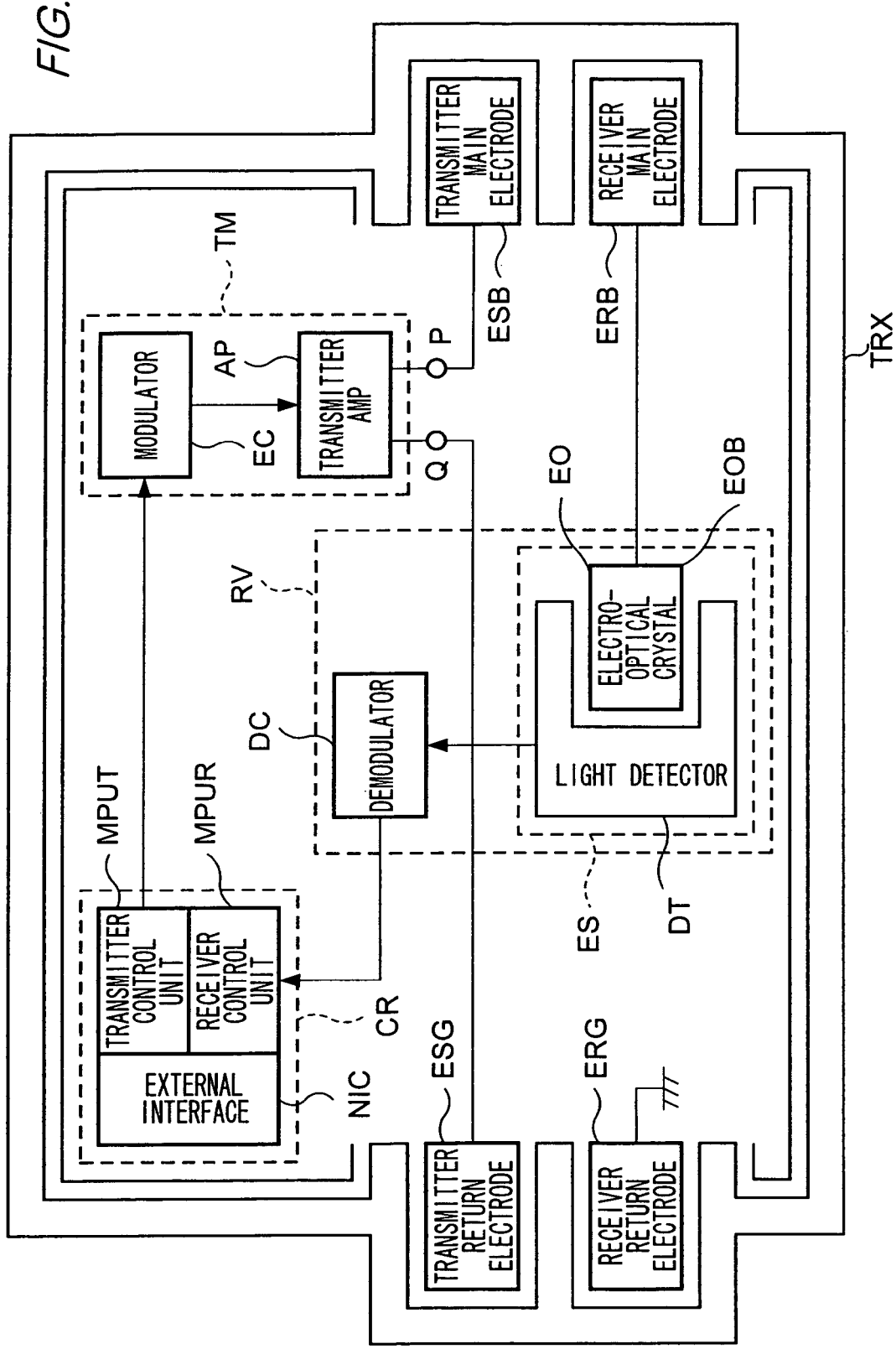
FIG. 13 is a block diagram illustrating one embodiment in the case where the receiver return electrode ERG is connected to a low-impedance signal source.
Figure 14:
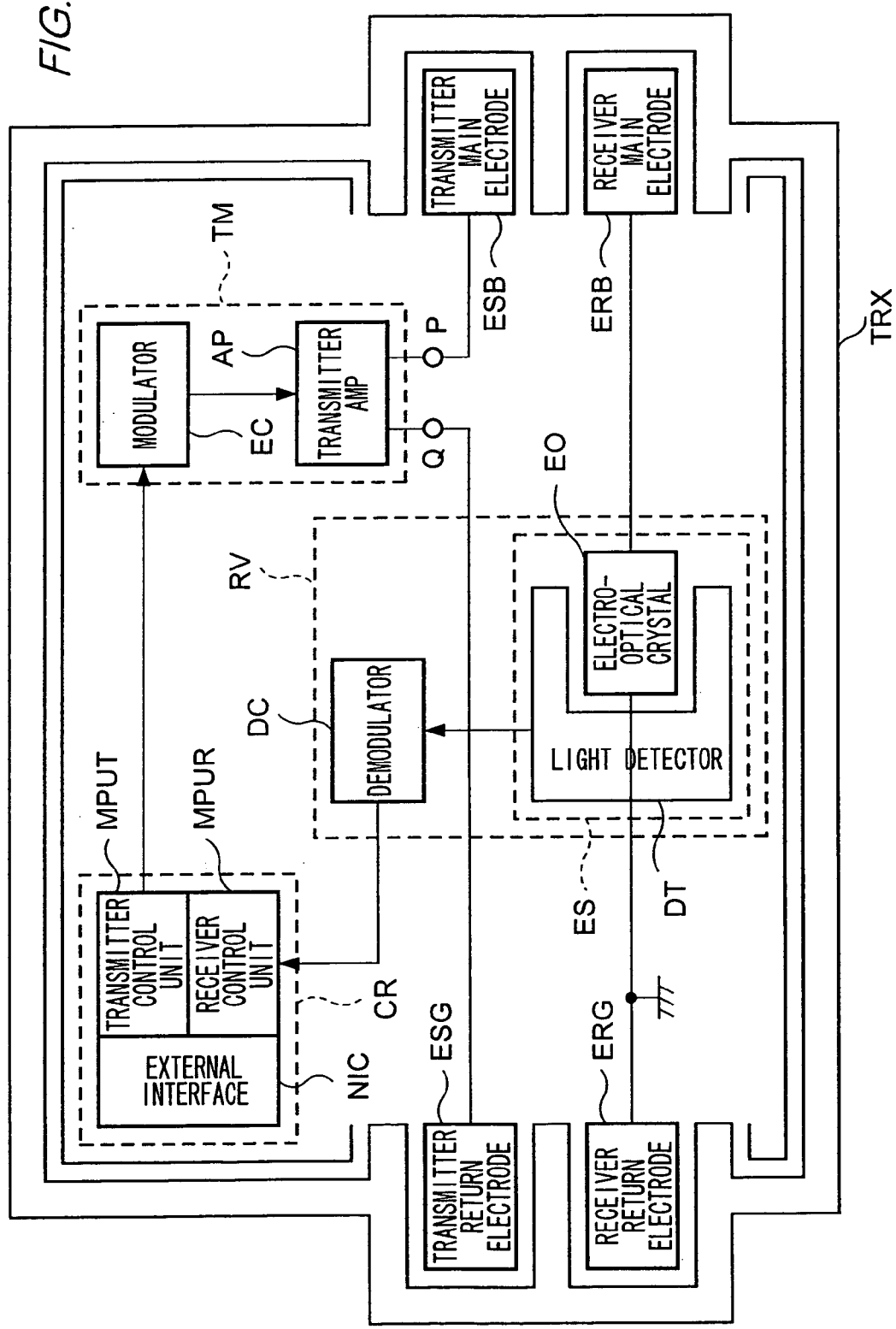
FIG. 14 is a block diagram illustrating one embodiment in the case where the receiver return electrode ERG connects to a low-impedance signal source.

FIGS. 12-14 are block diagrams that explain various embodiments in the case where receiver return electrode ERG connects to low-impedance signal sources. FIG. 12 shows an example of the connections in the case where an electrode is not provided in electric field sensor ES. FIG. 13 shows an example of the connections in the case where electric field sensor ES is provided with an electrode EOB. FIG. 14 shows an example of the case where electric field sensor ES is provided with an electrode EOB and an electrode EOG.

Alternatively, receiver return electrode ERG may be placed facing the human body HB and receiver main electrode ERB may be placed facing the airspace of the environment. In this case, though the polarity of the electric field sensed is reversed, they may use a modulation method such as FM, which is unrelated to polarity, or the like, or they may have a polarity inversion circuit in any of several transmitting and receiving circuits. The atmosphere is the dielectric, electric field communications apparatus TRX can communicate normally.

As well, by regulating the shape and layout of the transmitter main electrode ESB, the receiver main electrode ERB and the receiver return electrode ERG, electric field communications apparatus TRX can have a construction that permits electric fields to pass efficiently through electro-optical crystal EO. The electrodes may have any kind of shape and any layout.

With the above configuration, electric field communications apparatus TRX will be able to sense electric fields sufficiently, using high sensitivity electric field sensors. As a result, the communication range of electric field communications apparatus TRX can be greatly extended compared to current apparatus.

2. Operations of the First Embodiment

Next, typical concrete implementations and the operations of electric field communications apparatus TRX whose configuration was described above, will be described. For purposes of providing a detailed explanation, examples of a variety of different devices for electric field communications apparatus TRX1-TRX5 will be considered, and the communications for this range of electric field communications apparatus TRX will be described.

Electric field communications apparatus TRX1 comprises a handheld keyboard such as a corded keyboard. Electric field communications apparatus TRX1 can be used as an input interface, and various data can be entered. As well, electric field communications apparatus TRX1 has a speaker and has sound output capability.

Electric field communications apparatus TRX2 has installed nonvolatile memory such as Flash memory. The nonvolatile memory can record a variety of information. In other words, electric field communications apparatus TRX2 can be used as a storage device.

Electric field communications apparatus TRX3 has a communications interface, such as a wireless LAN (Local Area Network) interface or a mobile phone (neither is shown). Electric field communications apparatus TRX3 can be used as a gateway for communications between other communications terminals and a constructed LAN, and for communications through a WAN (Wide Area Network) such as the Internet.

Electric field communications apparatus TRX4 comprises a head-mounted display having a small display device constructed using film-shaped liquid crystal display, or the like. In other words, electric field communications apparatus TRX4 can be used as a display apparatus.

Electric field communications apparatus TRX5 is constructed as an indoors-use type of apparatus. The receiver main electrode and receiver return electrodes of electric field communications apparatus TRX5 are placed on the room floor surfaces, wall surfaces, and ceiling surfaces. Electric field communications apparatus TRX5, similarly to electric field communications apparatus TRX3, can be used for communication between other communications terminals constructed in a LAN, and for communications through a WAN, as a gateway apparatus.

Moreover, for the description below, concerning the elements of construction of electric field communications apparatus TRX1, reference numeral "1" will be added to each symbol used in FIG. 3 in order to specify each element. Moreover, for the description below, concerning the elements of construction of electric field communications apparatus TRX2, reference numeral "2" will be added to each symbol used in FIG. 3 in order to specify each element. Electric field apparatus TRX3-5 are also treated similarly.

LAYOUT EXAMPLE 1

Figure 15:
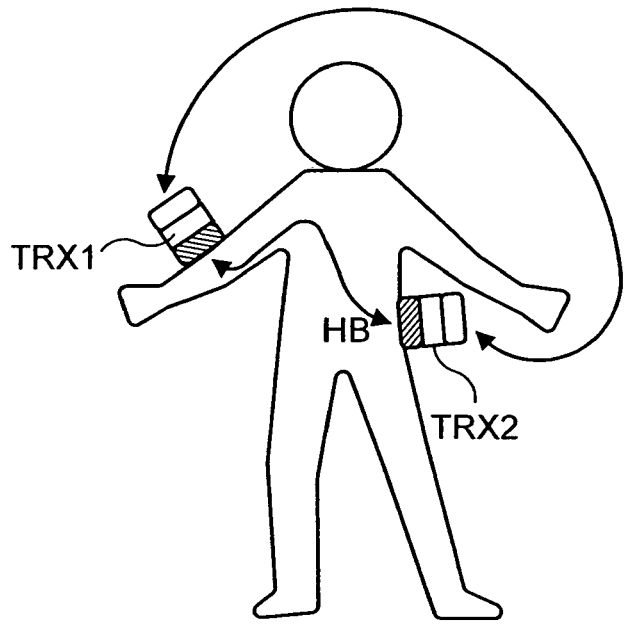
FIG. 15 shows generally a first example of communication.

FIG. 15 schematically shows the communications for layout example 1.

In FIG. 15, an example of communications between electric field communications apparatus TRX1 and TRX2 is shown.

First, transmitter control unit MPUT2 of electric field communications apparatus TRX2 converts into transmission signals the data to be sent to electric field communications apparatus TRX1. Then, transmitter control unit MPUT2 outputs the transmission signals to modulator EC2. Modulator EC2 modulates the carrier waves in response to the transmission signals. Then, modulator EC2 outputs the modulated signal to transmitter amplifier AP2. Transmitter amplifier AP2 amplifies the modulated signal and converts it into the voltage difference between terminal P2 and terminal Q2. Then, an electric field is radiated from transmitter main electrode ESB2 based on the voltage difference. The electric field reaches through human body HB locations where electric field communications apparatus TRX2 is positioned.

When the electric field radiated by electric field communications apparatus TRX2 reaches electric field communications apparatus TRX1, the refractive index of electro-optical crystal EO1 of electric field communications apparatus TRX1 changes. As a result, the polarization state of the laser light received at the light receiver unit of light detector DT1 changes. Then, light detector DT1 outputs to demodulator DC1 the electric signal modulated in response to the changes in the received light level. Demodulator DC1 demodulates the electric signal that was output. Demodulator DC1 outputs to receiver control unit MPUR1 the demodulated signal. Receiver control unit MPUR1 acquires the data sent by electric field communications apparatus TRX2, based on the signal that was output from demodulator DC1. Then receiver control unit MPUR1 executes operations based on the acquired data.

LAYOUT EXAMPLE 2

Figure 16:
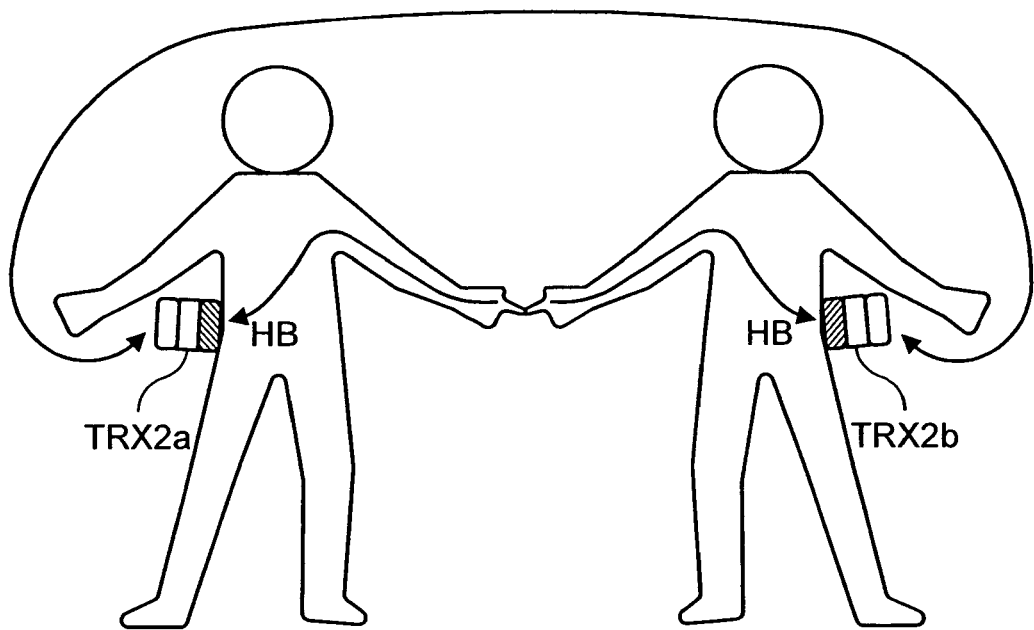
FIG. 16 shows generally a second example of communication.

FIG. 16 schematically shows the communications for layout example 2. In FIG. 16, the communications between electric field communications apparatus TRX2$a$ worn by user A and electric field communications apparatus TRX2$b$ worn by user B, are illustrated.

First, the electric field modulated in response to the data to be transmitted is radiated from transmitter main electrode ERB2$a$ of electric field communications apparatus TRX2$a$. For this situation, when the body of user A touches the body of user B, for example by a handshake, the electric field radiated in user A is transmitted to user B. Then, the electric field reaches electric field communications apparatus TRX2$b$. Then, electric field communications apparatus TRX2$b$ acquires data sent by electric field communications apparatus TRX2$a$, and executes operations based on the data.

Moreover, concerning the operations of the process by which signals are radiated from electric field communications apparatus TRX2, and the process by which electric field communications apparatus TRXb modulates the signal and acquires the data, explanation is omitted because it is similar to layout example 1.

LAYOUT EXAMPLE 3

Figure 17:
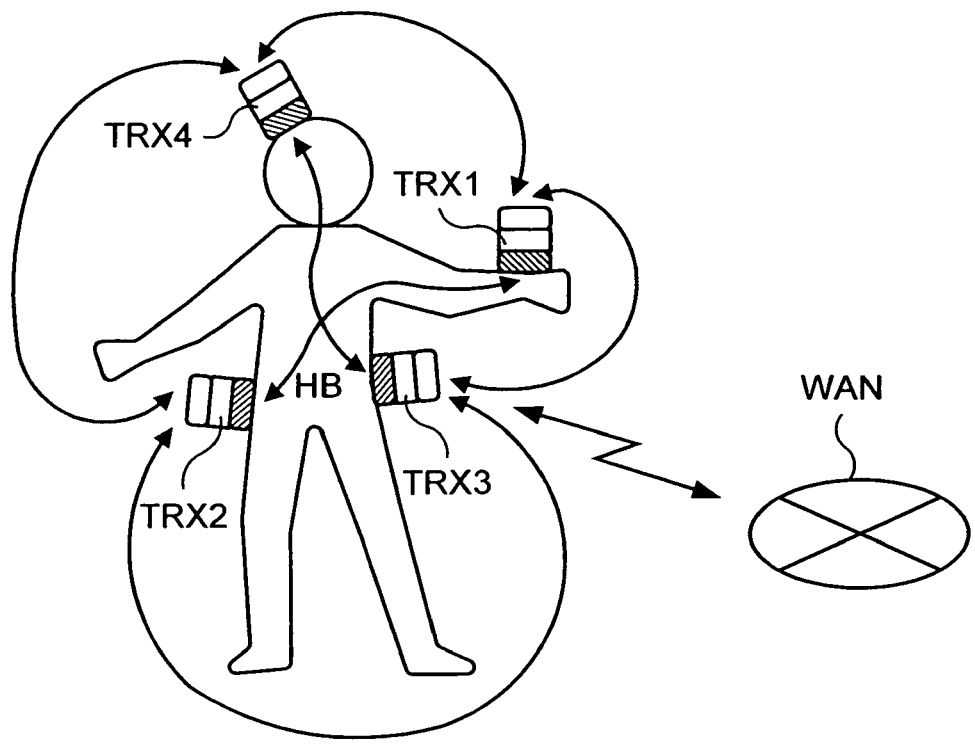
FIG. 17 shows generally a third example of communication.

FIG. 17 schematically shows the communications for layout example 3. In the FIG. 17, communications among several electric field apparatus TRX1-TRX4 are illustrated.

The present layout example is one in which electric field apparatus TRX1-TRX4 performs electric field communications. In other words, human body HB functions as a bus for communications among I/O device, storage device, and gateway apparatus. Furthermore, with the present layout example it is possible to perform communications with communications terminals connected to a LAN and to a WAN, through electric field communications apparatus TRX5.

Moreover, explanation is omitted for the communications processes performed among the various apparatus, because they are similar to layout example 1.

LAYOUT EXAMPLE 4

Figure 18:
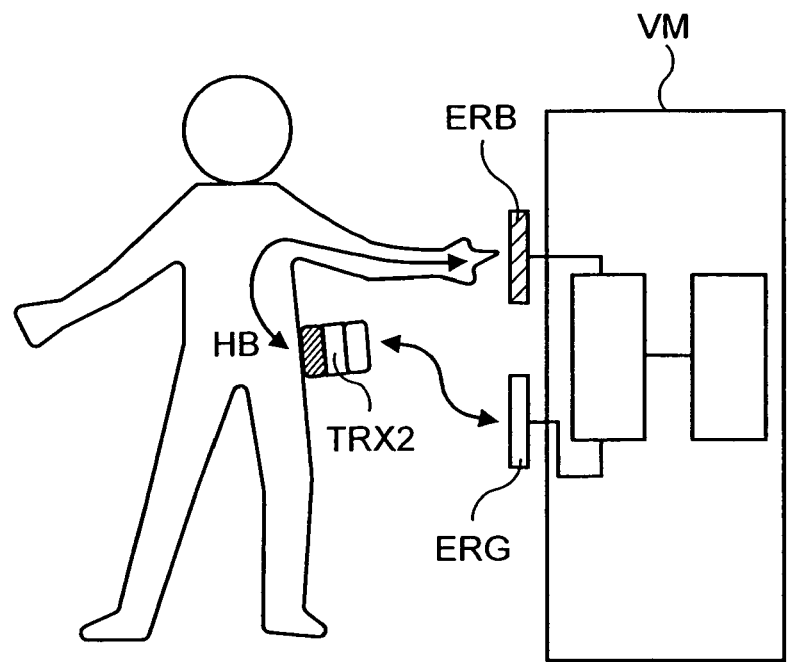
FIG. 18 shows generally a fourth example of communication.

FIG. 18 schematically shows the communications among the various apparatus for layout example 4. In FIG. 18, the communications between electric field apparatus TRX2 and a vending machine VM are illustrated. In this way, it is possible to install electric field communications apparatus TRX in an outdoor-use apparatus, and to perform communications with an electric field communications apparatus worn on a human body.

The vending machine VM shown in FIG. 18 has in its cabinet electric field communications apparatus TRX. Then, the purchase button that the user of the vending machine VM must push at the time of buying a drink is constructed as a receiver main electrode ERB. On the other side, receiver return electrode ERG, is provided in a low location that the user can directly touch for example on the lower side of the front of the apparatus. Here, if the construction does not allow the user to simultaneously contact with receiver main electrode ERB and receiver return electrode ERG, receiver return electrode ERG can be located anywhere. In order to raise the electrostatic coupling of companion electric field apparatus TRX, and stabilize communication quality, it is preferable to place receiver return electrode ERG near receiver main electrode ERG.

The user presses a purchase button of the vending machine VM, in the situation in which electric field communications apparatus TRX2 is radiating an electric field modulated in response to, for example, an electronic money value or the like. Then, communications are performed between the electric field communications apparatus TRX2 and vending machine VM, and vending machine VM dispenses the product that corresponds to the purchase button that the user pushed.

Moreover, explanation is omitted for the communications process between electric field communications apparatus TRX2 and vending machine VM, because it is similar to the communications for the above plurality of field communications apparatus TRX.

Instead of the above cases, it is assumed that they used short-distance radio communication by faint signals. Then, they performed communications only by passing through the neighborhood of the user, and there is a possibility that the information recorded in the apparatus flows outward. However, in the case of electric field communications apparatus TRX, a user requires to touch electric field communications apparatus TRX to communicate with external devices. For this reason, it becomes easy to prevent insecure external release of information recorded inside the apparatus, and to perform intentional verification of the user concerned with the external release of information. In other words, electric field communications apparatus TRX is preferable for a device to perform identity verification and purchase of products.

LAYOUT EXAMPLE 5

Figure 19:
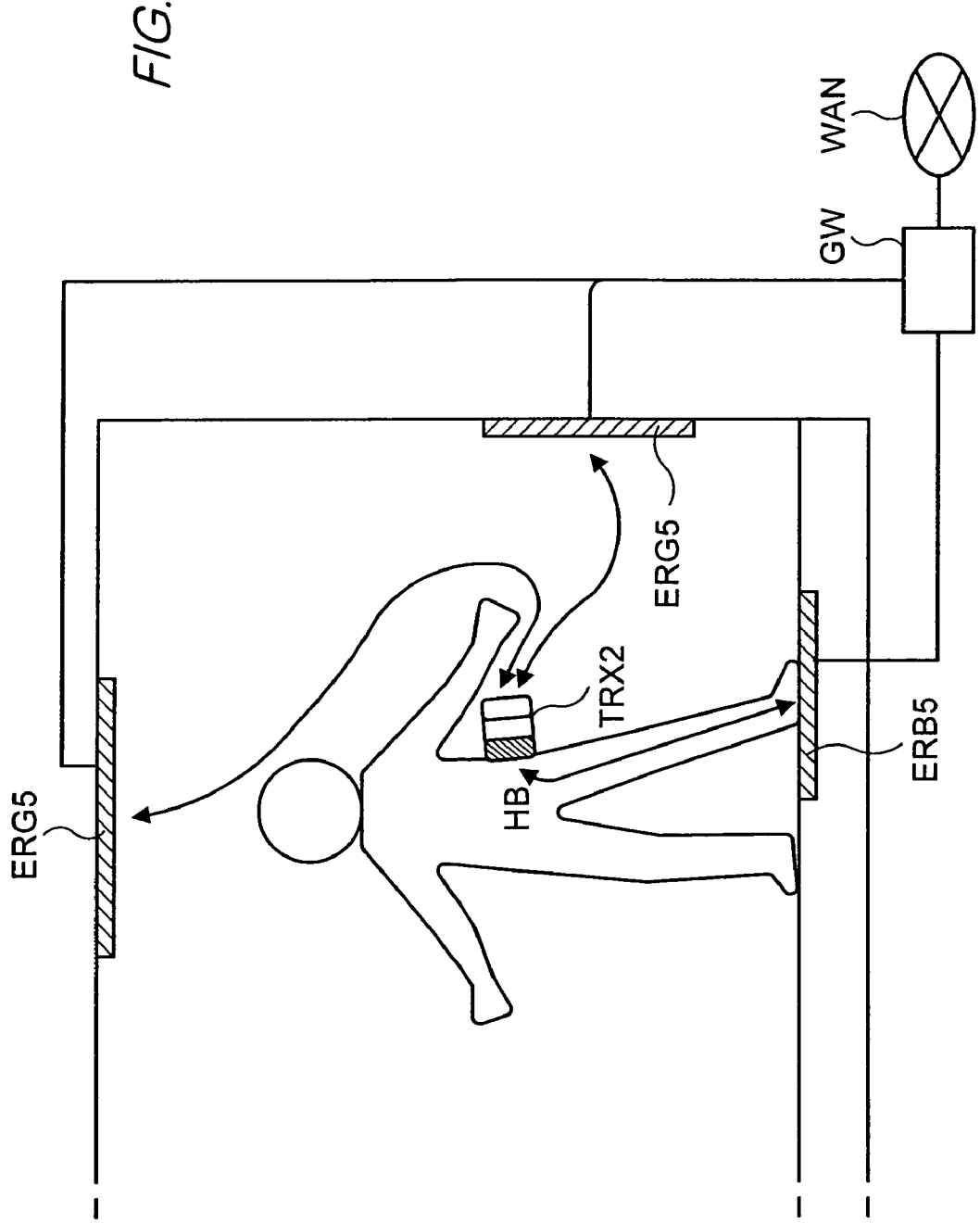
FIG. 19 shows generally a fifth example of communication.

FIG. 19 schematically shows the communications between each apparatus for layout example 5.

When electric field communications apparatus TRX5 is used, it is possible to perform communications through a LAN or WAN or the like, in a manner similar to the above layout example 3. In the present layout example receiver main electrodes ERB of electric field communications apparatus TRX5 is provided on the floor surface. Thus, user A can perform electric field communications merely by standing in the location for receiver main electrodes ERB. The scope of application for the present layout example is extensive, including reception verification of e-mail, and, of course, the selection of television programs and of distributed content such as video on demand.

Moreover, explanation is omitted for the communications among the various devices for layout example 5, because it is identical to those for the various devices above.

3. Effect of the First Embodiment

As explained above, electric field communications apparatus TRX of the present embodiment can communicate among apparatus worn on a part of the human body, because the communication sensitivity is higher by comparison to previous electric field communications equipment. Accordingly, the uses of the apparatus are greatly increased.

4. Modifications on the First Embodiment

Moreover, the electric field communications apparatus of the present invention is not restricted to the aforementioned embodiments, but can also admit of various alterations within the scope of technological thought for the present invention.

Modification 1

In the embodiments described above, transmitter main electrode ESB and receiver main electrode ERB, transmitter return electrode ESG and receiver return electrode ERG are separated, respectively. However, one electrode may have functions of both transmitter main electrode ESB and receiver main electrode ERB. As well, one electrode may have functions of both transmitter return electrode ESG and receiver return electrode ERG.

Modification 2

In the embodiments above, electric field communications apparatus TRX comprises a configuration capable of implementing a transmitter device and a receiver device. However, electric field communications apparatus TRX may have only one of the functions of receiver and transmitter, depending on its application. In such cases, electric field communications apparatus TRX may have only one of a main electrode and a return electrode, depending on the function to be implemented. Similarly, electric field communications apparatus TRX may have either transmitter controller part MPUT or receiver controller part MPUR.

Modification 3

In the embodiments described above, electric field communications apparatus TRX used 10BASE-2 system as its sole modulation system. In this case, an electric field communications apparatus capable of transmitting signals using one transmission path (one human body HB) is controlled with one apparatus. However, one may propose an embodiment that increases the number of apparatus for electric field communications apparatus TRX capable of simultaneous transmission of signals by using multiple frequencies for modulation, or by using multiple modulation systems. The modulation systems used for electric field communications apparatus TRX are not restricted to 10Base-2 system. Electric field communications apparatus TRX may, for example, use any of the follow systems: in addition to the base-band systems such as the Ethernet-standard 10Base-2, 100Base, 1000Base, there is AM (Amplitude Modulation), PM (Phase Modulation), FM (Frequency Modulation), PCM (Pulse Code Modulation), SS (Spread Spectrum), CDMA (Code Division Multiple Access) and UWB (Ultra Wide Band). As well, any frequency of carrier waves may be used, if it is capable of conducting acceptably through a dielectric.

Modification 4

Figure 20:
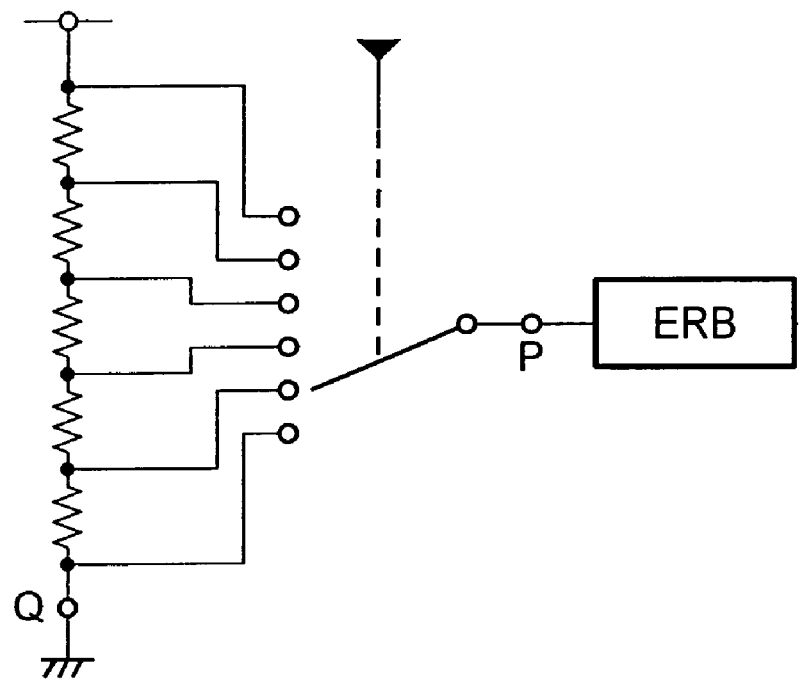
FIG. 20 shows the electric configuration of a transmitter amplifier for the fourth modification of the first embodiment.
Figure 21:
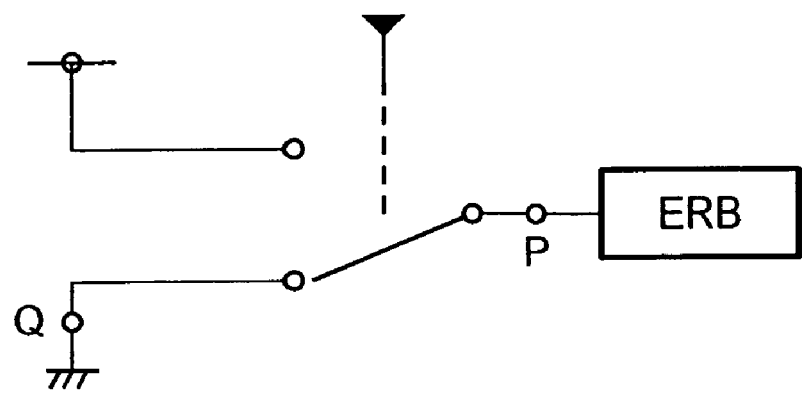
FIG. 21 shows the electric configuration of a transmitter amplifier for the fourth modification of the first preferred embodiment.
Figure 22:
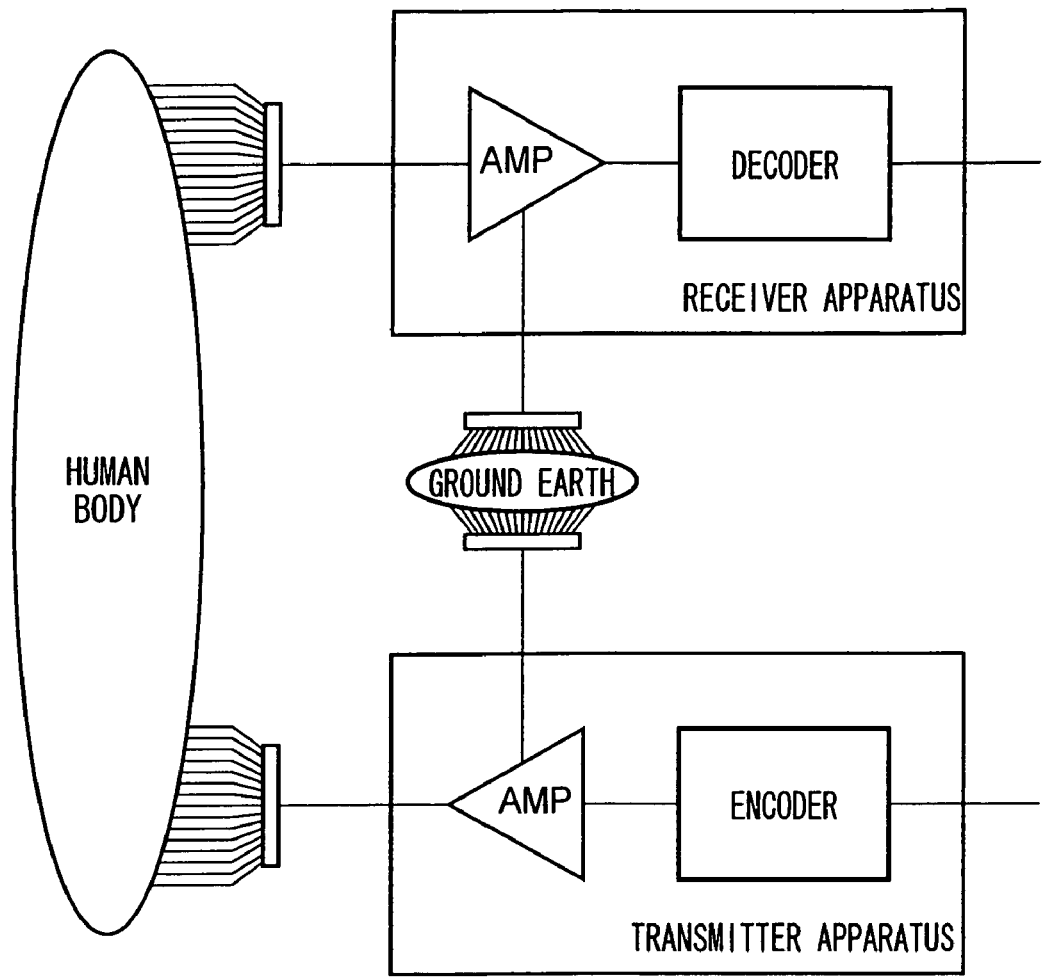
FIG. 22 illustrates the problem of earth-ground for a PAN.
Figure 23:
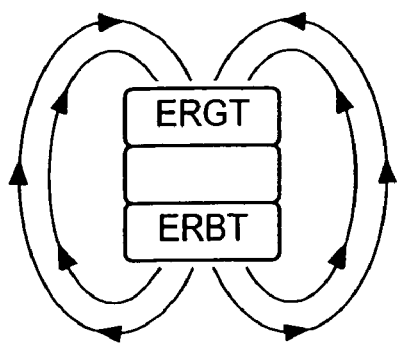
FIG. 23 shows in general form the communications theory of an electric field communications apparatus that uses electrostatic coupling through the air as a return path.
Figure 24:
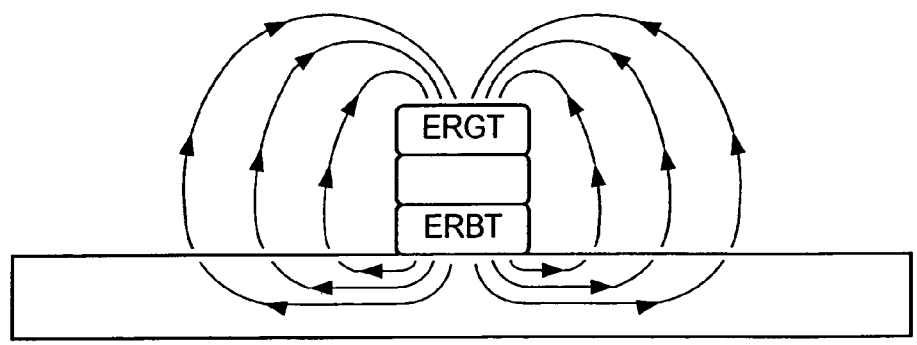
FIG. 24 shows in general form the communications theory of an electric field communications apparatus that uses electrostatic coupling through the air as a return path.
Figure 25:
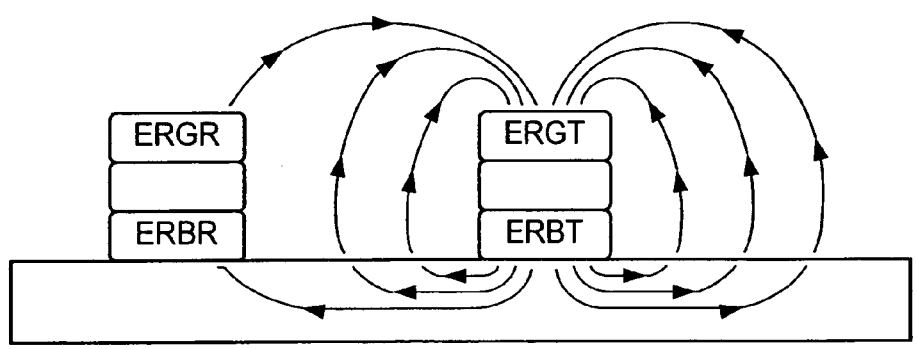
FIG. 25 shows in general form the communications theory of an electric field communications apparatus that uses electrostatic coupling through the air as a return path.
Figure 26:
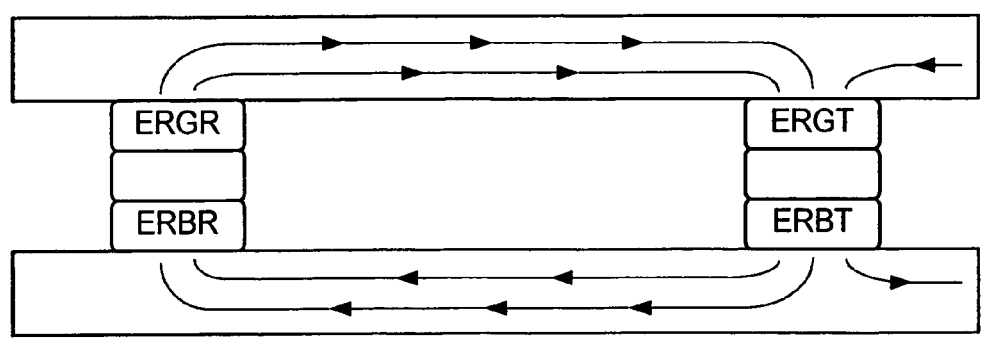
FIG. 26 shows in general form the communications theory of an electric field communications apparatus that uses a dielectric as the return path.

In the embodiments described above, the modulated signal is output as a voltage difference between terminal P and terminal Q, using the transmitter amplifier AP shown in FIG. 4. However, transmitter amplifiers AP for electric field communications apparatus TRX are not restricted to is the embodiment shown in FIG. 4. For example, in the case where, a multi-value system such as 100Base-T is employed as a modulation system, it is preferable to use the transmitter amplifiers shown in FIG. 20. In this case, multi-valued voltage values can be output by switching the switches in response to an input signal. In this case, output voltage may be predetermined. As well, transmitter amplifiers shown in FIG. 21 may be used. The transmitter amplifier shown in FIG. 21 has the ability to switch in response to the input signal, and is preferable in a modulation system with two-level output values such as 10BASE-2.

Modification 5

In the above embodiments, electric field sensor ES outputs an electric signal in response to the polarity state of the laser light of a laser beam that has passed through electro-optical crystal EO. However, electric field sensor ES may measure the interference of the light before and after the laser bean incident to electro-optical crystal EO, and may output electric signals by measuring the change in the electric field in this way. In short, one may employ any configuration and functions for electric field sensor ES as long as the electric field sensor ES has a configuration capable of inputting electric signals in response to changes in the electric field reaching electro-optical crystal EO.

5. Second Embodiment 5-1. Configuration of the Second Preferred Embodiment

Figure 27:
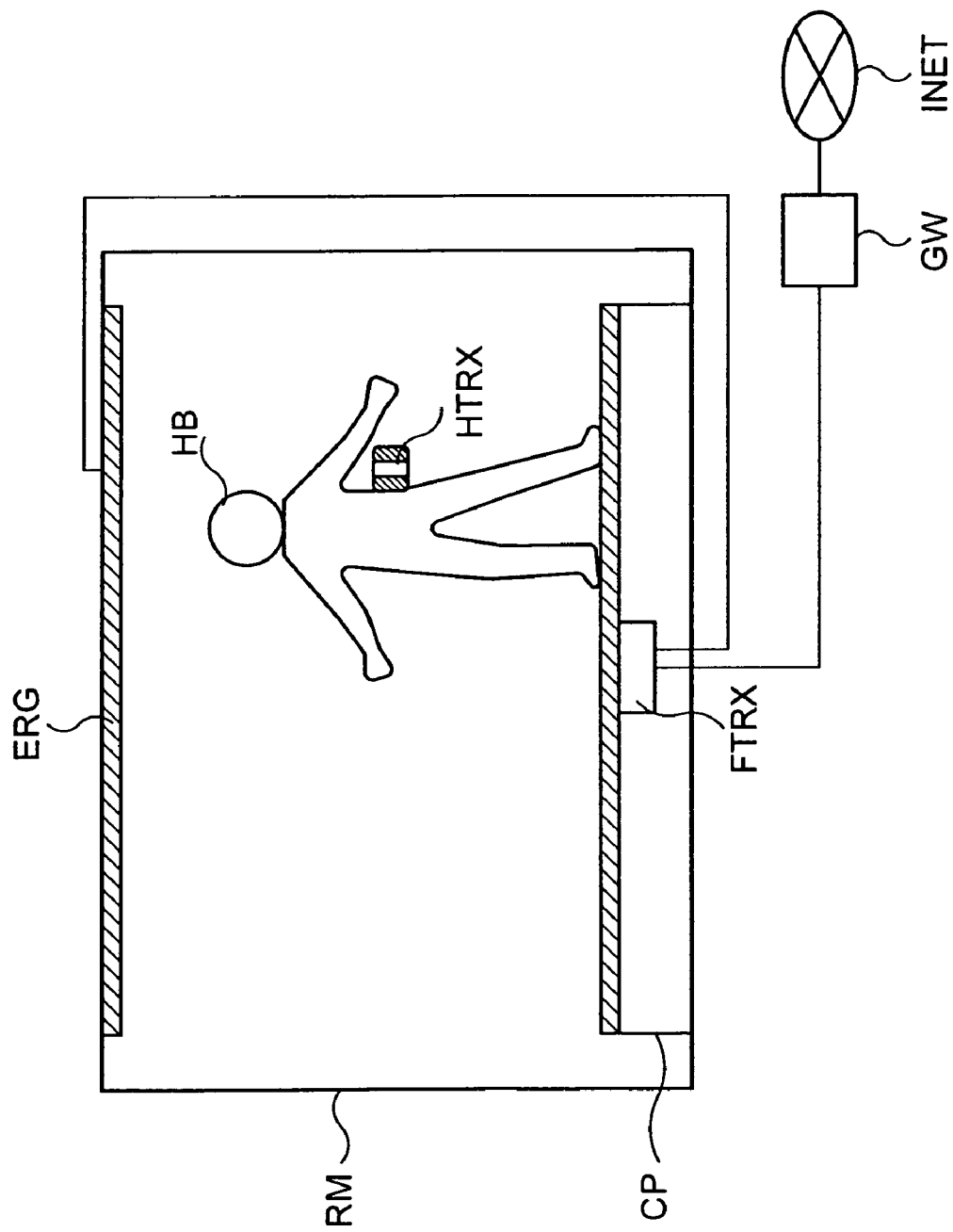
FIG. 27 shows an example of the entire composition of the communications system in accordance with a second embodiment of the present invention.

FIG. 27 shows of the overall configuration of a communications system according to a second embodiment of the present invention.

Transmitter device HTRX is a communications apparatus worn on the human body HB, and has functions that perform communications using human body HB as a transmission path. Communications unit CP is an architectural member installed in the floor of room RM, and has receiver device FTRX which is a communications apparatus. Gateway GW relays data for communication performed between a communications apparatus (not shown) connected to the Internet INET and receiver device FTRX. Gateway GW is connected to Internet INET and receiver device FTRX.

Receiver device FTRX has functions that perform communications with communications apparatus connected to Internet INET, via gateway GW. As well, receiver device FTRX has functions that perform communications with transmitter device HTRX worn on human body HB by using human body HB as a transmission path. Receiver return electrode ERG is installed in the ceiling of room RM, and receiver return electrode ERG is connected to the ground GND of receiver device FTRX.

For the communications system shown in FIG. 27, transmitter device HTRX performs communications with communications apparatus connected to Internet INET via receiver device FTRX involved in communications unit CP, gateway GW and Internet INET.

5-1-1. Configuration of Transmitter Device HTRX

Figure 28:
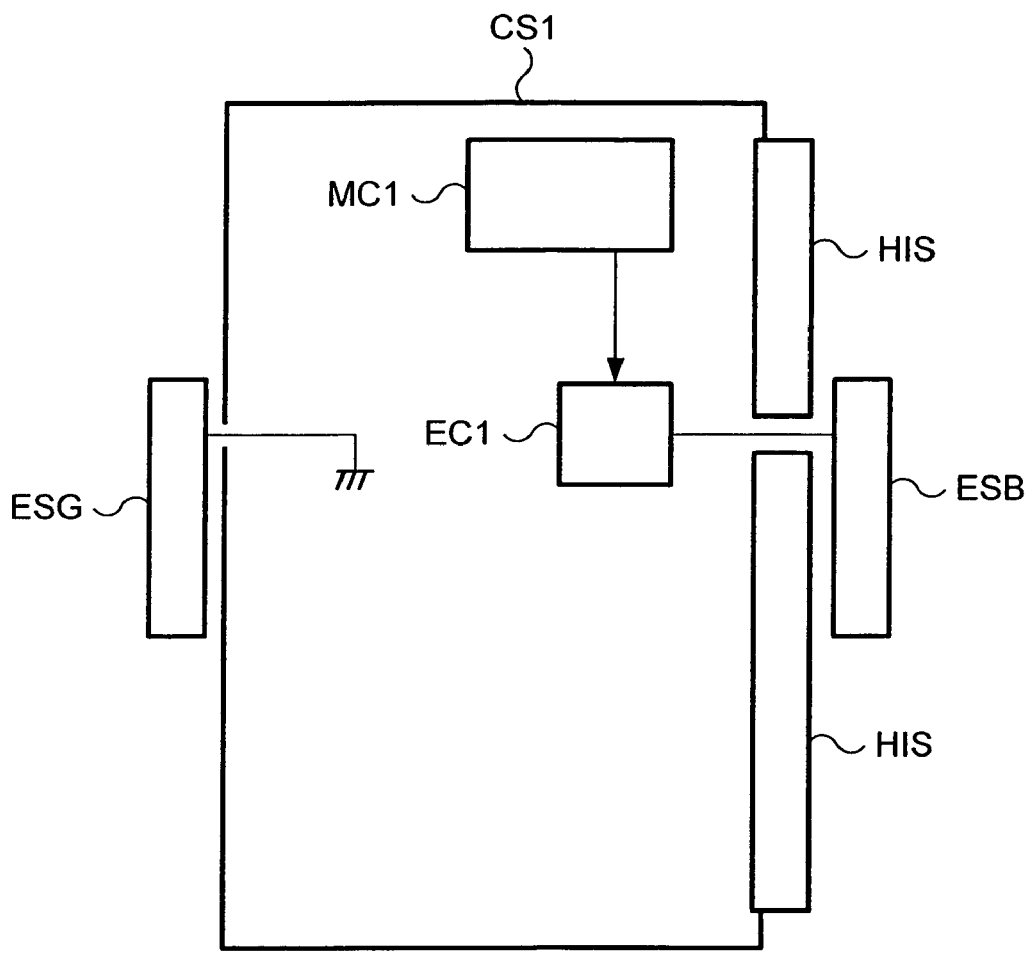
FIG. 28 shows the hardware configuration of a transmitting device HTRX in accordance with the communications system.

FIG. 28 is a block diagram showing the hardware configuration of transmitter device HTRX.

Cabinet CS1 has a boxlike shape and accommodates various members that make up transmitter device HTRX as described below.

Microcomputer MC1 is a conventional microcomputer having microprocessor, ROM (Read Only Memory), RAM (Random Access Memory), I/O ports (none of which are shown), and so on. ROM stores a control program for performing communications with receiver device FTRX and other communications apparatus connected to Internet INET. Microcomputer MC1 reads and executes a program stored in ROM and performs control of the various parts of transmitter device HTRX when the power (not shown in the figures) is turned on.

Insulator HIS is formed on the surface where cabinet CS1 touches human body HB, i.e., on the surface in which transmitter main electrode ESB is formed, and insulates human body HB from case CS1. Transmitter return electrode ESG is an electrode provided in a location that is exposed to the air when transmitter device HTRX is worn on human body HB. The surface of transmitter return electrode ESG is covered with an insulator. Transmitter return electrode ESG is connected to ground GND of transmitter device HTRX.

Modulator EC1 is connected to microcomputer MC1. In addition, modulator EC1 is connected to transmitter main electrode ESB connected to human body HB. When a signal is input to it from microcomputer MC1, Modulator EC1 modulates carrier wave in response to the input signal. The carrier wave has frequencies showing good conductivity in the human body HB, for example, above the tens of kHz. As well, modulator EC1 has a transmitter amplifier (not shown), and generates a voltage difference between transmitter main electrode ESB and transmitter return electrode ESG in response to the signal after modulation. Thus, an electric field corresponding to the signal after modulation is given to the human body HB. Moreover, it is possible to improve the stability of the communication quality if a frequency that does not interfere with the noise from the environment is used for the carrier waves that modulator EC1 uses. Moreover, this transmitter device HTRX also has a battery, memory, and operation keys, though unessential parts for the present invention are not shown in the figures.

5-1-2. Configuration of Communication Unit CP

Figure 29:
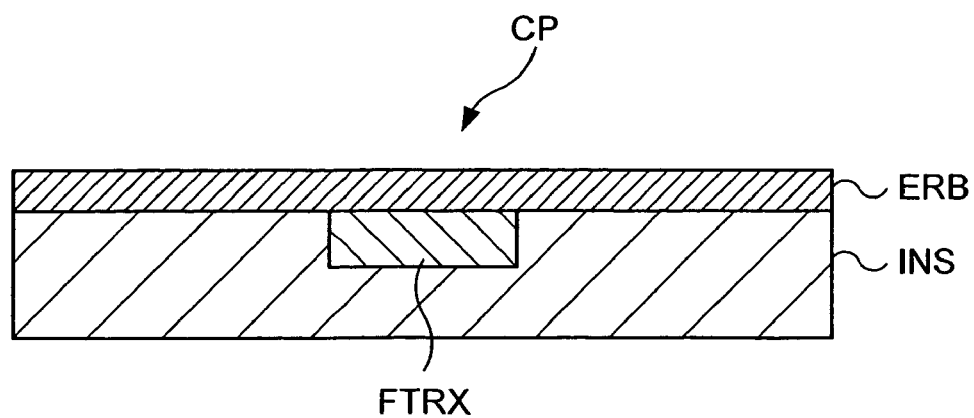
FIG. 29 shows a cross section of communications unit CP in accordance with the communications system.

FIG. 29 shows the configuration of communication unit CP. As shown in FIG. 29, communication unit CP comprises receiver device FTRX, receiver main electrode ERB and insulator INS. Receiver electrode ERB is used for measuring changes in the electric field, and is connected to receiver device FTRX. Insulator INS is an insulator. When communication unit CP is installed in room RM as in FIG. 27, insulator INS insulates receiver main electrode ERB from the floor surface of room RM.

5-1-3. Configuration of Receiver Device FTRX

Figure 30:
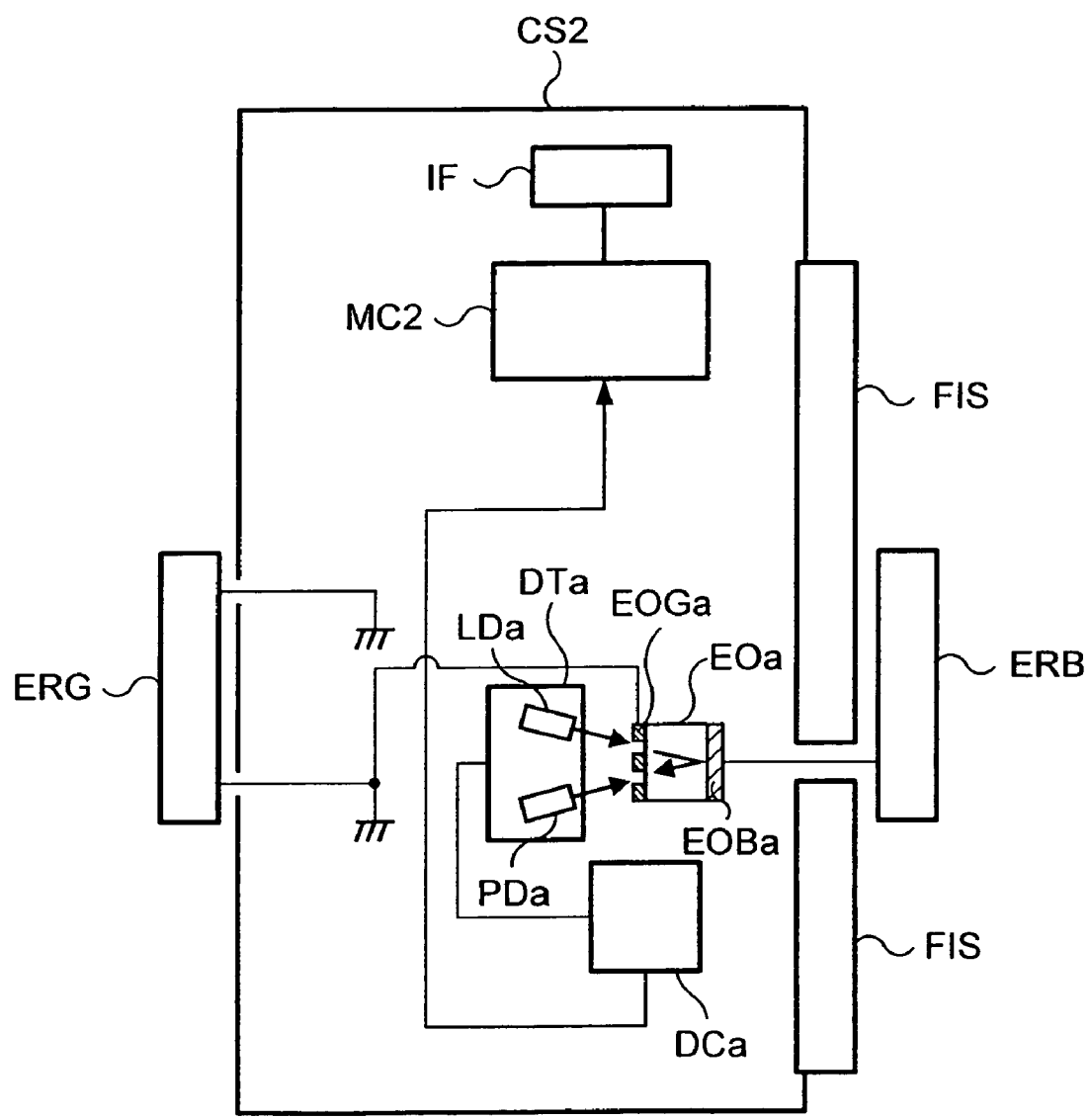
FIG. 30 shows an example of the hardware composition of a receiving device FTRX in accordance with the communications system.

FIG. 30 is a block diagram illustrating the hardware configuration for receiver device FTRX involved in communication unit CP.

Cabinet CS2 has a boxlike shape and accommodates various parts that make up receiver device FTRX explained below. Insulator FIS is formed on the surface where cabinet CS2 contacts receiver main electrode ERB, and insulates receiver main electrode ERB from cabinet CS2.

Microcomputer MC2 is a conventional microcomputer, similar to the microcomputer in transmitter device HTRX. The ROM of microcomputer MC2 in receiver device FTRX stores a control program for performing communications with other communications apparatus connected to transmitter device FTRX or Internet INET. When power (not shown) is turned on, microcomputer MC2 reads and executes the program stored in ROM, and performs control of the various parts of receiver device FTRX.

Electro-optic crystal EOa is a crystal of CdTe, ZnTe, Bi12GeO20, Bi12SiO20, Bi4Ge3O12, LiNbO3, LiTaO3 or the like, with a refractive index that changes in response to an electric field applied to it. In other words, the crystal shows the so-called Pockels Effect. Electro-optical crystal EOa has a columnar shape. Electrode EOBa for use with EOa is an electrode formed on the end surface of electro-optical crystal Eoa. Electrode EOBa has the same size as the base (circular shaped) of the electro-optical crystal. Electrode EOBa for use with EOa is connected to receiver main electrode ERB. The surface where electrode EOBa for use with EOa contacts the electro-optical crystal is a mirrored surface. The mirrored surface reflects laser light output from light detector DTa. Electrode EOGa for use with EOa is an electrode formed on electro-optical crystal EOa, and is connected to electrode ERG shown in FIG. 30. Receiver return electrode ERG is connected to ground GND of transmitter device HTRX. Electrode EOBa for use with EOa and electrode EOGa for use with EOa, are placed to hold electro-optical crystal EOa between them, as shown in FIG. 30. Thus, a number of electric field lines passing through electro-optical crystal Eoa can be increased as shown in FIG. 11, and it becomes capable of performing communications over a greater distance.

Light detector DTa measures the change in refractive index of electro-optical crystal EOa. Light detector DTa has a semiconductor laser diode LDa which functions as a light source for emitting laser light to electro-optical crystal EOa, and has light reception unit having a photodiode PDa for receiving light emitted from the light source. The light reception unit is positioned in a location that can receive that reflected light, in a case that the laser light is emitted from the light ray source toward electro-optical crystal EOa, and the light which penetrates electro-optical crystal EO is reflected by electrode EOBa for use in EOa. Accordingly, in the case where the refractive index of electro-optical crystal EOa is changed, the polarity state of the laser light penetrating electro-optical crystal EOa changes. The amount of light received in the light reception unit changes in response to the changes of the polarity state. As a result, light detector DTa can measure changes in the refractive index of electro-optical crystal EOa based on changes in the amount of light received. When a change arises in the refractive index of electro-optical crystal EOa, light detector DTa measures the change in the refractive index of electro-optical crystal EOa. Light detector DTa converts the measured result to an electric signal, and outputs the electric signal to demodulator apparatus DCa.

Demodulator apparatus DCa demodulates the electric signal output from light detector DTa. Demodulator apparatus DCa is connected to microprocessor MC2. Interface IF is connected to microcomputer MC2 and the gateway GW shown in FIG. 27, and relays data for communications performed between microcomputer MC2 and gateway GW. When microcomputer MC2 receives signals output from demodulator apparatus DCa, microcomputer MC2 transmits signals to communications apparatus connected to Internet INET via gateway GW, by controlling interface IF.

Moreover, modulator EC1 and demodulator DCa may, for example, use of any of the following systems as long as the frequency is preferable for communications via human body such as above the tens of kHz: AM (Amplitude Modulation), PM (Phase Modulation), FM (Frequency Modulation), PCM (Pulse Code Modulation), SS (Spread Spectrum), CDMA (Code Division Multiple Access) and UWB (Ultra Wide Band). Moreover, this transmitter device HTRX also has a battery, memory, and operation keys, though unessential parts for the present invention are not shown in the figures.

Next, description will be given for the transmission path in the case of performing communications with transmitter device HTRX and receiver device FTRX with reference to FIG. 27. When an electric field is generated by transmitter device HTRX, the electric field lines spread out along the human body HB and reach receiver main electrode ERB of communications unit CP. The electric field lines that reached receiver main electrode ERB are taken into receiver device FTRX, and reach electro-optical crystal EOa through electrode EOBa for use in EOa connected to receiver main electrode ERB. The electric field lines that reached receiver main electrode ERB are collected in receiver return electrode ERG installed in the ceiling of room RM through electrode EOGa for use in EOa. The electric field lines that reached receiver return electrode ERG return to transmitter return electrode of transmitter device HTRX through the air. Because receiver return electrode ERG is installed in the ceiling, a place where human body HB will not touch, there is no concern about a short circuit in the transmission path of the signal from human body HB touching receiver return electrode ERG.

5-2. Operations for Second Embodiment

In the second embodiment of the present invention, operations in the case that transmitter device HTRX transmits data to communications apparatus connected to Internet INET, will be described.

First, in transmitter device HTRX, data transmitted from transmitter device HTRX is output to modulator device EC1 from microcomputer MC1. When signals output from microcomputer MC1 are input to modulator device EC1, modulator device EC1 modulates carrier waves in response to the signal. The carrier wave has a frequency above the tens of kHz which shows good conductivity through a human body. After transmitter device HTRX amplifies the modulated signal in the transmitter amplifier of demodulator EC1, transmitter device HTRX generates a voltage difference between transmitter main electrode ESB and transmitter return electrode ESG in response to the amplified signal. Thus, an electric field is provided to human body HB.

In receiver device FTRX, by the electric field generated in human body HB, a voltage difference arises between receiver main electrode ERB and receiver return electrode ERG. Then, the refractive index of electro-optical crystal EOa changes in response to this voltage difference. The change in the refractive index of electro-optical crystal EOa is measured by light detector DTa, and is converted into the electric signal. The change in the refractive index is based on the change in the electric field, and this electric signal is based on the signal modulated by transmitter device HTRX that radiated the electric field. The converted electric signal is output from light detector DTa and is input to demodulator DCa.

In demodulator DCa, the signal output from light detector DTa is demodulated. Thus, the signal output from microcomputer MC1 of transmitter device HTRX is obtained. The signal demodulated by demodulator DCa is output from demodulator DCa, and input to microcomputer MC2 of receiver device FTRX. The signal input to microcomputer MC2 is output to interface IF. The signal input to interface IF, is transmitted to communications apparatus connected to Internet INET through gateway GW after the signal is output from interface IF.

As explained above, according to the second embodiment of the present invention, receiver return electrode ERG is installed in the ceiling. Therefore, there is no possibility that human body HB touches to receiver return electrode ERG, thereby preventing interruption of communications. As well, because receiver return electrode ERG and transmitter return electrode ESG are provided, it becomes possible to perform stable communications. As well, when room RM is constructed with the electrodes installed as described above, transmitter device HTRX and receiver device FTRX can perform communications in room RM.

6. Third Embodiment

Figure 31:
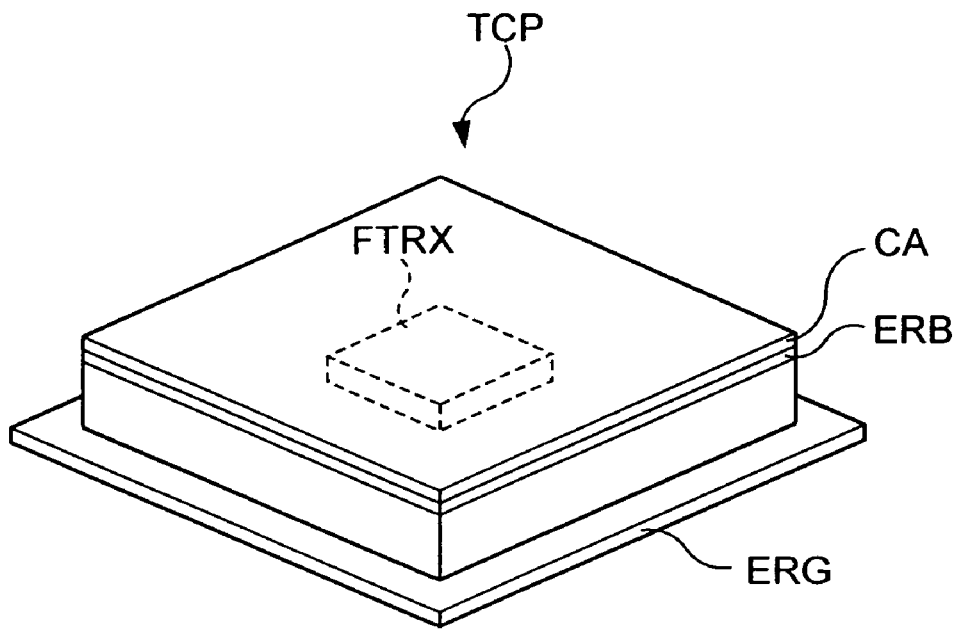
FIG. 31 is a perspective view illustrating the exterior of communications unit TCP in accordance with a third embodiment of the present invention.

Next, the third embodiment of the present invention will be described. FIG. 31 is a perspective view showing the exterior of communications unit TCP. The communications system according to the third embodiment of the present invention is different from the second preferred embodiment in that a tile-shaped communications unit TCP illustrated in FIG. 31 substitutes for the communications unit CP installed in the floor surface of room RM in the communications system according to the second embodiment. For the communications system according the third embodiment, explanation of the configuration is omitted because the elements of the system is similar to that of the first embodiment except communications unit TCP.

6-1. Configuration of the Third Embodiment

Figure 32:
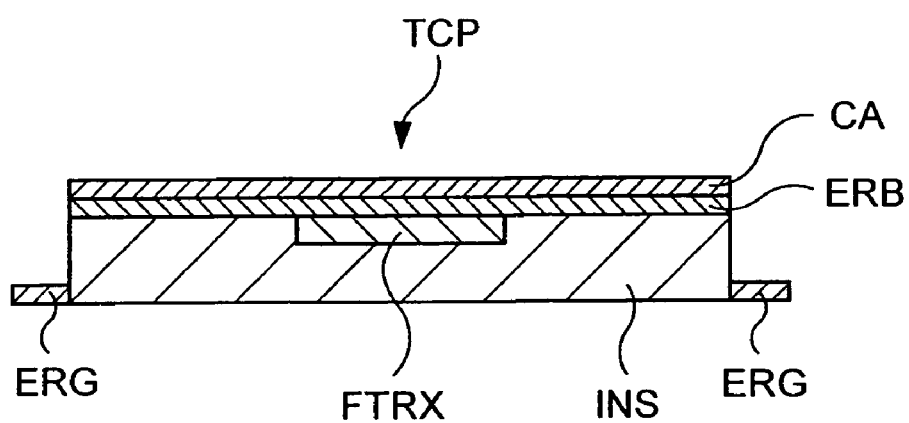
FIG. 32 shows a cross section of the communications unit TCP in accordance with a third preferred embodiment of the present invention.

The configuration of communications unit TCP is explained with reference to FIG. 31 and FIG. 32. FIG. 32 illustrates a cross section of communications unit TCP. As shown in FIG. 32, communications unit TCP has insulator INS, receiver device FTRX involved in insulator INS, receiver main electrode ERB, carpet CA, and receiver return electrode ERG.

Ground GND of receiver device FTRX and electrode EOGa for use with EOa are connected to receiver return electrode ERG, and is installed to surround the environment of insulator INS as shown in FIG. 31 and FIG. 32. Receiver main electrode ERB is formed on the upper surface of insulator INS, and the upper side of receiver main electrode ERB is covered with carpet CA. Receiver electrode ERB is connected to electrode EOBa for use with EOa of receiver device FTRX. As well, receiver device FTRX is connected to gateway GW which is connected to Internet INET, similarly to communications unit CP of the second embodiment.

Figure 33:
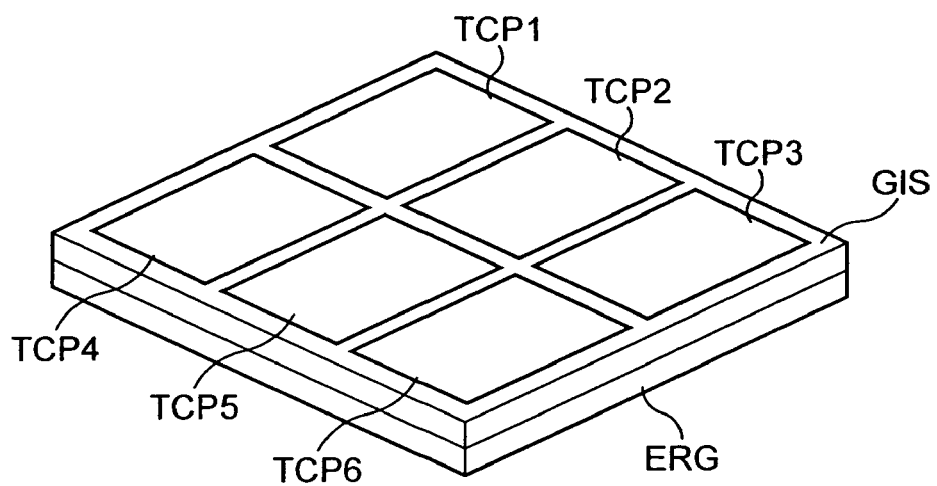
FIG. 33 is a perspective view illustrating the exterior when a tile carpet shaped communications unit TCP is laid out according to a third embodiment of the present invention.
Figure 34:
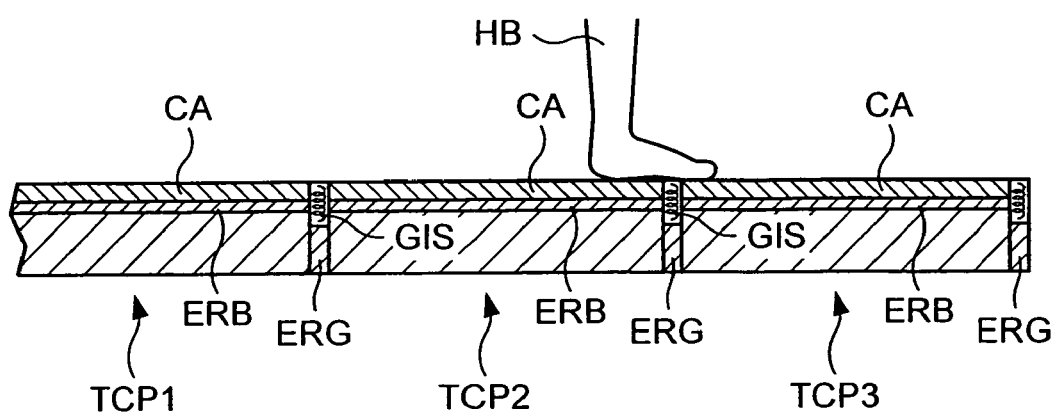
FIG. 34 shows a cross section of a tile carpet shaped communications units TCP laid out according to a third embodiment of the present invention.

Communications units TCP are laid out as carpet tiles over the floor surface of room RM as shown in FIG. 33. FIG. 34 is a cross sectional view of communications units TCP layout as shown in FIG. 33. As shown in FIG. 34, insulator GIS is placed in the space between two communications units TCP, i.e., in the space above the upper part of receiver return electrode ERG, in the case where communications units TCP are laid out as a carpet.

When transmitter device HTRX generates an electric field, the electric field lines spread out through the human body HB, and are collected into receiver return electrode ERB of communications unit TCP. The electric field lines collected into receiver main electrode ERB are pulled into receiver device FTRX. The electric field lines pass through electrode EOBa for use in EOa connected to receiver main electrode ERB, and are pulled toward electro-optical crystal EOa. Electric field lines pulled toward electro-optical crystal EOa are pulled toward receiver return electrode ERG installed in communications unit TCP, through electrode EOGa for use in EOa. Electric field lines pulled into receiver return electrode ERG return to the transmitter return electrode of transmitter device HTRX through the air. There is no possibility of short circuiting in transmission signal paths between human body HB and receiver return electrode ERG because receiver return electrode ERG is positioned in the lower part of insulator GIS, a location that does not come into contact the human body HB.

Moreover, the communications system may have no insulator GIS because the human body HB does not touch the receiver return electrodes ERG in the case the widths of the gaps between the adjoining communication units TCP are narrowed to a degree where the receiver return electrodes ERG do not touch human body HB. However, it is preferable for the communications system to have insulator GIS because there is a possibility that of a problem occurring that gives rise to difficulties in communication in a case that a foreign body such as conductive debris are entered into the gap.

6-2. Operations of the Third Embodiment

Next, operations in the third embodiment of the present invention are described in the case that transmitter device HTRX transmits data to communications apparatus connected to Internet INET. Moreover, because the operations up to the point of transmitter device HTRX generates an electric field are similar to those of the second embodiment, the explanation for that operation is omitted.

When transmitter device HTRX yields an electric field on human body HB, a voltage difference arises between receiver main electrode ERB and receiver return electrode ERB of receiver device FTRX. Receiver device FTRX acquires from the voltage difference the modulated signal that transmitter device HTRX uses in order to transmit data, using light detector DTa. When receiver device FTRX demodulates the acquired modulated signal using demodulator DCa, it acquires data that transmitter device HTRX transmitted. The acquired data is input to microcomputer MC2 of receiver device FTRX. The signal input to microcomputer MC2 is output to interface IF. The signal input to interface IF is sent to communications apparatus connected to Internet INET through gateway GW after it is output from interface IF.

As described above, according to the third embodiment of the present invention, because receiver return electrode ERG is positioned in the lower part of insulator GIS, there is no possibility that human body HB touches to receiver return electrode ERG establishing the return path. Therefore, interruption of communications can be prevented. As well, according to the third embodiment of the present invention, because there is no need to install receiver return electrodes in the ceiling similar to the second embodiment, so the configuration of the room is simplified compared to the second embodiment, and the room aesthetics are not compromised. As well, in the case where communication units TCP are layout like carpet tiles, insulator GIS prevents the collection of dust in the gaps, while also offsetting the difference in surface levels.

7. Fourth Embodiment

Figure 35:
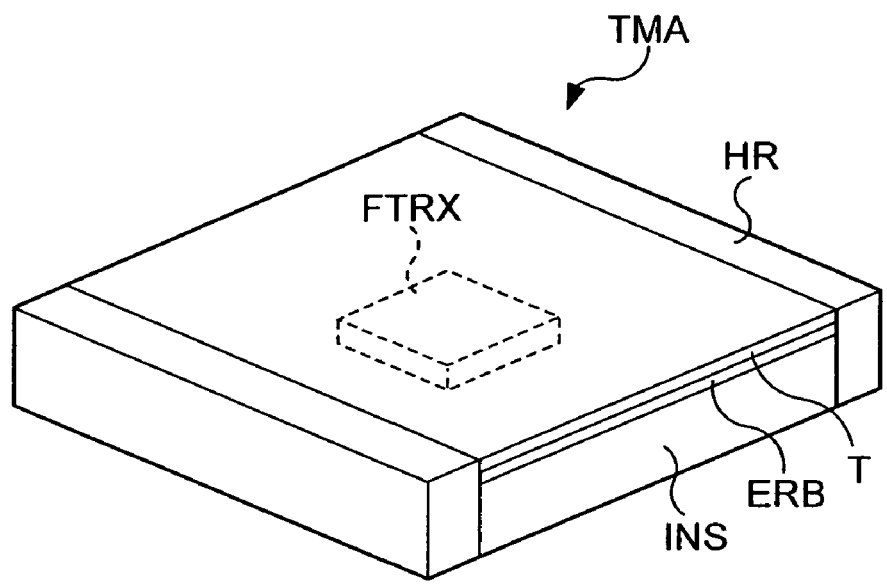
FIG. 35 is a perspective view of a communications unit TMA in accordance with a fourth embodiment of the present invention.

Next, the fourth embodiment of the present invention will be explained. FIG. 35 is a perspective view showing the exterior of communications unit TMA. The communications system according to the fourth embodiment of the present invention differs from the third embodiment in that a communications unit TMA illustrated in FIG. 35 substitutes for the communications unit TCP that is installed in the floor surface of room RM for the communications system according to the third embodiment. This communications unit TMA takes the form of tatami, a kind of mat found in Japanese-style rooms. By using this form of tatami in such a communications unit, the room aesthetics are not compromised. Of course, it is possible for the communications unit to take on other forms and designs. In a communications system according to the fourth embodiment of the present invention, because the elements of configuration are similar to those of the second embodiment except for communications unit TMA, explanation for the elements is omitted.

7-1. Configuration of the Fourth Embodiment

Figure 36:
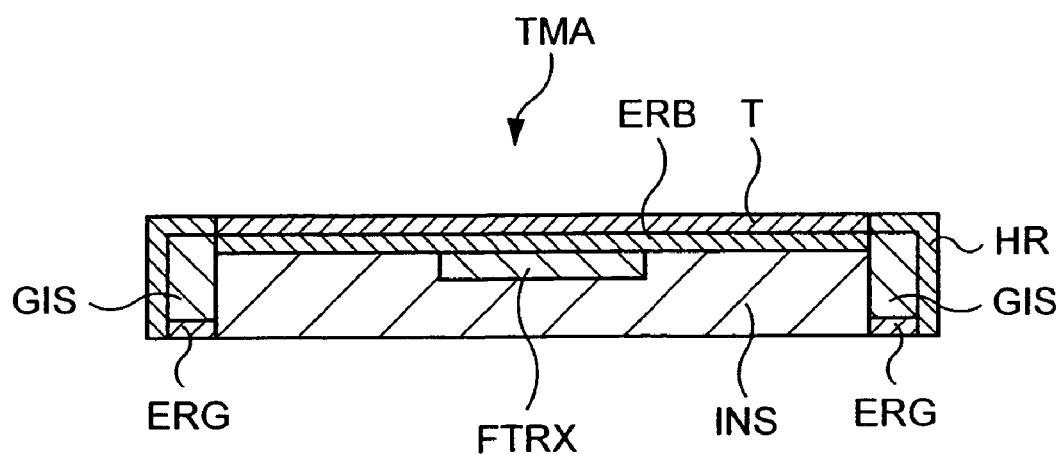
FIG. 36 shows a cross-section of a communications unit TMA in accordance with a fourth embodiment of the present invention.

The configuration of communications unit TMA is described with reference to FIG. 35 and FIG. 36. FIG. 36 shows a cross section of communications unit TMA. As shown in FIG. 36, communications unit TMA has an insulator INS, a receiver device FTRX involved in insulator INS, a receiver main electrode ERB, a mat facing T, a receiver return electrode ERG, and a surrounding edge HR installed on the side communications unit TMA in the lengthwise direction. As well, communications unit TMA has insulator GIS in the space enclosing the surrounding edge of edge HR, receiver return electrode ERG, and insulator INS.

Receiver return electrode ERG is connected to ground GND of receiver device FTRX and electrode EOGa for use with Eoa. Receiver return electrode ERG is formed along the lengthwise side of insulator INS as shown in FIG. 35 and FIG. 36. Receiver main electrode ERB is formed on the insulator INS, and the upper face of receiver main electrode ERB is covered with mat facing T. Receiver electrode ERB is connected to electrode EOBa for use with EOa of receiver device FTRX. As well, receiver device FTRX is connected to gateway GW that is connected to Internet INET, similarly to communications unit CP of the second embodiment. Communications unit TMA is layout like a tatami on the floor surface of room RM, similarly to an ordinary tatami.

When transmitter device HTRX generates an electric field, the electric field lines spread out along the human body HB, and are collected into receiver main electrode ERB of communications unit TMA. The electric field lines collected into receiver main electrode ERB are pulled into receiver device FTRX, and are collected into electro-optical crystal EOa through electrode EOBa for use in EOa connected to receiver main electrode ERB. The electric field lines collected into electro-optical crystal EOa are collected into receiver return electrode ERG installed in communications unit TMA, through electrode EOGa for use in EOa. The electric field lines collected into receiver return electrode ERG return to the transmitter return electrode of transmitter device HTRX through the air. Because receiver return electrode ERG is positioned in surrounding edge HR and insulator GIS, which are locations that do not touch human body HB, there is no possibility of short-circuiting the transmission path of the signal by touching human body HB with receiver return electrode HB.

7-2. Operations of the Fourth Embodiment

Next, in the fourth embodiment of the present invention, operations of transmitter device HRTX will be described in the case of transmitting data to communications apparatus connected to Internet INET. Moreover, because the operations up to the point where transmitter device HTRX generates an electric field are similar to those of the second embodiment, explanation is omitted.

When transmitter device HTRX generates an electric field in human body HB, a voltage difference arises between receiver main electrode ERB of receiver device FTRX and receiver return electrode ERG. Receiver device FTRX acquires from this voltage difference a modulated signal that transmitter devices HTRX uses to transmit data, using light detector DTa. When receiver device FTRX demodulates the acquired modulated signal using demodulator DCa, data that transmitter device HTRX transmitted is acquired. The acquired data is input to microcomputer MC2 of receiver device FTRX. The signal input to microcomputer MC2 is output to interface IF. The signal input to interface IF is sent to communications apparatus connected to Internet INET through gateway GW, after it is output from interface IF.

As explained above, according to the fourth embodiment of the present invention, receiver return electrode ERG is positioned in the surrounding edge HR and the lower part of insulator GIS. Therefore, there is no possibility of touching human body HB with receiver return electrode ERG establishing a return, thereby interruption of communications can be prevented. As well, for the fourth embodiment of the present invention, as in the second embodiment, because there is no need to install receiver return electrodes ERG in the ceiling, the configuration of the room is simplified compared to the second embodiment. As well, because receiver return electrodes ERG are not positioned in locations that might catch the eye as shown in the second embodiment, the room aesthetics are not compromised. As well, in the case where insulator INS takes the form of tatami, ordinarily, by locating the receiver return electrodes on a part of the surrounding edge installed in the lengthwise direction of the tatami, it is possible to perform satisfactory communications while maintaining the appearance of tatami.

8. Fifth Embodiment

Figure 37:
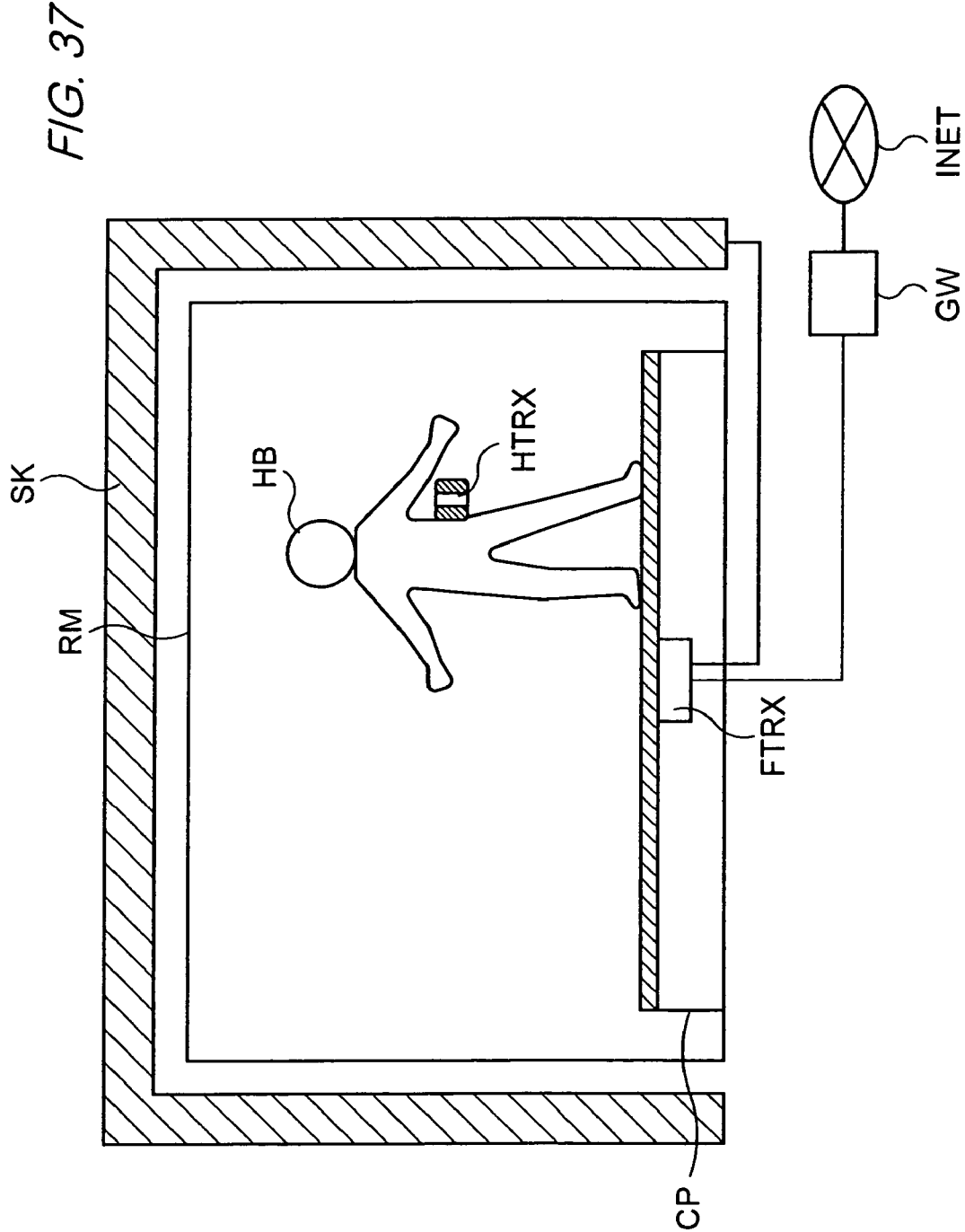
FIG. 37 shows the configuration of a communications system according to a fifth embodiment of the present invention.

Next, the fifth embodiment of the present invention is described. FIG. 37 shows a configuration of a communications system according to the fifth embodiment. The communications system according to the fifth embodiment of the present invention differs from the second embodiment in that a steel frame SK constructed in room RM substitutes for the receiver return electrodes ERG of the communications system according to the second embodiment. The steel frame SK that functions as a return electrode is connected to ground GND and electrode EOGa of receiver device FTRX. For the communications system according to the fifth embodiment, because the configuration is similar to those of the second embodiment except for steel frame SK, explanation is omitted.

When an electric field is generated by transmitter device HTRX, the electric field lines spread out along the human body HB, and reach receiver main electrode ERB of communications unit CP. The electric field lines that reached receiver main electrode ERB are collected into receiver device FTRX, and are collected into electro-optical crystal EOa through electrode EOBa for use with EOa connected to receiver main electrode ERB. The electric field lines collected into electro-optical crystal EOa are collected into steel frame SK connected to receiver device FTRX through electrode EOGa for use in EOa, The electric field lines collected into steel frame SK return to transmitter return electrode ESG of transmitter device HTRX through the air. Because steel frame SK is installed inside the walls, a place human body HB will not touch, there is no possibility of a short-circuit in the transmission path of the signal by touching human body HB with the steel frame SK, which is a return electrode.

Next, for the fifth embodiment of the present invention, operations will be explained for the case where transmitter device HTRX transmits data to communications apparatus connected to Internet INET. Moreover, because the operations up to the point where transmitter device HTRX generates an electric field are similar to those of the second embodiment, explanation is omitted.

When transmitter device HTRX provides an electric field in human body HB, a voltage difference arises between receiver main electrode ERB of receiver device FTRX and steel frame SK.

Receiver device FTRX, using light detector DTa, acquires from the voltage difference the modulated signal that transmitter device HTRX uses in order to transmit data. When receiver device FTRX demodulates the acquired modulated signal using demodulator DCa, receiver device FTRX acquires data that transmitter device HTRX transmitted. The acquired data is input to microcomputer MC2 of receiver device FTRX. The signal input to microcomputer MC2 is output to interface IF. The signal input to interface IF is sent to communications apparatus connected to Internet INET through gateway GW, after the signal is output from interface IF.

As explained above, according to the fifth embodiment of the present invention, the steel frame inside the walls of the building functions as the return electrode. Therefore, there is no problem of touching human body HB with steel frame SK establishing a return path, thereby interruption of communications can be prevented. As well, as in the second embodiment, because receiver return electrodes ERG do not need to be installed in the room, the configuration of the room is simplified compared to the second embodiment, and the room aesthetics are not compromised.

9. Sixth Embodiment

Figure 38:
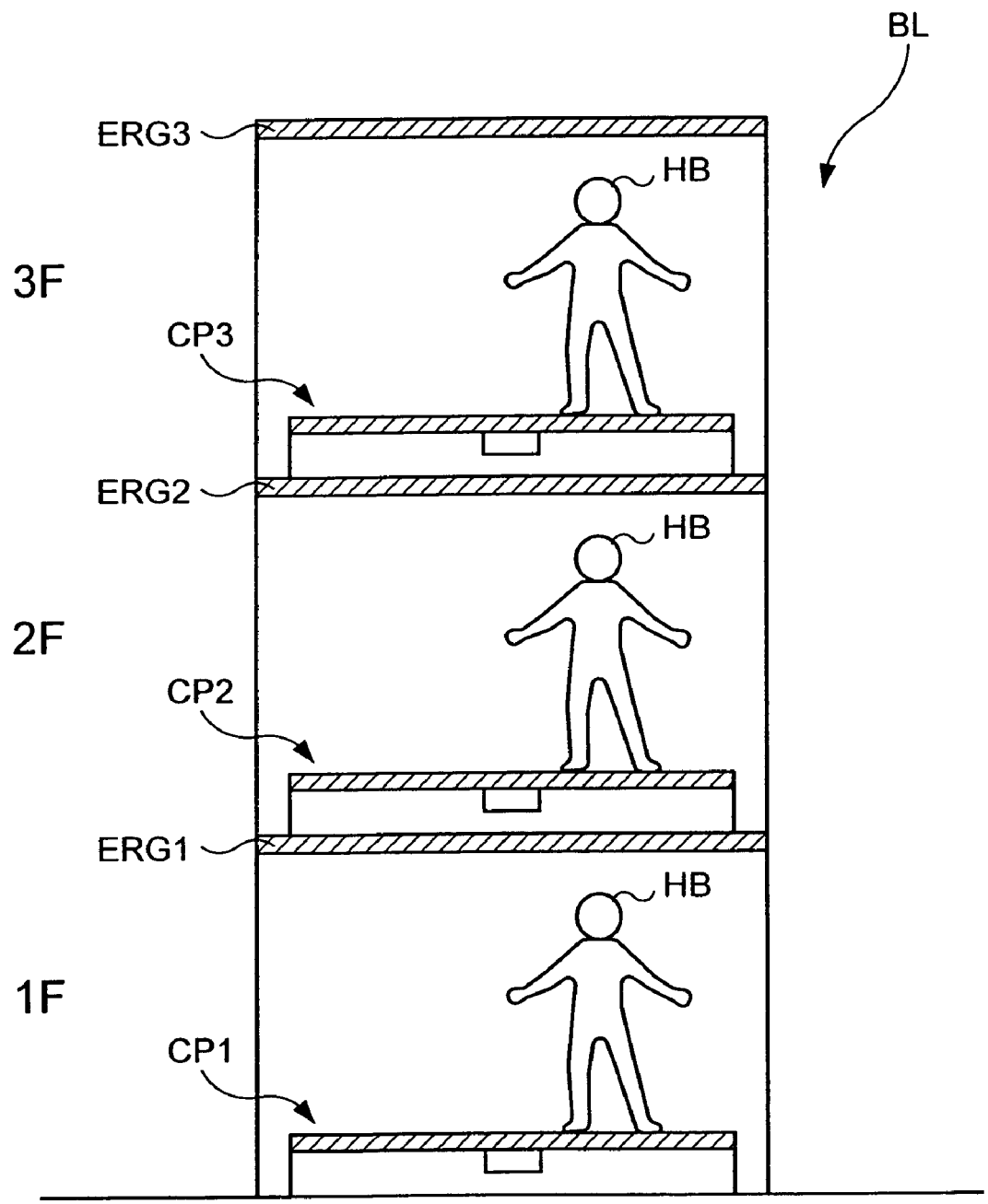
FIG. 38 shows the configuration of a communications system according to a sixth embodiment of the present invention.

Next, the sixth embodiment of the present invention is explained. FIG. 38 illustrates the configuration of a communications system according to the sixth embodiment of the present invention. As shown in FIG. 38, in the sixth embodiment of the present invention, the communications system in the second embodiment is disposed on several floors of a building. Moreover, in FIG. 38, gateway GW and Internet INET are not shown.

9-1. Configuration of the Sixth Embodiment

Building BL is a structure having at least three floors, and rooms on several floors have communications units CPn and receiver return electrodes ERGn installed (here, n is a number denoting the floor.). Receiver devices FTRXn involved in communication units CPn, provided on each floor (n is a number indicating the floor) are connected to gateway GW. Gateway GW is connected to Internet INET, which is connected to communications apparatus not shown, similarly to the second embodiment.

As well, the ground GND of the receiver devices FTRXn involved in each communications unit CPn is connected to receiver return electrodes ERGn installed in the ceiling of room RMn. The person on each floor has a respective transmitter device HTRXn (n is a number indicating the floor.).

When an electric field is generated by a transmitter device HTRXn, the electric field lines spread out along the human body HBn, and are collected into each receiver main electrode ERBn of communications unit CP (n is a number indicating the floor.). The electric field lines collected into receiver main electrode ERBn are collected into receiver device FTRX, and are collected into electro-optical crystal EOa through electrode EOBa for use in EOa connected to receiver main electrode ERBn. The electric field lines collected into electro-optical crystal EOa are collected into receiver return electrode ERGn connected to communications units CPn through electrode EOGa for use in EOa. The electric field lines collected into receiver return electrode ERGn return to transmitter return electrode ESG of transmitter device HTRX through the air. Because receiver return electrode ERGn is installed in the ceiling, a place where human body HB will not touch, there is no possibility of a short circuit in the transmission path of the signal by touching human body HB with receiver return electrode ERGn, which is a return electrode.

9-2. Example Operations of the Sixth Embodiment

Next, in the sixth embodiment of the present invention, operations in the case of transmitter device HTRX transmitting data to communications apparatus connected to Internet INET will be described with an example of the second floor of building BL.

First, in transmitter devices HTRX2 belonging to people on the second floor, data that transmitter devices HTRX2 transmit are output to modulator device EC1 from microcomputer MC1. When signals output from microcomputer MC1 are input to modulator device EC1, modulator device EC1 modulates the carrier waves in response to the signal. The carrier wave has a frequency above the tens of kHz which shows good conductivity through a human body. A transmitter device HTRX2 generates a voltage difference between transmitter main electrode ESB and transmitter return electrode ESG in response to the amplified signal, after transmitter device HTRX2 amplifies the modulated signal in the transmitter amplifier of demodulator EC1. Transmitter device HTRX2 provides an electric field with human body HB2.

In receiver device FTRX2 a voltage difference arises between receiver main electrode ERB and receiver return electrode ERG2 in response to the electric field generated in human body HB2. Then, in response to the voltage difference, the refractive index of electro-optical crystal EOa changes. The change in the refractive index of electro-optical crystal EOa is measured by light detector Dta. The change in the refractive index is converted into an electric signal. The change in the refractive index is based on the change in the electric field. The change in the electric signal is based on the signal modulated in transmitter device HTRX2 radiating the electric field. The converted electric signal is output from light detector DTa, and is input to demodulator DCa.

Demodulator DCa demodulates the signal output from light detector DTa. The signal output from microcomputer MC1 of transmitter device HTRX2 is obtained. The signal modulated by modulator DCa is output from demodulator apparatus DCa, and input to microcomputer MC2 of receiver device FTRX. The signal input to microcomputer MC2 is output to interface IF. The signal input to interface IF is sent to communications apparatus connected to Internet INET through gateway GW, after it is output from interface IF.

As described above, according to the sixth embodiment of the present invention, said transmitter apparatus HTRXn belonging to a person on each floor performs communications using communications units CPn and receiver return electrodes ERGn. Therefore, the communications systems provided on each floor become capable of operating independently.

10. Modifications

Modification 1

Figure 39:
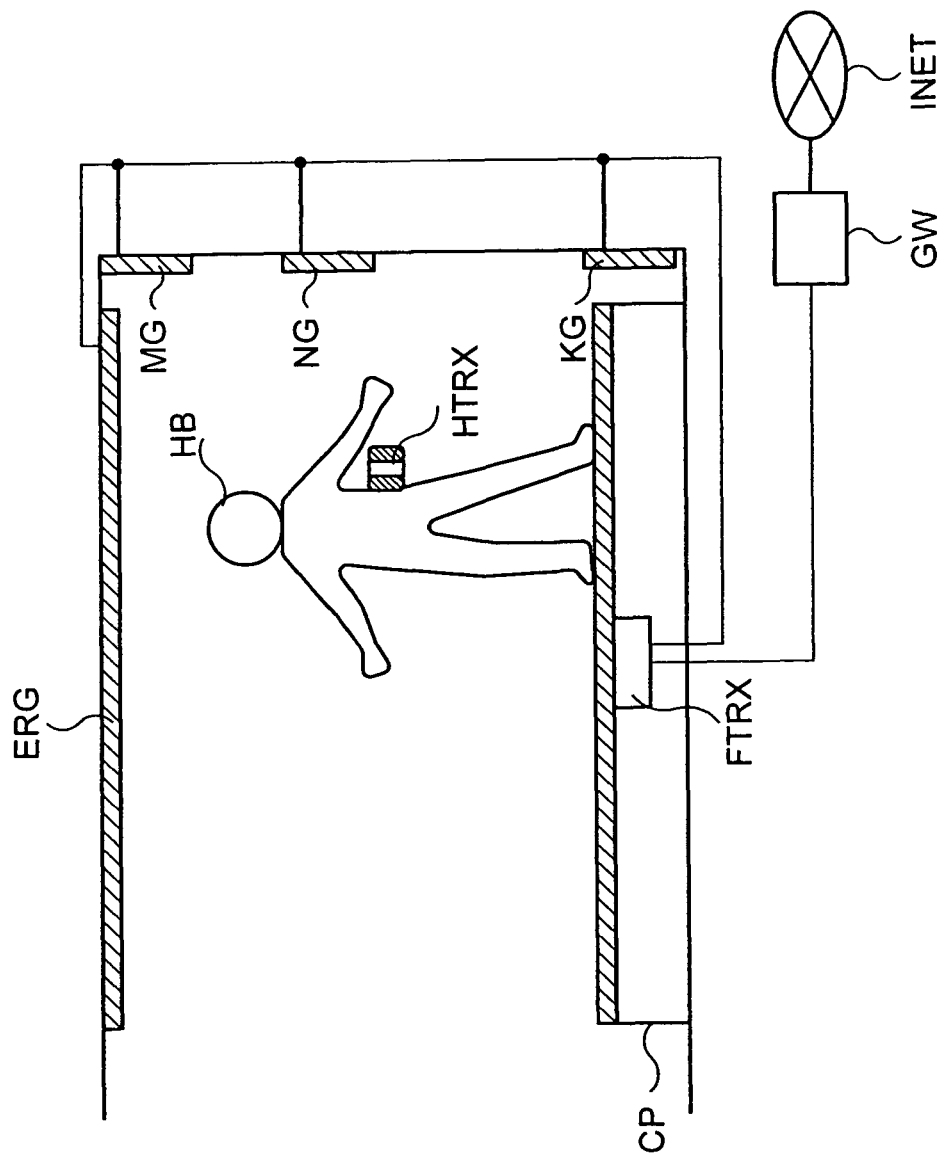
FIG. 39 shows a modification form of the electrode layout in the receiver return path.

With the embodiments above, receiver return electrode ERG of receiver device FTRX is installed in the ceiling, but the installation locations is not restricted in the ceiling. For example, as shown in FIG. 39, the installation location may be places where a human body HB could not easily touch, such as the "mawaridzuke" part (a horizontal member which is provided on a upper part of a wall) of the wall surface (receiver return electrode MG), the "nageshi" part (a horizontal member which is provided on a wall between two pillars) of the wall surface (receiver return electrode NG), and the "habaki" part (a horizontal member which is provided on a lower part of a wall) of the wall surface (receiver return electrode KG), etc., these other places are allowed.

Modification 2

With the above embodiment, a carpet or tatami or the like is layout on the upper surface of receiver main electrode ERB, but what is layout on the upper surface of receiver main electrode ERB is not restricted to those. A rug, an artificial lawn, a rubber mat or the like may be layout on receiver main electrode ERB.

Modification 3

Figure 40:
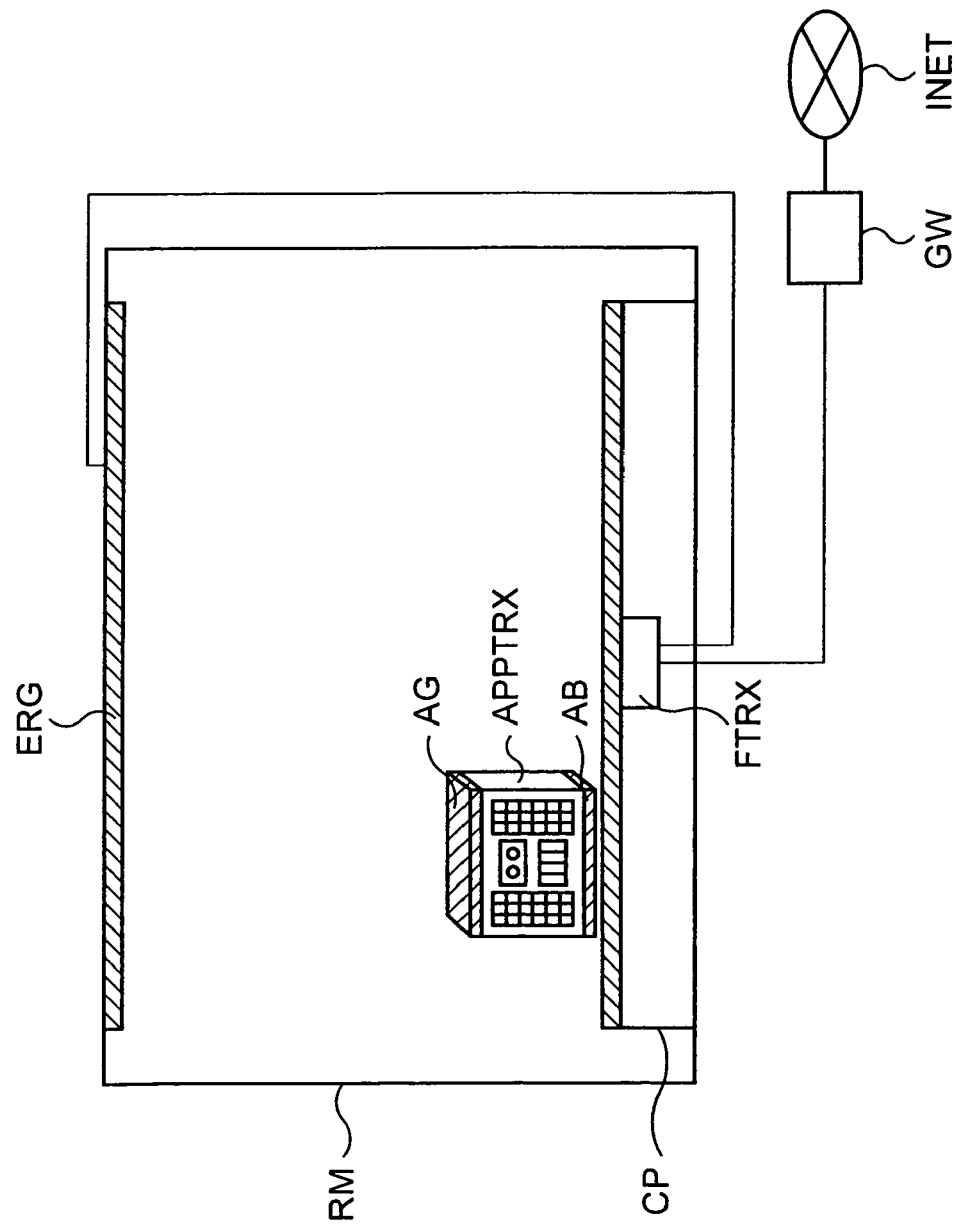
FIG. 40 shows the configuration of a communications system according to a third modification of the present invention.

A transmitter device worn on a human body can also be worn on consumer electronic devices, plants and animals, and the like. As well, for the present invention, the communications system may have no dielectric such as a human body HB. FIG. 40 shows an example of electronic device APPTRX having functions of transmitter device HTRX. Electronic device APPTRX is an electronic device such as a television or a radio, a personal computer, etc. Electronic device APPTRX has a microcomputer and a modulator, similarly to transmitter device HTRX. The modulator is connected to transmitter main electrode AB. As well, ground GND of electronic device APPTRX is connected to receiver return electrode AG. The surfaces of transmitter main electrode AB and receiver return electrode AG are both covered with insulator.

In the electronic device APPTRX, transmitter main electrode AB of electronic device APPTRX faces receiver main electrode ERB of communications unit CP by putting electronic device APPTRX on top of communications unit CP. Thus, it is possible to perform communications that use electric fields. Thus, electronic device APPTRX can perform communications with communications apparatus connected to Internet INET through gateway GW.

Moreover, in the case of performing communications with an electronic apparatus APPTRX and communications apparatus FTRX in communications unit CP as described above, there is no need to restrict the frequency of the carrier wave used in order to generate an electric field in the range of above the tens of kHz indicated for good conductivity in the human body. This is because they are not using a human body HB as the conductive path. In other words, one may use carrier waves that have carrier frequencies lower than those in the above range.

Modification 4

For the sixth embodiment, when insulator INS of communications unit CPn is thin, there is possibility of coupling between electrode ERBn and receiver return electrode ERG(n−1) installed in the ceiling of the building floor directly below the point where receiver return electrode ERBn is installed. In order to prevent this, one may thicken the insulator INS of each communications unit CPn while introducing an insulator between receiver return electrode ERGn installed in the ceiling of each building floor and the ceiling. According to the modification, it is possible to reduce the possibility of coupling arising between receiver main electrode ERBn and receiver return electrode ERG(n−1).

Modification 5

Figure 41:
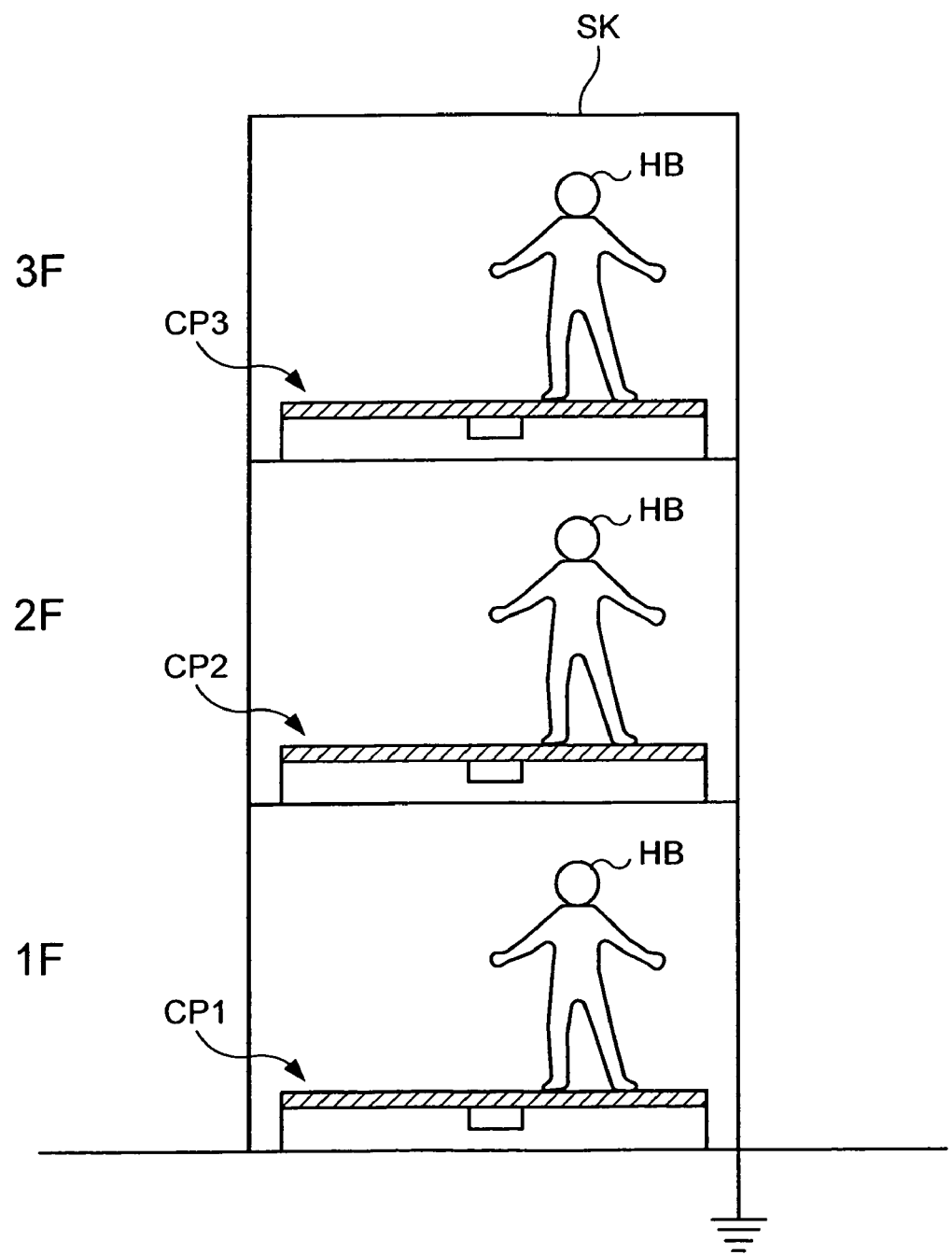
FIG. 41 shows the configuration of a communications system according to a fifth modification of the present invention.

In the sixth embodiment of the present invention, receiver return electrode ERGn is installed in each floor. However, a steel frame SK constructed in building BL may substitute for receiver return electrode ERG, as shown in FIG. 41. According to the modification, it becomes possible to easily install the communications system because there is no need to have a return electrode in each room.

Modification 6

As well, if transmitter device HTRX and receiver device FTRX use multiple carrier frequencies, it is possible to increase the number of transmitter devices HTRX that can communicate with one communications unit CP.

Modification 7

As well, for the above embodiments, transmitter main electrode ESB of transmitter device HTRX is assumed to be in contact with human body HB, but may also be on clothing and some distance beyond it.

Modification 8

One may include the functions of transmitter and receiver into one cabinet. The function integrated device may be worn on human body HB or may be included in communications unit CP. A transmitter device may have one main electrode which has functions of transmitter main electrode and receiver main electrode. The transmitter device may also have one return electrode which has functions of transmitter return electrode and receiver return electrode. Of course, the transmitter device may have a separate transmitter main electrode and receiver main electrode, or a separate transmitter return electrode and receiver return electrode. According to the modification, it is possible to perform bi-directional communications between a communications apparatus worn on the human body HB and communications apparatus involved in communications unit CP. As well, in a modification in which a communications apparatus has functions of transmitter and receiver devices and the communications apparatus is involved in communications unit CP, communications unit TCP, and communications unit TMA, the communications apparatus may have the functions of a router. As well, transmitter device may be installed in a communications unit, and a human body may wear a receiver device. In this case, the transmitter main electrode of the transmitter device is formed on the upper surface of the communications unit, and the transmitter return electrode of the transmitter device is formed in some location such as the ceiling that does not touch the human body.

Figure 42:
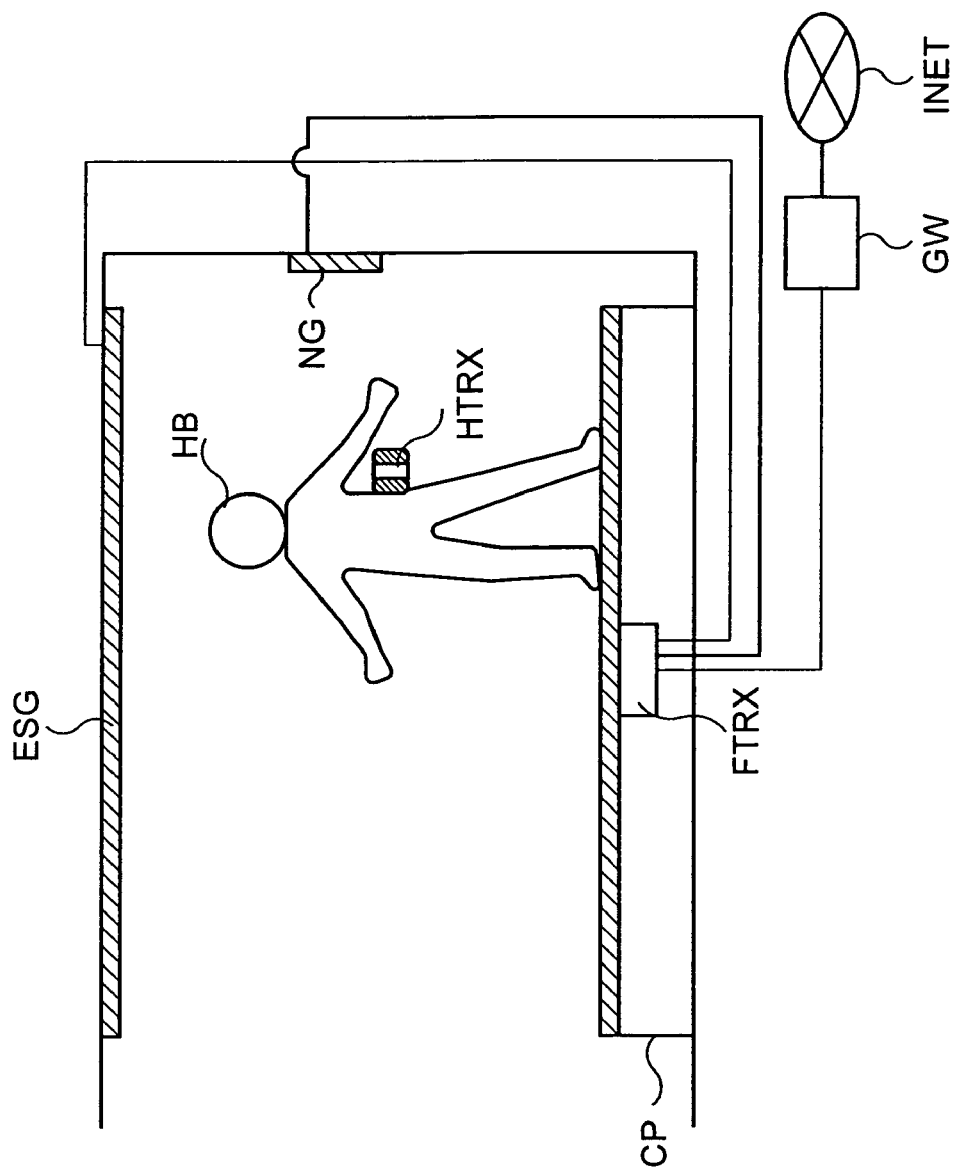
FIG. 42 shows the layout of transmitter and receiver return electrodes according to an eighth modification.

In a case that a communications apparatus has functions of transmitter and receiver devices and the communications apparatus is involved in communications unit CP, one may install the receiver return electrode ESG in the ceiling, and receiver return electrode NG in the room's "nageshi" part (a horizontal member which is provided on a wall between two pillars), as shown in FIG. 42. Of course, the layout locations of transmitter return electrodes ESG and receiver return electrodes ERG, apart from the above locations, may the "mawaridzuke" (a horizontal member which is provided on a upper part of a wall), or the "habaki" locations (a horizontal member which is provided on a lower part of a wall). As well, one may also install transmitter return electrodes ESG and receiver return electrodes ERG in the same parts of the same room.

Figure 43:
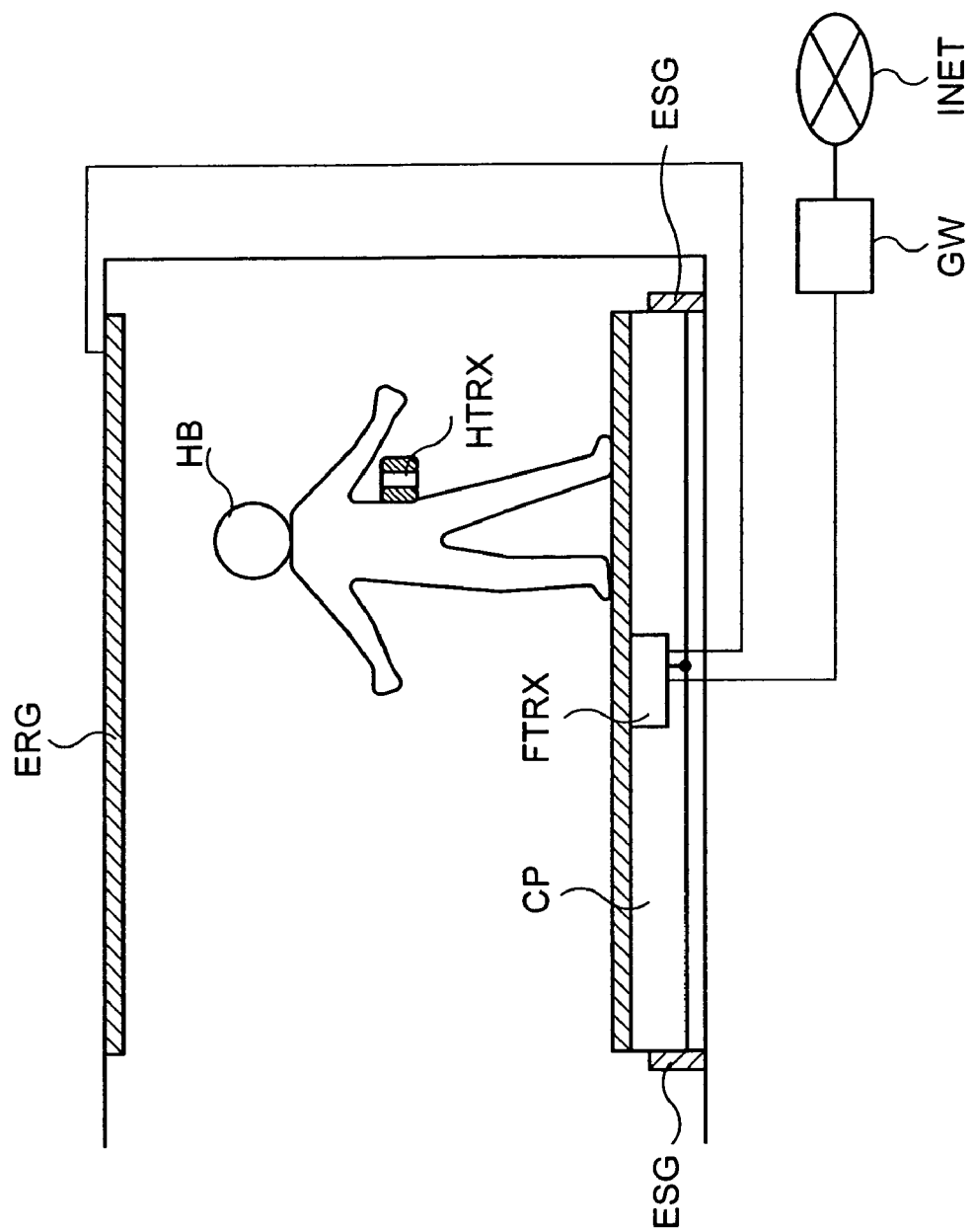
FIG. 43 depicts an example of a modification of the array of transmitter and receiver return electrodes, according to an eighth modification.

Furthermore, as shown in FIG. 43, transmitter return electrodes ESG may be formed on a side face of communications unit CP, and receiver return electrodes ERG may be installed in the ceiling. In that case, one may install receiver return electrodes in the "mawaridzuke", "nageshi" and "habaki" locations. As well, in that case, a steel frame constructed in room RM may substitute for receiver return electrode.

As well, in the case where a steel frame is constructed in the room as an electrode, the steel frame may have a function of transmitter return electrode of the transceiver involved in communications unit CP. Alternatively, the steel frame may have functions of transmitter return electrode and receiver return electrode.

Figure 44:
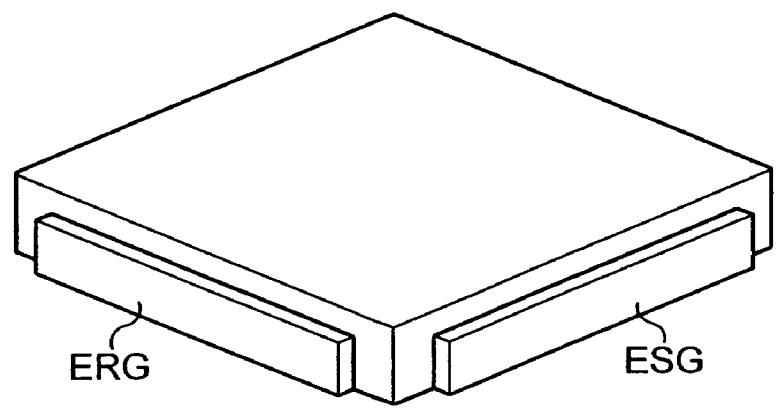
FIG. 44 shows an example where the transmitter return electrodes and receiver return electrodes are formed on communications unit CP according to an eighth modification.
Figure 45:
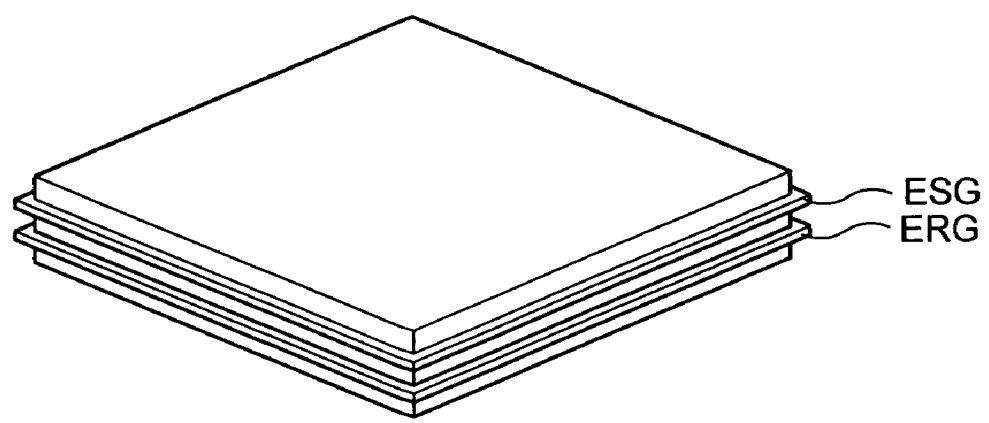
FIG. 45 shows another example where the transmitter return electrodes and receiver return electrodes are formed on communications unit CP according to an eighth modification.

In the case where a transceiver is involved in communications unit TCP, as shown in FIG. 44, transmitter return electrodes may be formed on a side face of insulator INS, and receiver return electrodes may be formed on a side face that are orthogonal to the side where transmitter return electrodes ESG is formed. As well, as shown in FIG. 45, one may lay out transmitter return electrodes ESG and receiver return electrodes ERG to surround the sides of insulator INS.

Modification 9

In the above embodiments, in order to make it possible to perform more stable communications, transmitter return electrode ESG of communications apparatus HTRX is grounded. In addition, receiver return electrode ERG provided in the ceiling and the walls is grounded. In this way, in order for it to be possible to perform stabilized communications, it is preferable to supply a stabilized voltage to transmitter return electrode ESG and receiver return electrode ERG. Accordingly, each of transmitter return electrode ESG and receiver return electrode ERG may be connected to the low impedance signal sources such as cabinet CS1, CS2, plus power supply, or minus power supply capable of providing the same stabilized voltages. Moreover, even in the case that the same stabilized voltages are not supplied to transmitter return electrode ESG and receiver return electrode ERG, it is possible to perform communications. As well, if the electric field generated by transmitter device HTRX is sufficiently stabilized, transmitter return electrode ESG need not be connected to anything.

Modification 10

In the fourth embodiment described above, the electrode FG is formed on both sides in the lengthwise direction of communications unit TMA, however receiver return electrode ERG can be formed on only one side.

Modification 11

With the embodiments described above, communications unit CP, communications unit TCP and communications unit TMA take a rectangular shape, but they are not restricted to rectangular shapes. They may be circular or elliptical, or any of other various non-rectangular shapes.

Modification 12

In the embodiments described above, various communications units and receiver return electrodes ERG are installed in a room of a building, however, the installation of the various communications units and return electrodes is not restricted to rooms. The various communications units and return electrodes may be installed in the structure of a car, a ship or an aircraft, or the like.

Modification 13

In the embodiments described above, an insulator covers a face of the receiver return electrode ERB which contacts to a human body HB, the insulator may cover entire electrode. As well, the electrode may not be covered with the insulator because the operation of the communications system would not change even without the insulator. However, transmitter main electrode HSB and receiver main electrode ERB ordinarily contain metal ions because they are made of conductive material. There are cases in which prolonged contact with materials containing metal ions triggers metal allergies in human skin. In order to prevent this problem, the surfaces of transmitter main electrode HSB and receiver main electrode ERB are covered with an insulator in the present invention. As well, covering the surfaces of transmitter main electrode HSB and receiver main electrode ERB with an insulator prevents such rare events as electric shocks since human body HB is insulated from transmitter device HTRX and receiver device FTRX.

Modification 14

Electrode EOBa for use with EOa and electrode EOGa for use with EOa are preferably the same size or even smaller than the size of the base or the upper surface of electro-optical crystal EOa, however they are not restricted to these sizes. Of course, the shape of electro-optical crystal EOa is not restricted to being columnar either. As well, electrode EOBa for use with EOa and electrode EOGa for use with EOa need not only be contacted to electro-optical crystal EOa, but to have electro-optical crystal EOa interposed between them. In addition, electrode EOBa for use with EOa is not necessarily connected to receiver main electrode ERB, and electrode EOGa for use with EOa is not necessarily connected to receiver return electrode ERG. In other words, if electrode EOBa for use with EOa and receiver main electrode ERB, and electrode EOGa for use with EOa and receiver return electrode ERG, are provided so as to respectively adjoin, even without being connected, it is possible for them to fulfill something like the same function.

Modification 15

In the embodiments described above, transmitter devices and receiver devices have both electrodes and return electrodes, but the devices need not have return electrodes. For example, in the configuration shown in FIG. 11, grounded cabinet CS1 may substitute for receiver return electrode ERG. Furthermore, receiver return electrode ERG of receiver device FTRX may be removed, and electrode EOGa for use with EOa may be grounded. A communications apparatus may have functions of communications apparatus HTRX and FTRX.

Modification 16

In the embodiments described above, the layout of receiver main electrodes ESB and receiver return electrodes ESG of communications apparatus HTRX may be changed each other. Furthermore, the layout of receiver main electrodes ERB and receiver return electrodes ERG of communications apparatus FTRX may also be changed each other. In other words, a main electrode may be installed in the ceiling, and a return electrode may be formed on a surface of the communications unit CP. In this case, while the polarity of the measured voltage differences measured will be reversed, one may use a demodulator system such as FM unrelated to polarity. Alternatively, communications system HTRX and communications system FTRX may have a polarity inversion circuit.

Modification 17

For the embodiments described above, the surfaces of cabinets CS1 and CS2 may be covered with an insulator.

F. Seventh Embodiment

Next, an explanation will be given for methods for performing charging of the electronic devices, using the communications system described in the above embodiments.

Figure 46:
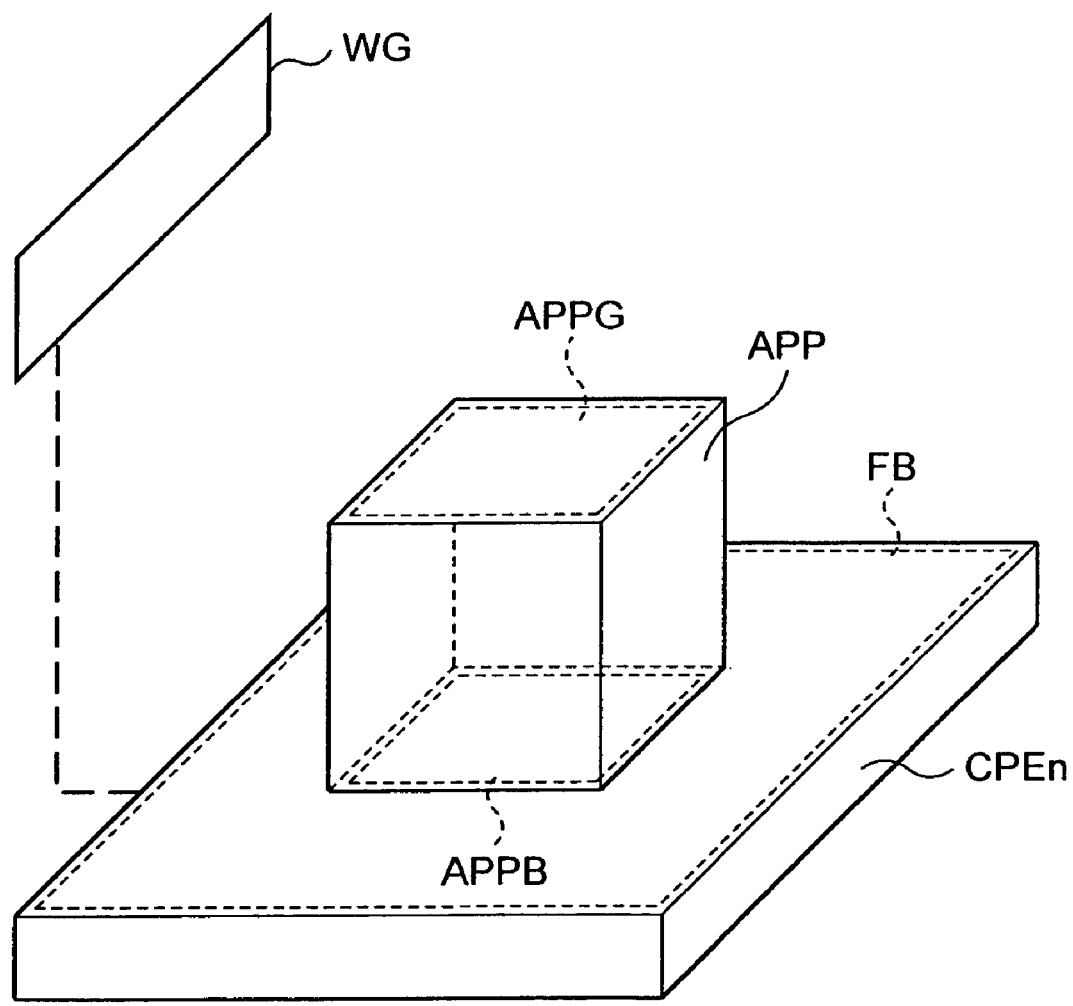
FIG. 46 shows an electronic device APP with a tile carpet CPEn according a seventh embodiment of the present invention.

A tile carpet CPEn according to the present embodiment is unitary flooring and is laid out over the floor. As well, tile carpet CPEn involves communications apparatus FTRX which has functions of transmitter devices and receiver devices explained using the embodiments described above. As shown in FIG. 46, main electrodes FB is formed on a surface of tile carpet CPEn. The surfaces of main electrodes FB are covered with an insulating layer. As well, the communications apparatus FTRX involved in tile carpets CPEn is connected to return electrodes WG installed in the walls of the room. On the other hand, electronic device APP is, for example, an electronic information device such as a television or a personal computer. Electronic devices APP have main electrodes APPB on the lower surface, and return electrodes APPG on the upper surface. The surfaces of main electrodes APPB and return electrodes APPG are also covered with an insulating layer.

Figure 47:
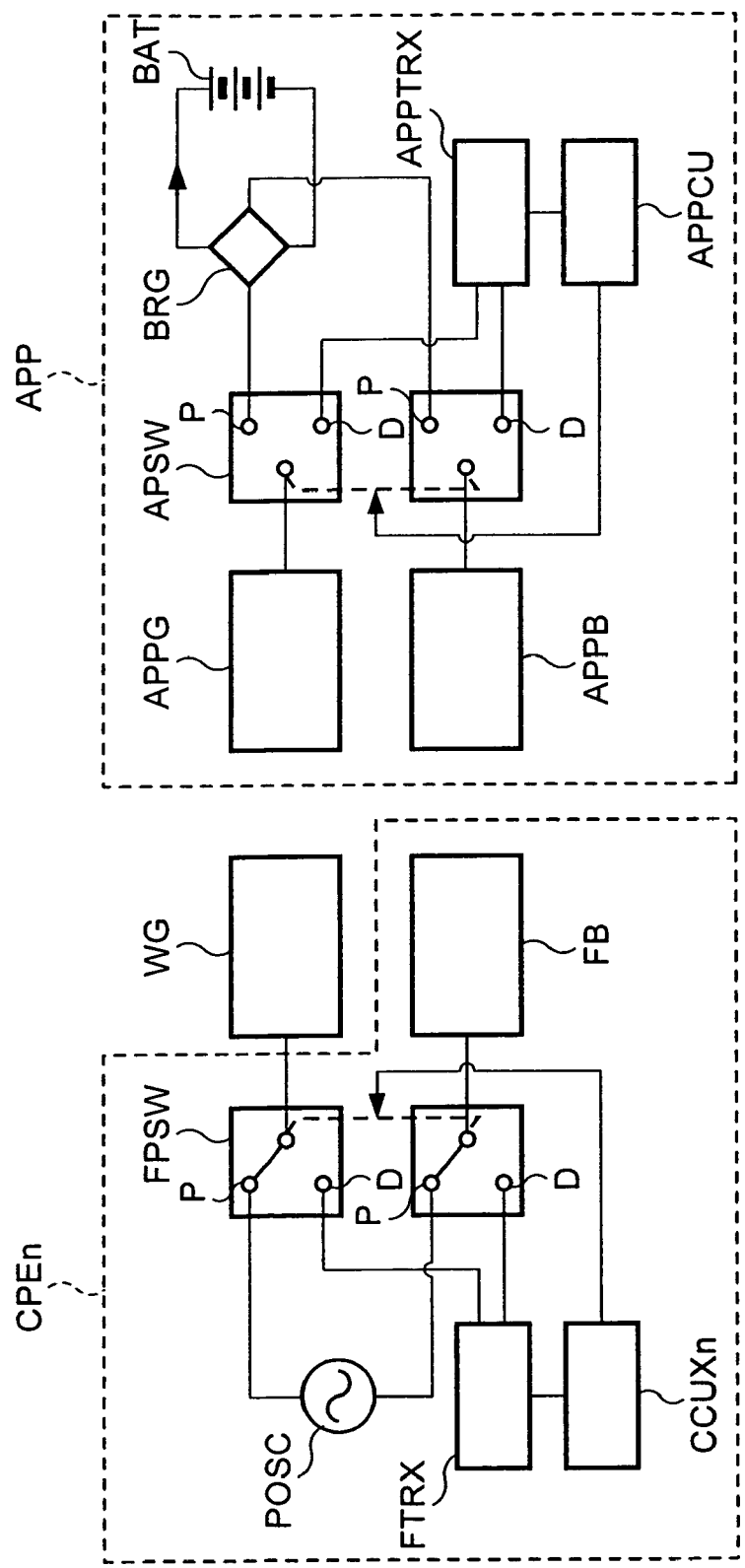
FIG. 47 shows the circuit configuration of an electronic device APP and a tile carpet CPEn according to the seventh embodiment.

Tile carpet CPEn has communications controller apparatus CCUX, communications apparatus FTRX, oscillator POSC, and partition switch FPSW, as shown in FIG. 47. As well, electronic device APP has control unit APPCPU that controls each part of said electronic device APP, communications apparatus APPTRX, partition switch APSW, rectification circuit BRG, and chargeable battery BAT.

Communications control apparatus CCUX involved in tile carpet CPEn switches over to charge mode, in a case that communications control apparatus CCUX receives a command to direct a switchover to charge mode sent from electronic device APP. In charge mode, communications control apparatus CCUXn first transmits to partition switches FPSW a switchover signal, and connects both of two partition switches FPSW to P. In electronic apparatus APP, both of two partition switches APSW are connected to P, under the control of control unit APPCPU. Moreover, tile carpet CPEn may have an operation button for operating the switchover of partition switch FPSW, on its upper surface. Furthermore, partition switch FPSW may be switched over to P or D by the user operating the operation button.

Then, communications controller unit CCUXn may generate an AC voltage for performing charging of electronic appliance APP, by using oscillator POSC. In this way, an AC voltage is induced between main electrode APPB and return electrode APPG of electronic apparatus APP though main electrode FB or return electrode WG. Rectifier circuit BRG rectifies the AC voltage and obtains a DC voltage. Electronic apparatus APP obtains the DC voltage from rectifier circuit BRG and charges the battery. In communications mode, all of partition switches FPSW of tile carpet CPEn and partition switches APSW of electronic apparatus APP are connected to D. Thus, communications can be performed using an electric field between communications apparatus FTRX and communications apparatus APPTRX.

Figure 48:
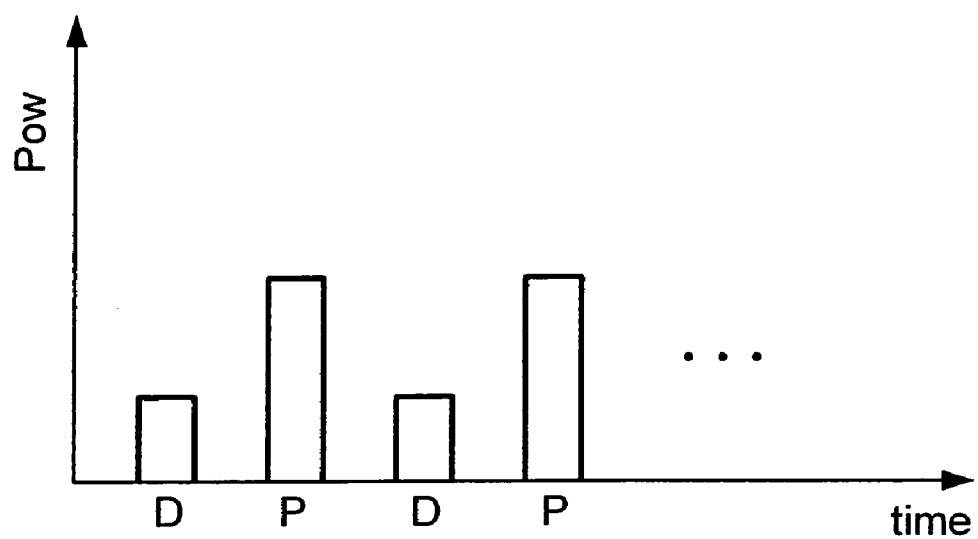
FIG. 48 shows a switching operation of partition switches FPSW and APSW in the case of time-dividing between a charge mode and communications mode, for the seventh embodiment.

Moreover, by repeating the operation of switching over partition switches FPSW from P and D by synchronizing partition switches APSW of electronic apparatus APP, it is possible to perform time-sharing of charge mode and communications mode. FIG. 48 illustrates the switchover operation of the partition switches FPSW and APSW for the above case. In FIG. 48, "D" denotes the operation mode is the communication mode in which all of partition switches FPSW and APSW are connected to D. Similarly, "P" denotes the operation mode is the communication mode in which all of partition switches FPSW and APSW are connected to P. In FIG. 48, the horizontal axis represents time, and the vertical axis represents the field strength.

Figure 49:
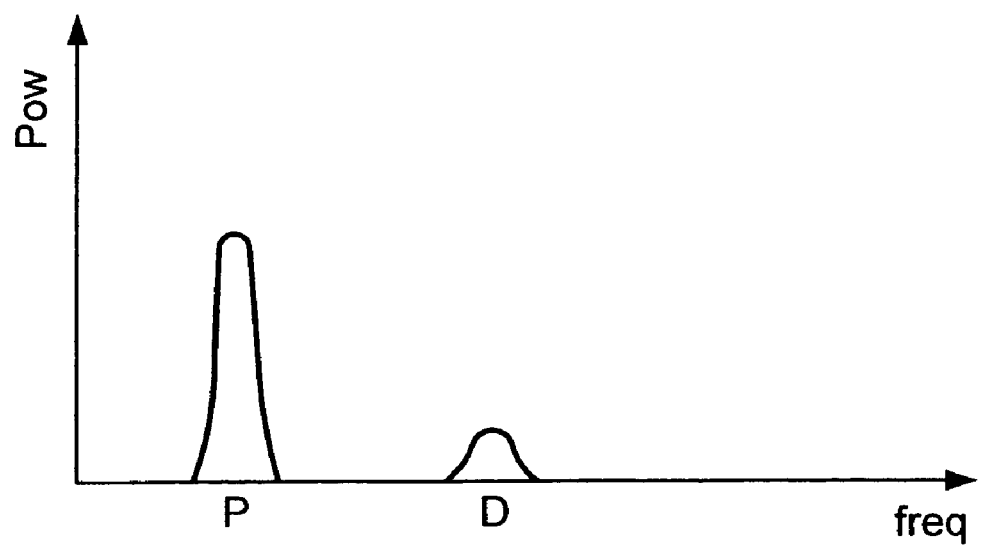
FIG. 49 shows an example where the frequency P of the AC voltage for charging and the carrier frequency D of the carrier wave have been made to differ, in accordance with the seventh embodiment.

As well, as shown in FIG. 49, it becomes possible to perform charge mode and communications mode simultaneously by using frequency band P for the AC voltage used for charging which is different from the frequency band D of the carrier wave used in communications. In FIG. 49, the horizontal axis represents the frequency, and the vertical axis represents field strength. However, in this case, it is necessary to provide a circuit that applies a multiplexed AC voltage between main electrode FB and return electrode. The multiplexed AC voltage is an AC voltage obtained by multiplexing the AC voltage (frequency band P) used for charging provided from oscillator POSC and the AC voltage (frequency band D) used for communications provided from communications apparatus FTRX. Furthermore, it is necessary to provide a circuit that isolates the component of AC voltage for communications and the component of AC voltage for charging from the AC voltage induced between main electrode APPB and return electrode APPG. The circuit outputs to communications apparatus APPTRX the component of the AC voltage used for communications, and to rectifier circuit BRG, the components of the AC voltage used for charging.

As well, in this case, it is preferable to provide a circuit that detects whether there is a carrier frequency component for use in communications or in recharging from the AC voltage induced between main electrode APPB and return electrode APPG. According to this configuration, electronic device APP can determine whether the location on which said electronic device put is the top of a tile carpet CPEn capable of charging, or on top of a tile carpet CPEn capable of communication.

Moreover, for charging electronic device APP, a primary coil may substitute for return electrode WG and main electrode FB, and a secondary coil may substitute for main electrode APPB and return electrode APPG. With this configuration, an AC voltage is induced in the secondary coil by mutual induction. In this case, the primary coil is provided in the lower surface vicinity of the interior of electronic device APP, and secondary coil is provided in the upper surface vicinity of the interior of tile carpet CPEn. As well, it is preferable to draw a line or a mark that indicates location on which tile carpet should be positioned, in order that the relative position of the primary coil and the secondary coil is appropriate.

Modifications of the Seventh Embodiment

Modification 1

For the seventh embodiment, communications control apparatus CCUXn, communications apparatus FTRX in tile carpet CPEn, and electronic apparatus APP may perform an operation as described below. Communications control apparatus CCUXn controls communications apparatus FTRX to transmit a notification signal that notifies of the existence of said communications control apparatus CCUXn at a regular interval. Electronic apparatus APP demodulates data transmitted from communications apparatus FTRX based on the measured result of the voltage difference between main electrode APPB and return electrode APPG. Electronic apparatus APP shows on a display screen a message or mark that indicates that electronic device APP is in the communications service area in a case electronic device APP continuously receives the notification more than a predetermined duration.

As well, in a tile carpet CPEn capable of performing charging of electronic apparatus APP, communications control apparatus CCUXn controls communications apparatus FTRX periodically transmit charging notification information that notifies of the ability to perform charging with said tile carpet CPEn, added to the notification signals. Electronic apparatus APP shows on a display screen a message or mark that indicates that electronic device APP is on tile carpet capable of charging in a case electronic device APP continuously receives the notification signals more than a predetermined duration.

Figure 50:
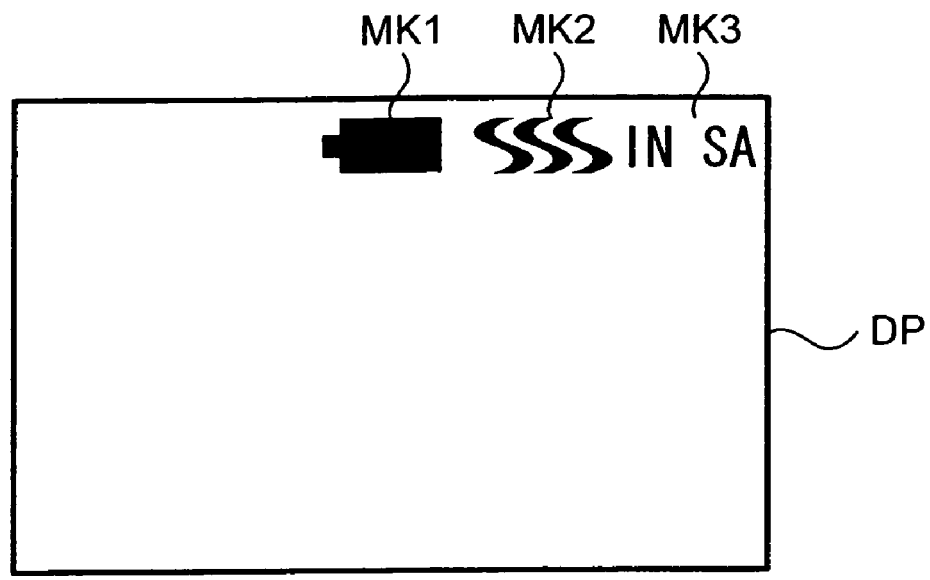
FIG. 50 shows an example of the screen of electronic device APP according to a modification of the seventh embodiment.
Figure 51:
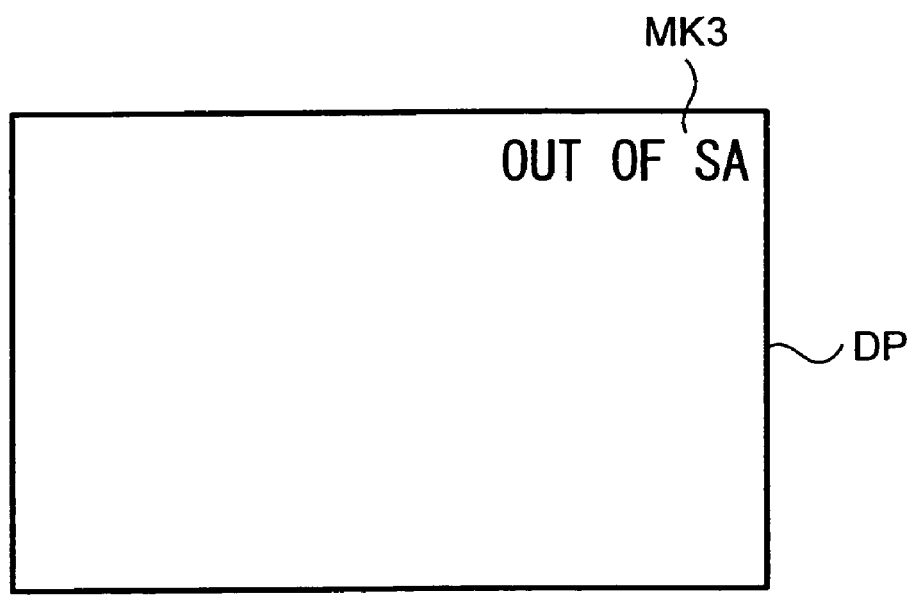
FIG. 51 shows another example of the screen of an electronic device APP according to a modification of the seventh embodiment.

FIG. 50 and FIG. 51 shows examples of image displayed on an electronic apparatus APP according to the present modification. In the case of electronic apparatus APP being on a tile carpet CPEn capable of charging, electronic device APP displays in the display image DP a charging mark MK1 indicating that charging is possible, an electric field strength mark MK2 indicating with a the number of waves the strength of the electric field reception level, and an area notification mark MK3 that indicates being inside the communications service area, as shown in FIG. 50.

As well, in the case of electronic apparatus APP being outside the communications area, charge mark MK1 and electric field strength mark MK2 are not displayed, and only area notification mark MK3 indicating that electronic apparatus APP is outside the communication area, in display image DP as shown in FIG. 51.

Of course, electronic apparatus APP may notify the information by audible message or the like, instead of charge mark MK1, electric field strength MK2 and area notification mark MK3. As well, the present modification may be applied to communications apparatus HTRX worn on human body HP.

10. Eighth Embodiment

In the above description, it is described that the system can perform communication in a case that the electrode facing the human body and the electrode facing space, for example, in a case of receiver return electrode ERG facing the human body and receiver main electrode ERB facing space. In this case, it is necessary to provide polarity inversion device.

A description will be given for an electric field communications apparatus having polarity inversion device.

Figure 52:
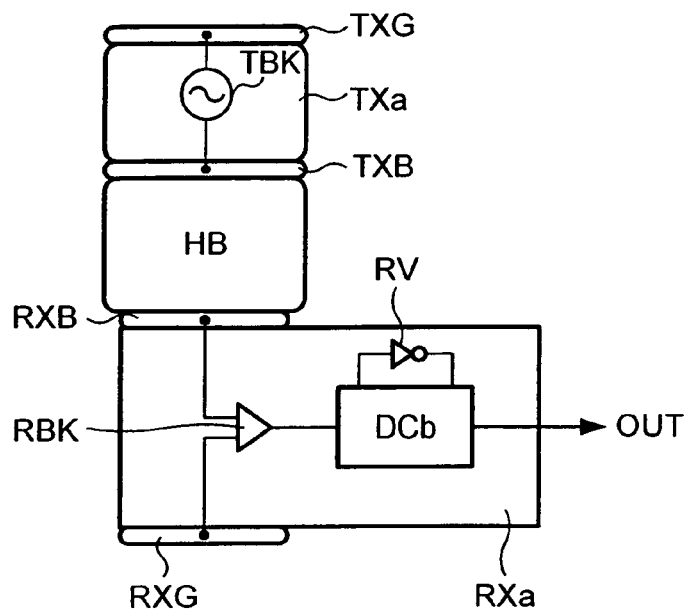
FIG. 52 is a block diagram showing a configuration of electric field apparatus TXa having a polarity inverter circuit for an eighth embodiment.

FIG. 52 is a block diagram showing a configuration of electric field communications apparatus TXa having a polarity inversion circuit. TXa is a transmitter device, and RXa is a receiver device. TXb and RXa have one set of electrodes on the outside of the cabinet. The electrodes TXB and RXB are formed to be facing onto the human body, and electrodes TXG and RXG are formed to be facing the space of the environment.

TXa applies a voltage modulated between electrodes TXB and TXG and transmits a signal, using a transmission block TBK. RXa measures the electric field generated between electrodes RXB and RXG and demodulates the signal, using the detection block RBK.

In the case where both TXB and RXB are formed facing the human body (or the space side), demodulation is correctly performed. However, in the case where one of TXB and RXB is formed facing the human body side (or the space side), the polarity of the signal measured by RXa is the inverse of that of transmitted signal.

Figure 53:
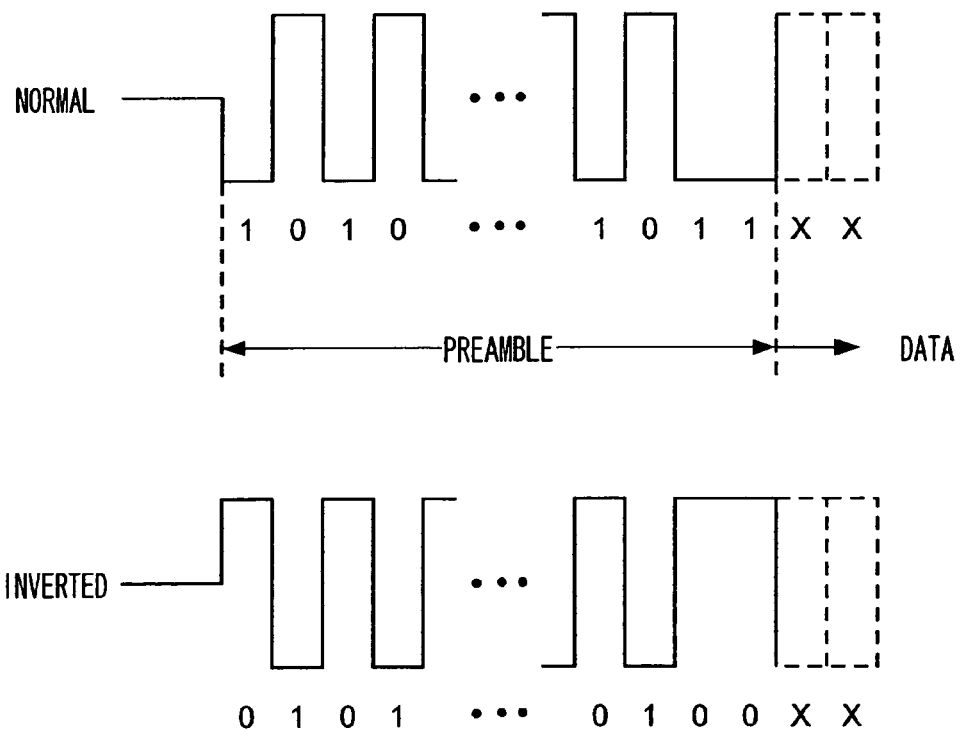
FIG. 53 is an example of signals with polarity inverted and not inverted.

FIG. 53 shows the signal output from detection block RBK in the cases where polarity is not inverted, and in the case where the polarity of the signal is inverted. For the present embodiment, in FIG. 53, the preamble transmitted preceding the 10Base-2 frames is shown as an example because the system uses 10Base-2 system. For a 10 Base2 Ethernet frame, "10" is repeatedly transmitted 31 times, and after that, "11" is sent, as the preamble preceding the frame. After "11", the main body of the Ethernet frame follows. The upper part of FIG. 53 shows the case where the polarity of this preamble part is correct, and the lower part of FIG. 53 shows the case where the polarity of the preamble part is reversed. Moreover, 10Base-2 relatively uses Manchester encoding, but for the sake of simplicity, in the example of FIG. 53, a code "1" corresponding to the negative voltage and a code "0" corresponding to the positive voltage.

Figure 54:
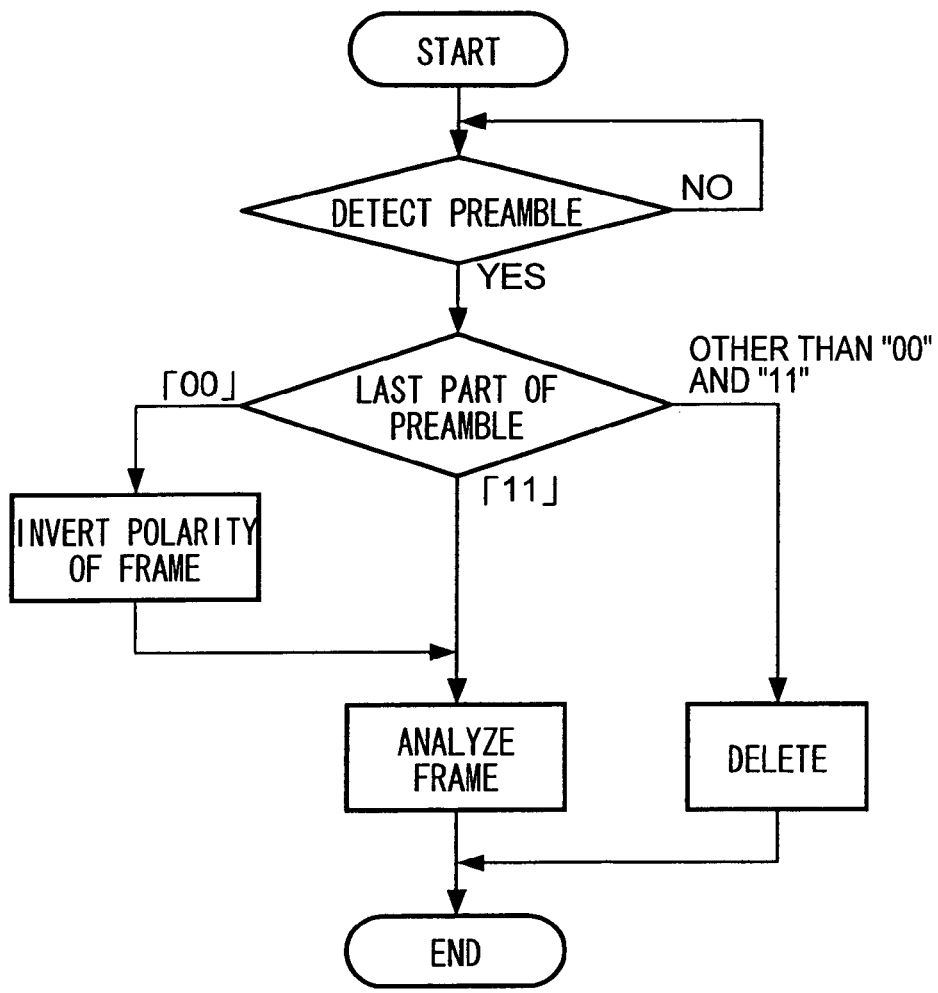
FIG. 54 is a flowchart of operations performed in electric field communications apparatus TXa.

The signal output from the detection block RBK is input to the Demodulator DCb of RXa. Demodulator DCb of RXa has a detection part for detecting the preamble of the signal, and performs the operations shown in FIG. 54.

First, Demodulator DCb performs detection of the preamble part. The detection of the preamble part is performed by detecting "10" or "01" sent a number of times in succession. When a number of consecutive "10" or "01" bit patterns have been detected, it is assumed that the detected signal corresponds to the preamble. Then, demodulator DCb waits for the last part of preamble, "11" or "00".

If a "11" bit pattern is detected after the wait function, the polarity of the preamble is correct. Therefore, Demodulator DCb demodulates without changing the polarity of the following Ethernet frame.

If a "00" bit pattern is detected, the polarity is inverted. Therefore, demodulator DCb demodulates the following Ethernet frame with its polarity being inverted. In this case, demodulator DCb inverts the polarity after taking in the body of one Ethernet frame, but it may also perform a bit-by-bit polarity inversion starting from the beginning of the Ethernet frame. In the case where neither "11" nor "00" is detected, the bit pattern of "10" or "01" is discarded and the operation ends.

With the method, even in the case where demodulator DCb does not receive all 31 of the "10" bit patterns of the preamble part, demodulator DCb can detect the delimiter of preamble and the delimiter for the Ethernet frame and inversion of the polarity.

Moreover, the state of inversion or non-inversion of the polarity is reset at the end of the analysis of any single frame. Thus, it is possible to be compatible with the polarity states of a variety of different transceivers.

When the preamble detection part detects that preamble begins with "0101" rather than "1010", it may be assumed that the probability of inversion of the polarity is high. In this case, demodulator DCb may invert the polarity of the following bits, using polarity inverter circuit RV. This provides an advantage of speeding up the operation, because there is no need to wait for the final bit pattern of the preamble.

Figure 55:
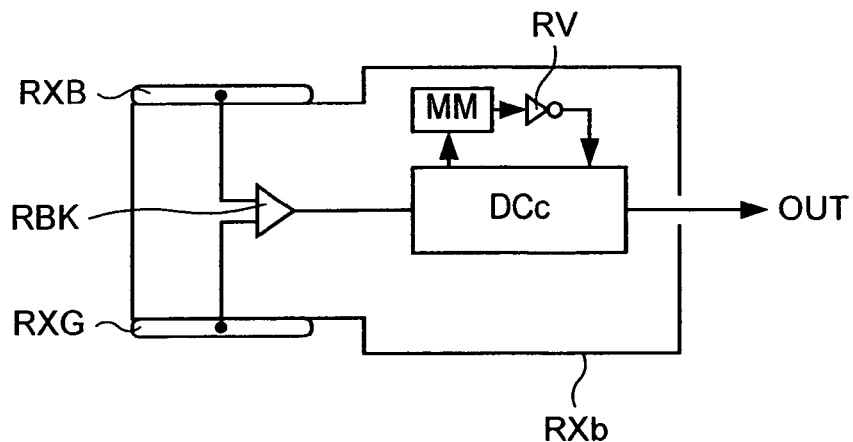
FIG. 55 is a block diagram of electric field apparatus RXb having a separate polarity inverter circuit of an eighth embodiment.
Figure 56:
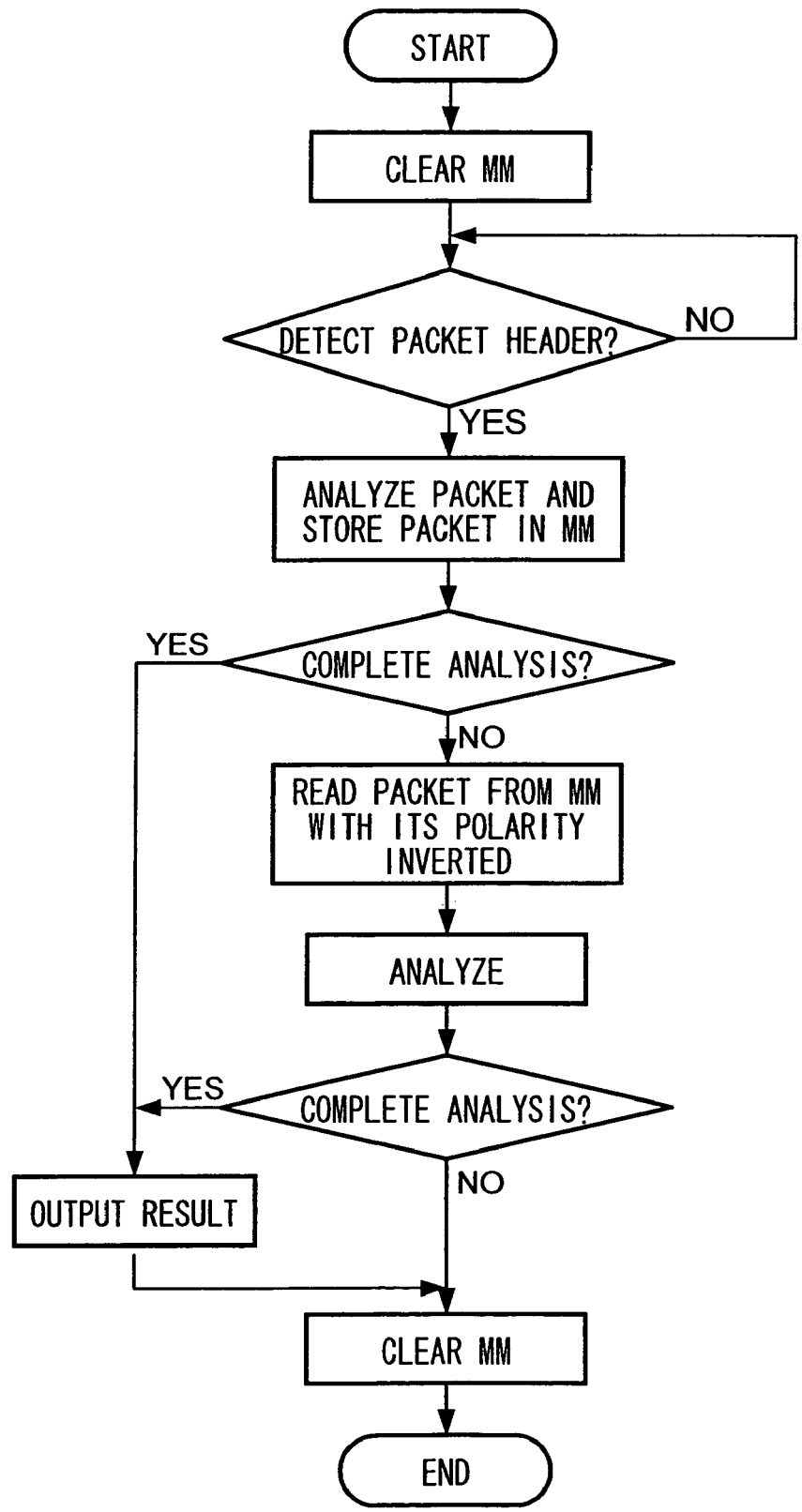
FIG. 56 is a flowchart of operations performed by electric field communications apparatus RXb.

FIG. 55 is a block diagram of an electric field communications apparatus RXb having another polarity inversion circuits. FIG. 56 shows a flowchart of operations performed in electric field communications apparatus RXb. In electric field communications apparatus RXb, demodulator DCc has a memory MM and an inversion circuit RV. First, electric field communications apparatus RXb prepares for reception of the Ethernet frame by clearing memory MM. Then, the demodulator DCc repeatedly determines whether input signals include an Ethernet frame header at a regular interval. In the case where a header is detected, demodulator DCc stores in memory MM the frame input by detection block RBk and demodulates the frame. In the case where demodulation is completed correctly, demodulator DCc outputs the demodulation result. The data stored in memory MM are deleted. The operation proceeds to the analysis of the next frame.

In the case where an error arose during demodulation, demodulator DCc inverts the polarity of the data stored in memory MM and reads the data. Demodulator DCc demodulates the data whose polarity is inverted. In the case where demodulation is completed correctly, demodulator DCc outputs the demodulation result. The data stored in memory MM are deleted. The operation proceeds to the analysis of the next frame.

In the case where, an error arises in both of above two analyses, the data stored in memory MM are deleted. Then, the operation proceeds to the analysis of the next frame.

Moreover, the situation of either an inverted or uninverted polarity, the analysis of each frame is reset each time. Thus, it is possible to correspond to the polarity situations of several transceivers that differ according to the installation conditions.

Figure 57:
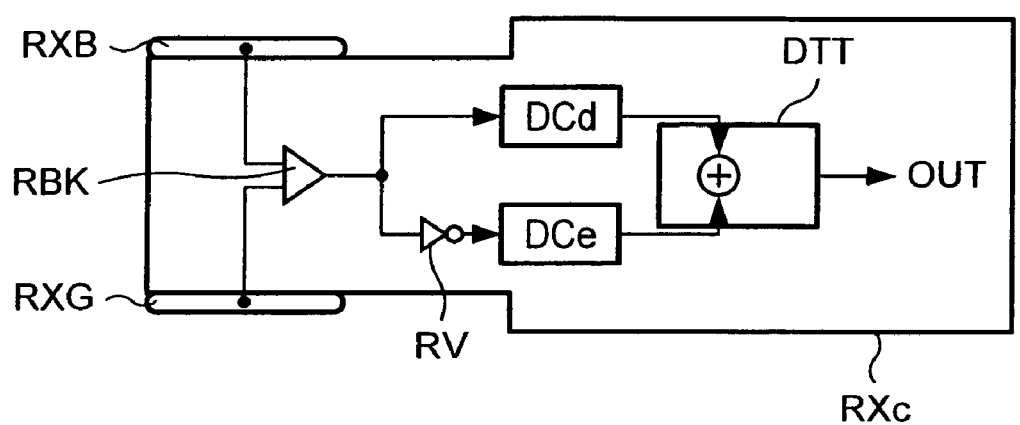
FIG. 57 is a block diagram showing another configuration of electric field apparatus RXc having a separate polarity conversion circuit.

FIG. 57 is a block diagram of electric field communications apparatus RXc having yet another polarity inversion devices. Electric field communications apparatus RXc has two demodulators (CDd and DCe). The demodulators are layout parallel. The polarity of signal at input of DT2 is inverted by inverter circuit RV.

The two demodulators analyze input frames, respectively. In the case where frame analysis succeeded, they output the results of the analysis. The output of the two demodulators is multiplexed by coupled demodulator device DTT. The multiplexed signal is output.

In the case that a correct frame is input, only DCd outputs the result. In the case that inverted frame is input, only DCe outputs the result. Thus, only one of DCd and DCe outputs the result. In the case of an error frame, none of DCd and DCe outputs the result. Thus, it is possible to correspond to the polarity situations of several transceivers that differ according to the installation conditions.

11. Ninth Embodiment

Figure 58:
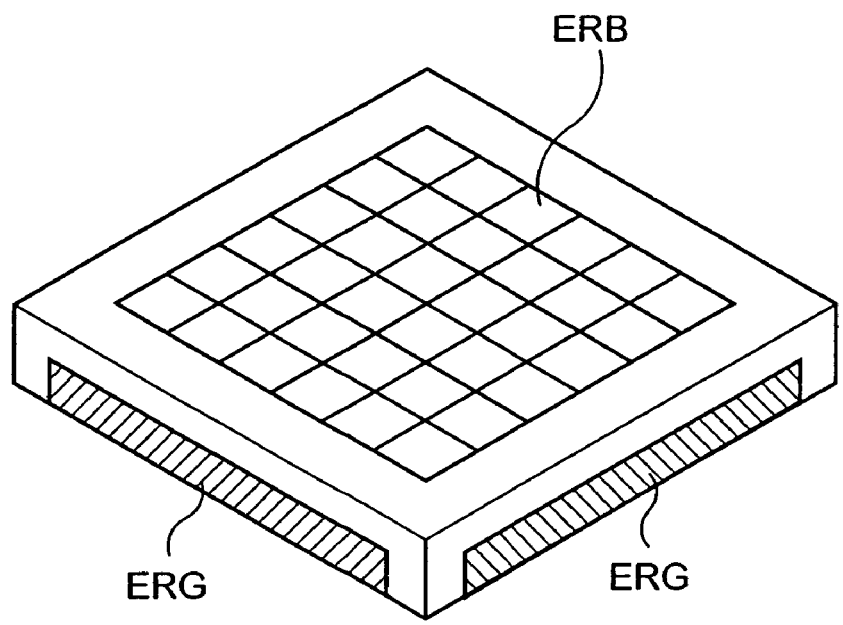
FIG. 58 is a perspective view showing the exterior of communications unit TCPa according to a ninth embodiment.

Next, the ninth embodiment of the present invention will be described. FIG. 58 is a perspective view illustrating the exterior of communications unit TCPa. The communications unit according to the ninth embodiment of the present invention differs from the communications unit of the third embodiment in that, receiver main electrode ERB is constructed as a block rather than as a single board, and integrates receiver return electrode ERG on the four sides of the communications unit, as shown in FIG. 58. Because the rest of the configuration and the method of the communications unit according to the ninth embodiment are similar to that of the third embodiment, the explanation is omitted. Moreover, optimal grid width and intervals for the grid spacing will differ depending on the body that touches the surface (human body, or other devices), but will preferably be one centimeter (grid width), and several centimeters (grid spacing interval).

Figure 59:
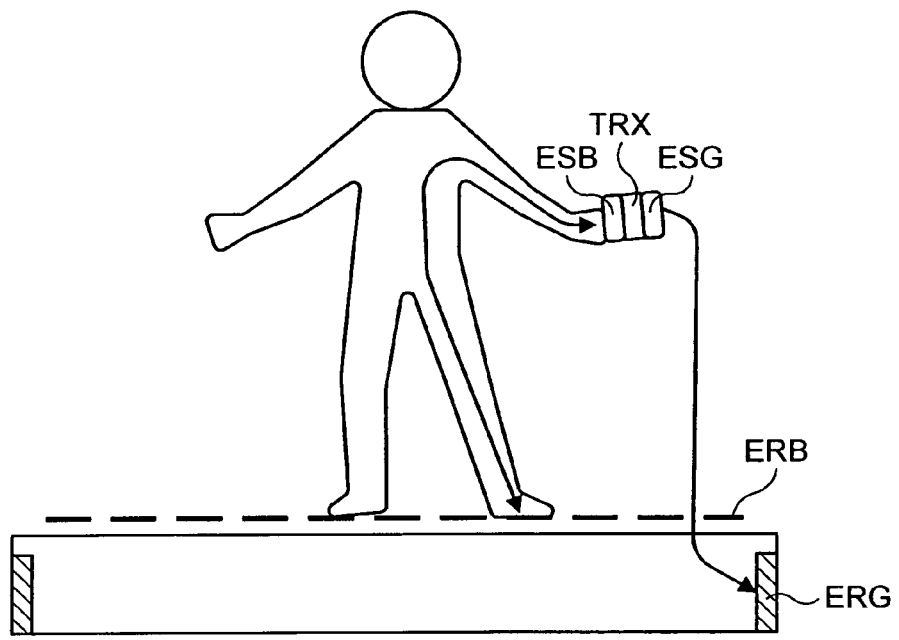
FIG. 59 shows the state where communications unit TCPa is electrically coupled with external electric field communications apparatus, according to a ninth embodiment.

In such cases, the state of coupling the electric field of the communications unit and the transmitter apparatus installed in dielectric shown in FIG. 59. The receiver main electrode ERB of the lattice part, couples the human body as the signal path with the main electrode ESB of the transmitter apparatus, similarly to the embodiments described above. Receiver return electrode ERG couples with return electrode ESG of the transmitter apparatus, through the grid spacing of the receiver main electrode. Because the electrode has a grid form, coupling of the return electrode is relatively easy as compared to an ungrid form electrode. The ease of coupling works especially well when the size of the communications units is increased.

Moreover, the form of receiver main electrode ERB of the communications unit is not restricted to a grid. The electrode may have another form having spaces between the electrode parts, such as a mesh or perforations.

12. Tenth Embodiment

Figure 60:
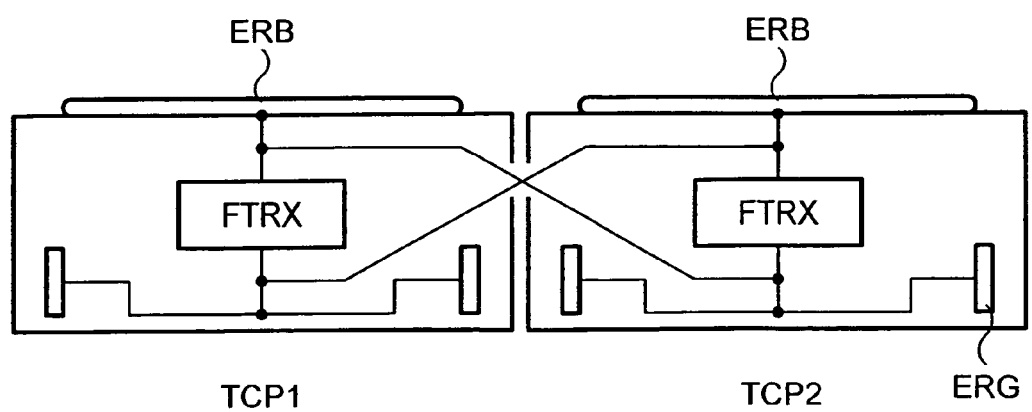
FIG. 60 shows the state where communications unit is coupled with an adjoining communications unit, in a tenth embodiment.

Next, a tenth embodiment of the present invention will be described. FIG. 60 shows the tenth embodiment. In the tenth embodiment, modified receiver return electrode ERG and modified receiver main electrode ERB of a communications unit according to the third embodiment are connected.

Figure 61:
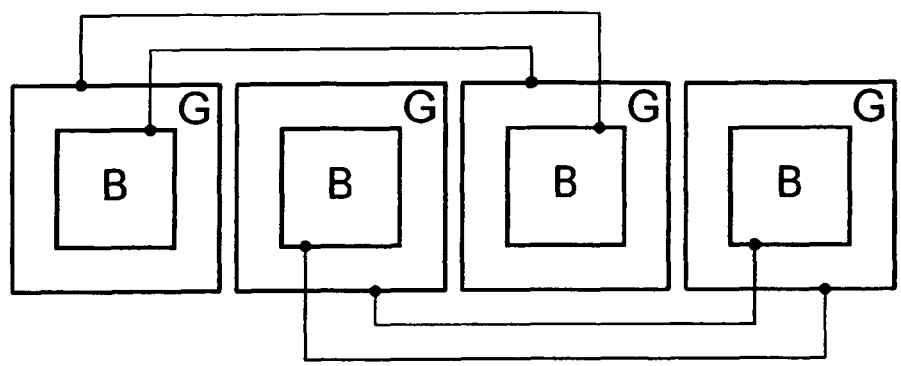
FIG. 61 shows the state where communications units for a tenth embodiment are each coupled to be separated by one separate communications unit.

In the tenth embodiment, the receiver main electrode ERB of communications unit TCP1 is connected to the receiver return electrode ERG of adjoining communications unit TCP2, as shown in FIG. 60. Receiver return electrode ERG of communications unit TCP1 is connected to adjoining receiver main electrode ERB of communications unit TCP2. By connecting them in this way, receiver main electrode ERB on the upper part of the communications unit of the environment functions as a receiver return electrode for communications unit TCP1. Therefore, it is possible to relatively easily couple the return signal paths. In the case where such a connection is not achieved, receiver return electrode ERG of the communications unit ends up hidden beneath the floor, and there is the case where the return electrode coupling is weakened. As well, in the case of such a coupling between adjoining communications units, people are standing astride two communications units, and in the case where the electronic device is placed so that it straddles communications units, there is a possibility that the communication path is short-circuit. Thus, there is a possibility that the communication may be interrupted. In this case, it is possible to slightly reduce the possibility of a person standing astride two communications units, by locating a communications unit that communicates with said communications unit with something that is slightly separated. FIG. 61 shows the case where a communications unit is connected to one detached communications unit. Receiver return electrode ERG of the communications unit shown in FIG. 61 is connected to receiver main electrode ERB of a communications unit separated by one from the communications unit. In addition, receiver return electrode ERB of the communications unit is connected to receiver main electrode ERG of a communications unit separated by one from the communications unit.

Figure 62:
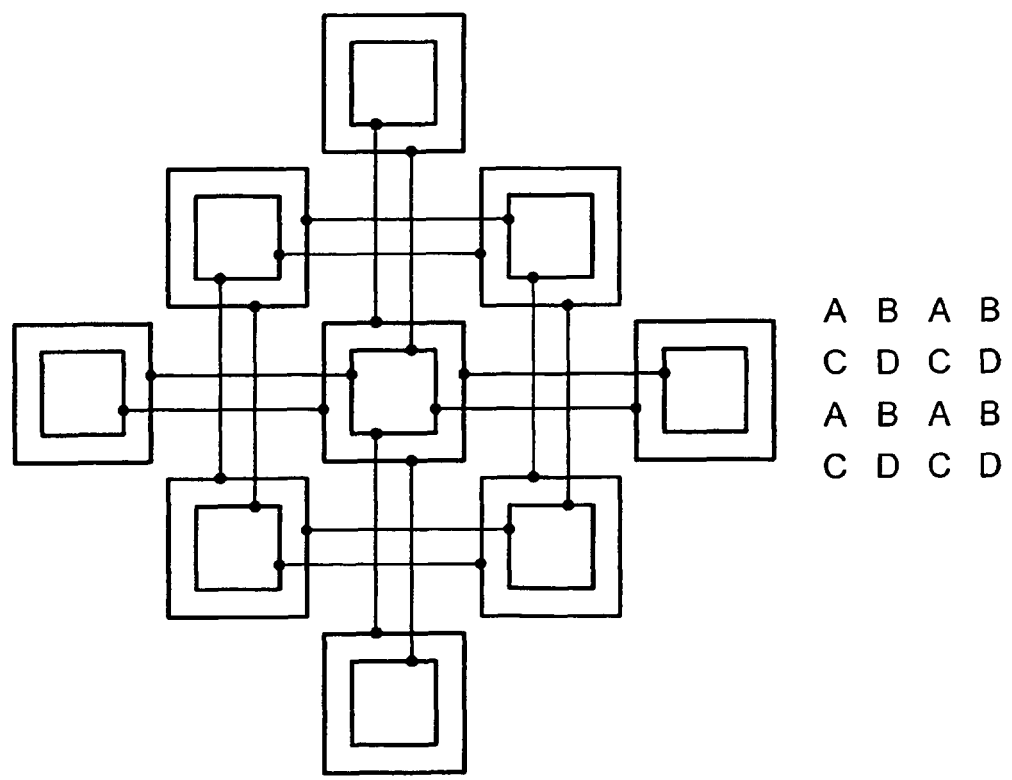
FIG. 62 shows the state where several communications units are coupled, according to a tenth embodiment.

As well, the communications unit may be interconnected to a plurality of communications unit. Particularly in the case of mutually interconnecting adjacent communications units separated by one in all four directions in grid, it is possible to cover the entire floor by using groups of communications units. An example of layout with groups (A-D) of communication unit is shown on the right in FIG. 62. In this example, the floor surface is covered by the four groups of communications unit. The connection situation among communications units is shown on the left side of FIG. 62n. By connecting the communications units in this manner, the number of communications units belonging to one group is increased, and the degree of electric field coupling is not easily weakened.

Moreover, receiver return electrodes formed on the wall surfaces and ceiling surfaces may be removed. However, if they are formed, it is possible to use them as supplemental electrodes.

What is claimed is:

1. An electric field communications system, comprising:
a transmitter apparatus, comprising:
a transmitter main electrode provided in a location so as to exert readily an electric effect on a dielectric;
a transmitter return electrode;
a signal generator that generates a transmission signal; and
a modulator that modulates a voltage difference between said transmitter main electrode and said transmitter return electrode in response to said transmission signal;
a receiver apparatus, comprising:
a receiver main electrode provided in a location where said receiver main electrode is subjected readily to an electric effect from said dielectric;
a receiver return electrode that establishes an electrostatic coupling with said transmitter return electrode;
a measuring part that measures an electric status generated between said receiver main electrode and said receiver return electrode; and
a demodulator that acquires an electric signal based on a measurement result by said measuring part and acquires said transmission signal by demodulation of the electric signal,
wherein said measuring part comprises:
an electro-optical crystal that exhibits a Pockels Effect and modulates light penetrating said electro-optical crystal in response to an electric field in a space where said electro-optical crystal is located;
light emitting means that emits light to said electro-optical crystal;
light receiving means that receives light penetrating said electro-optical crystal, and outputs signals in response to the received light; and
at least one of a return electrode electrically connected to said receiver return electrode and positioned nearer said electro-optical crystal than said receiver return electrode, and a destination electrode electrically connected to said receiver main electrode and positioned nearer said electro-optical crystal than said receiver main electrode.

2. An electric field communications system according to claim 1, wherein said receiver return electrode is connected to a positive power supply, a negative power supply, or a part having a low impedance and a stabilized electric potential.

3. An electric field communications system according to claim 1, wherein said receiver return electrode is connected to a cabinet, said cabinet accommodating said receiver return electrode and being made of conductive materials.

4. An electric field communications system according to claim 1, wherein said transmitter return electrode is connected to a positive power supply, a negative power supply, or a part having low impedance and stabilized electric potential.

5. An electric field communications system according to claim 1, wherein said transmitter return electrode is connected to a cabinet, said cabinet accommodating said transmitter return electrode and being made of conductive materials.

6. An electric field communications system according to claim 1, wherein said transmitter apparatus and said receiver apparatus are included in a single cabinet.

7. An electric field communications system according to claim 1, wherein said transmitter main electrode and said receiver main electrode are implemented together using a single electrode, or said transmitter return electrode and said receiver return electrode are implemented together using a single electrode.

8. An electric field communications system according to claim 1, wherein said receiver return electrode is provided in a location where said receiver return electrode and said dielectric cannot contact one another when communication between said transmitter apparatus and said receiver apparatus is being performed.

9. An electric field communications system according to claim 8, wherein said measuring part measures a voltage difference between said receiver main electrode and said receiver return electrode, the voltage difference being generated by an electric field provided to said dielectric.

10. An electric field communications system according to claim 8, wherein:
in said communications system, said transmitter main electrode is located near said receiver main electrode;
said receiver return electrode is provided in a location where said receiver return electrode does not contact said transmitter main electrode and said receiver main electrode; and
said measuring part measures an electric field generated between said receiver main electrode and said receiver return electrode, the electric field being generated by said modulator and not passing through said dielectric.

11. An electric field communications system according to claim 1, wherein: said measuring part comprises both of said destination electrode and said return electron,
said destination electrode and said return electrode being positioned to he opposite each other across said electro-optical crystal.

12. An electric field communications system according to claim 1, wherein:
said transmitter apparatus changes at a regular interval a voltage difference between said transmitter main electrode and said transmitter return electrode for notifying existence of said transmitter apparatus;
said receiver apparatus acquires said electric signal based on the measurement result by said measuring part;
said receiver apparatus comprises a demodulator that acquires data transmitted from said transmitter apparatus, the data being acquired by demodulating the electric signal; and
said receiver apparatus comprises notification means that notifies a user of said receiver apparatus that said receiver apparatus is ready for communicating with said transmitter apparatus while said demodulator receives the notification for longer than a predetermined time duration.

13. An electric field communications system according to claim 1, wherein said at least one of said return electrode and said destination electrode is in contact with said electro-optical crystal.

14. An electric field communications system, comprising:
a transmitter apparatus, comprising
a transmitter main electrode provided in a location so as to exert readily an electric effect on a dielectric;
a transmitter return electrode;
a signal generator that generates a transmission signal; and
a modulator that modulates a voltage difference between said transmitter main electrode and said transmitter return electrode in response to said transmission signal;
a receiver apparatus, comprising:
a receiver main electrode provided in a location where said receiver main electrode is readily subjected to an electric effect from said dielectric;

a receiver return electrode that establishes an electrostatic coupling with said transmitter return electrode;
a measuring part that measures an electric status generated between said receiver main electrode and said receiver return electrode; and
a demodulator that acquires an electric signal based on a measurement result by said measuring part and acquires said transmission signal by demodulation of said electric signal,
wherein said measuring part comprises:
an electro-optical crystal that exhibits a Pockels Effect and modulates light penetrating said electro-optical crystal in response to an electric field in a space where said electro-optical crystal is located;
light emitting means that emits light to said electro-optical crystal; and
light receiving means that receives light penetrating said electro-optical crystal, and outputs signals in response to the received light,
wherein said receiver return electrode is provided in a location where said receiver return electrode and said dielectric cannot contact one another when communication between said transmitter apparatus and said receiver apparatus is being performed, and
wherein, said receiver apparatus further comprises:
a transmitter main electrode provided in a location so as to exert readily an electric effect on said dielectric;
a transmitter return electrode; and
a modulator that changes an electric potential provided to said transmitter main electrode of said receiver apparatus in response to data to be transmitted; and wherein, said receiver apparatus provides to said dielectric an electric field in response to the electric potential generated by said modulator; and
said transmitter apparatus further comprises:
a receiver main electrode provided in a location where said receiver main electrode of said transmitter apparatus is subjected readily to an electric effect from said dielectric;
a receiver return electrode that establishes an electrostatic coupling with said transmitter return electrode of said receiver apparatus; and
a measuring part that measures an electric status generated between said receiver main electrode of said transmitter apparatus and said receiver return electrode of said transmitter apparatus; and
a demodulator that acquires an electric signal based on the measurement result by said measuring part of said transmitter apparatus, and acquires the transmitted data by demodulating the electric signal,
wherein said receiver return electrode of said transmitter apparatus is provided in a location where said receiver return electrode of said transmitter apparatus and said dielectric cannot contact one another when communication between said transmitter apparatus and said receiver apparatus is being performed.

15. An electric field communications apparatus, comprising:
a receiver main electrode provided in a location where said receiver main electrode is readily subjected to receive an electric effect from a dielectric;
a receiver return electrode that establishes an electrostatic coupling with a transmitter return electrode; and
a measuring part that measures an electric status generated between said receiver main electrode and said receiver return electrode;
wherein said measuring part comprises:
an electro-optical crystal that exhibits a Pockels Effect and modulates light penetrating said electro-optical crystal in response to an electric field in a space where said electro-optical crystal is located;
light emitting means that emits light to said electro-optical crystal; and
light receiving means that receives light penetrating said electro-optical crystal, and outputs signals in response to the received light; and
at least one of a return electrode electrically connected to said receiver return electrode and positioned nearer said electro-optical crystal than said receiver return electrode, and a destination electrode electrically connected to said receiver main electrode and positioned nearer said electro-optical crystal than said receiver main electrode.

16. An electric field communications apparatus according to claim 15, wherein said receiver return electrode is positioned far from said dielectric and faces said dielectric.

17. An electric field communications apparatus according to claim 15, wherein said receiver main electrode and said receiver return electrode are positioned to locate said electro-optical crystal in an electric field generated between said receiver main electrode and said receiver return electrode.

18. An electric field communications apparatus according to claim 15, wherein said receiver main electrode and said receiver return electrode are positioned to be in opposing relation to one another across at least a part of said electro-optical crystal.

19. An electric field communications apparatus according to claim 15, wherein said return electrode is in contact with said electro-optical crystal.

20. An electric field communications apparatus according to claim 15, wherein said destination electrode is in contact with said electro-optical crystal.

21. An electric field communications apparatus according to claim 15, wherein:
said electric field communications apparatus further comprises an insulator having an upper face, a lower face, and side faces;
said measuring part is provided in said insulator;
said receiver return electrode is provided in a location where said receiver return electrode cannot contact said dielectric during electric field communications; and
said receiver main electrode is provided on said upper face of said insulator.

22. An electric field communications apparatus according to claim 15, wherein said electric field communications apparatus is adapted to communicate with a transmitter apparatus having a transmitter main electrode provided in a location so as to exert readily an electric effect on a dielectric, and a transmitter return electrode, wherein said transmitter apparatus transmits modulated notification information to notify existence of said transmitter apparatus at a regular interval, wherein said electric field communications apparatus further comprises:
a demodulator that demodulates data transmitted from said transmitter apparatus based on a measurement result of the electric status generated between said receiver main electrode and said receiver return electrode obtained by said measuring part; and
notification means that notifies a user of said electric field communications apparatus that said electric field communications apparatus is ready for communicating with said transmitter apparatus while said demodulator receives the notification for longer than a predetermined time duration.

23. An electric field communications apparatus according to claim 22, wherein:
said transmitter apparatus further comprises an oscillator that supplies an AC voltage between said transmitter main electrode and said transmitter return electrode for charging said electric field communications apparatus;
said notification information includes information showing that said transmitter apparatus is capable of charging said electric field communications apparatus;
said electric communications apparatus comprises a rectifier that converts the AC voltage into a DC voltage, the AC voltage being induced between said receiver main electrode and said receiver return electrode;
said electric communications apparatus comprises a battery that is charged with the DC voltage obtained by said rectifier; and
said notification means notifies the user of said electric field communications apparatus that said transmitter apparatus is ready for charging said electric field communications apparatus while said demodulator receives the notification information for longer than a predetermined time duration.

24. An electric field communications apparatus according to claim 22, wherein:
said receiver main electrode is positioned near said transmitter main electrode; and
said electric field communications apparatus receives an electric effect directly without passing through said dielectric.

25. An electric field communications apparatus according to claim 15, further comprising a demodulator that acquires an electric signal based on the measurement result by said measuring part, and acquires the transmitted data by demodulating the electric signal, wherein:
said demodulator, at a start of the demodulating process, detects a polarity of a header of a received packet; and
when said demodulator detects that the polarity of the header is inverted from a predetermined polarity, said demodulator inverts the polarity of the packet and demodulates the packet having the inverted polarity.

26. An electric field communications apparatus according to claim 15, further comprising a demodulator that acquires an electric signal based on a measurement result by said measuring part, and acquires the transmitted data by demodulating the electric signal, wherein:
said demodulator comprises a temporary memory for storing a received packet; and
when said demodulator fails to demodulate the packet, said demodulator inverts the signal stored in said temporary memory and demodulates the packet having inverted polarity.

27. An electric field communications apparatus according to claim 15, comprising:
a first demodulator that receives a first electric signal based on the measurement result by said measuring part;
a second demodulator that receives a second electric signal whose polarity is inverted from the first electric signal based on the measurement result by said measuring part; and
a circuit that receives output signals from said first demodulator and said second demodulator, and outputs a correctly demodulated signal.

28. An electric field communications apparatus according to claim 15, wherein said receiver main electrode has a hole.

29. An electric field communications apparatus according to claim 15, wherein said receiver main electrode is connected to a receiver return electrode of another electric field communications apparatus.

* * * * *

UNITED STATES PATENT AND TRADEMARK OFFICE
CERTIFICATE OF CORRECTION

PATENT NO. : 7,860,455 B2
APPLICATION NO. : 10/521602
DATED : December 28, 2010
INVENTOR(S) : Masaaki Fukumoto et al.

It is certified that error appears in the above-identified patent and that said Letters Patent is hereby corrected as shown below:

In the Claims

In Column 50, line 31, claim 11 delete "to he" after --positioned--.

Signed and Sealed this
First Day of March, 2011

David J. Kappos
*Director of the United States Patent and Trademark Office*